(12) United States Patent
Creech

(10) Patent No.: US 10,205,313 B2
(45) Date of Patent: Feb. 12, 2019

(54) TWO-TRANSISTOR DEVICES FOR PROTECTING CIRCUITS FROM SUSTAINED OVERCURRENT

(71) Applicant: Symptote Technologies, LLC, Charleston, SC (US)

(72) Inventor: Mark D. Creech, Charleston, SC (US)

(73) Assignee: Symptote Technologies, LLC, Charleston, SC (US)

( * ) Notice: Subject to any disclaimer, the term of this patent is extended or adjusted under 35 U.S.C. 154(b) by 329 days.

(21) Appl. No.: 15/216,758

(22) Filed: Jul. 22, 2016

(65) Prior Publication Data

US 2017/0025844 A1 Jan. 26, 2017

Related U.S. Application Data

(60) Provisional application No. 62/196,567, filed on Jul. 24, 2015.

(51) Int. Cl.
*H02H 3/087* (2006.01)
*H02H 3/093* (2006.01)
*H02H 1/04* (2006.01)

(52) U.S. Cl.
CPC .............. *H02H 3/093* (2013.01); *H02H 1/04* (2013.01); *H02H 3/087* (2013.01)

(58) Field of Classification Search
USPC .................................................. 361/101, 111
See application file for complete search history.

(56) References Cited

U.S. PATENT DOCUMENTS

| 3,603,811 A | 9/1971 | Day et al. |
| 4,376,986 A | 3/1983 | Elmasry et al. |
| 4,744,369 A | 5/1988 | Kroll |
| 5,157,289 A | 10/1992 | Vasile |
| 5,191,279 A | 3/1993 | Zommer |
| 5,283,707 A | 2/1994 | Conners et al. |

(Continued)

FOREIGN PATENT DOCUMENTS

| EP | 0708515 A1 | 4/1996 |
| EP | 0593588 B1 | 3/1997 |

(Continued)

OTHER PUBLICATIONS

Texas Instruments, 'Unregulated 60-mA Charge Pump Voltage Inverter,' (Jun. 2008) (29 pages).

(Continued)

*Primary Examiner* — Ronald W Leja
(74) *Attorney, Agent, or Firm* — Thrive IP®; Jeremy M. Stipkala

(57) ABSTRACT

Two-transistor devices protect electrical circuits from sustained overcurrent conditions. Some cases provide normally-on depletion mode transistors biased into enhancement mode for lower impedance during normal current conditions, and then the transistors are biased into blocking depletion mode during sustained overcurrent conditions to block the current to the circuit. Optionally, the devices have only two terminals and require no auxiliary power to operate. Other cases provide protective circuitry for the transistors' gates, timing circuitry designed to ignore brief nuisance spikes, and/or timing circuitry to delay resetting the device until the current has returned to an acceptable level.

19 Claims, 23 Drawing Sheets

© 2015 Mark D. Creech

(56) References Cited

U.S. PATENT DOCUMENTS

| | | | |
|---|---|---|---|
| 5,291,123 A | 3/1994 | Brown | |
| 5,319,515 A | 6/1994 | Pryor et al. | |
| 5,396,117 A | 3/1995 | Housen et al. | |
| 5,465,188 A | 11/1995 | Pryor et al. | |
| 5,581,433 A | 12/1996 | Jordan | |
| 5,742,463 A | 4/1998 | Harris | |
| 5,805,393 A | 9/1998 | Thomas | |
| 6,002,566 A | 12/1999 | Arikawa et al. | |
| 6,049,447 A | 4/2000 | Roesch et al. | |
| 6,061,219 A | 5/2000 | Giffard | |
| 6,118,641 A | 9/2000 | Atkins et al. | |
| 6,181,541 B1 | 1/2001 | Souri et al. | |
| 6,317,343 B1 | 11/2001 | Okamura et al. | |
| 6,331,763 B1 | 12/2001 | Thomas et al. | |
| 6,404,608 B1 | 6/2002 | Pryor et al. | |
| 7,015,680 B2 | 3/2006 | Moraveji et al. | |
| 7,324,315 B2 | 1/2008 | Harris | |
| 7,492,566 B2 | 2/2009 | Harris | |
| 7,576,962 B2 | 8/2009 | Harris | |
| 7,903,382 B2 | 3/2011 | Premerlani et al. | |
| 8,004,806 B2 | 8/2011 | Li | |
| 8,139,329 B2 | 3/2012 | Martin | |
| 8,169,763 B2 | 5/2012 | Morrish | |
| 8,223,467 B2 | 7/2012 | Morrish | |
| 8,289,667 B2 * | 10/2012 | Morrish | H02H 9/025 361/58 |
| 8,537,517 B1 | 9/2013 | Banak et al. | |
| 8,570,713 B2 | 10/2013 | Kumfer et al. | |
| 8,605,398 B2 | 12/2013 | Bode et al. | |
| 8,643,055 B2 | 2/2014 | Ankoudinov et al. | |
| 8,729,739 B2 | 5/2014 | Lubomirsky et al. | |
| 9,490,798 B1 | 11/2016 | Charpentier et al. | |
| 2002/0125507 A1 | 9/2002 | Washburn et al. | |
| 2006/0238936 A1 | 10/2006 | Blanchard et al. | |
| 2009/0279225 A1 | 11/2009 | Morrish | |
| 2011/0181252 A1 | 7/2011 | Salato et al. | |
| 2012/0039007 A1 | 2/2012 | Turchi et al. | |
| 2012/0161860 A1 | 6/2012 | Snowdon | |
| 2014/0070340 A1 | 3/2014 | Hall et al. | |
| 2014/0070786 A1 | 3/2014 | Guerre et al. | |
| 2014/0175454 A1 | 6/2014 | Roberts et al. | |
| 2015/0207314 A1 | 7/2015 | Tournier et al. | |
| 2015/0207401 A1 | 7/2015 | Zhang et al. | |
| 2015/0280417 A1 | 10/2015 | Shen | |
| 2017/0025844 A1 * | 1/2017 | Creech | H02H 3/093 |

FOREIGN PATENT DOCUMENTS

| | | |
|---|---|---|
| WO | 8602180 | 4/1986 |
| WO | 93/01639 A1 | 1/1993 |
| WO | 2017/05333 A1 | 3/2017 |

OTHER PUBLICATIONS

Power Developer (Nov. 2015) (16 pages).
PEG Conference, 'Voice Protection for ONTs Using ECL and Crowbar Devices,' (30 pages).
Conte, F.D. et al., 'Safety in the battery design: the short circuit,' World Electric Vehicle Journal, vol. 3 (2009) (8 pages).
Wilk, G.D. et al., 'High-k gate dielectrics: Current status and materials properties considerations,' Journal of Applied Physics, vol. 89, No. 10 (May 2001) (33 pages).
Euro Quartz, 'XO91 Oscillators,' www.euroquartz.co.uk (2 pages).
Texas Instruments, 'Regulated 200-mA High Efficiency Charge Pump DC/DC Converters,' (Aug. 2000) (30 pages).
Texas Instruments, 'CMOS Voltage Converter,' (Jun. 2006) (23 pages).
Texas Instruments, 'TPS25942x/44x 2.7V-18V, 5A eFuse Power MUX with Multiple Protection Modes,' (Mar. 2015) (54 pages).
Radant MEMS, 'Application Note for Test & Handling of SPST RF-MEMS Switches,' www.radantmems.com (4 pages).
Texas Instruments, 'TPS6030 Single Cell to 3-V or 13-V, 20-mA Dual Output, High Efficiency Charge Pump,' (Oct. 2015) (25 pages).
International Preliminary Report on Patentability for PCT/US2016/052734, dated Mar. 27, 2018 (9 pages).
Urciuoli, D.P., 'Evaluation of SiC VJFET Devices,' Army Research Lab. (May 2008).
Peftitsis, D. et al., 'Self-Powered Gate Driver for Normally on Silicon Carbide Junction Field-Effect Transistors Without External Power Supply,' IEEE Transactions on Power Electronics, vol. 28, No. 3, pp. 1488-1501 (Mar. 2013).
GaN-on-Si power transistors from French lab Leti, Electronics Weekly, http://www.electronicsweekly.com/news/design/power/gan-on-si-power-transistors-french-lab-leti (Jul. 2015).
Urciuoli, D.P. et al., 'Demonstration of a 600-V. 60-A, Bidirectional Silicon Carbide Solid-State Circuit Breaker,' U.S. Army Research Lab. (5 pages).
Urciuoli, D.P. et al., 'Trade Study and Design of a TRL-4, 100 degress C, 28- to 600-V Bidirectional DC-DC Converter Power Stage,' Army Research Lab., Jan. 2011 (33 pages).
Linear Technology, Auto-Reset Electronic Circuit Breaker 1992 (16 pages).
On Semiconductor 'Advantages of eFuses Versus PTC Resettable Fuses,' Semiconductor Components Industries, LLC (Oct. 2016) (5 pages).
Younis Allasasmeh, Thesis 'Analysis, Design, and Implementation of Integrated Charge Pumps with High Performance,' (Aug. 2011) (123 pages).
EFM32, 'Oscillator Design Considerations,' (21 pages).
Radial Leaded PTC: OZRM Series, (4 pages).
Pilvelait, B. et al., 'A High Power Solid State Circuit Breaker for Military Hybrid Electric Vehicle Applications,' 2012 NDIA Ground Vehicle Systems Engineering and Technology Symposium (Aug. 2012) (10 pages).
Modi, P., Thesis 'A Charge Pump Architecture with High Power Efficiency and Low Output Ripple Noise in 0.5um CMOS Process Technology,' Rochester Institute of Technology (2012) (94 pages).
Alwash, M. et al., 'Short-Circuit Protection of Power Converters with SiC Current Limiters,' IEEE (2016) (6 pages).
Yu Wen et al., 'A Dual-Mode Driver IC with Monolithic Negative Drive-Voltage Capability and Digital Current-Mode Controller for Depletion-Mode GaN HEMT,' IEEE (2015) (10 pages).
Veliadis, V. et al., 'Suitability of N-ON recessed implanted gate vertical-channel SiC JFETs for optically triggered 1200 V solid-state-circuit-breakers,' IEEE (2015) (4 pages).
Miao, Z. et al., 'A Self-Powered Bidirectional DC Solid State Circuit Breaker Using Two Normally-on SiC JFETs,' IEEE (2015) (6 pages).
Tiwari, A.K et al., 'SiC Current Limiting Devices for Surge Protection,' IEEE (2015) (4 pages).
Radmanesh, H. et al., 'A Novel Solid State Fault Current Limiting Circuit Breaker for Medium Voltage Network Applications,' IEEE (2015) (8 pages).
Giannoutsos, S.V. et al., 'A Gate Drive Circuit for Normally-on SiC JFETs with Self-Protection Functions against Overcurrent and Shoot-Through Fault Conditions,' IEEE (2015) (9 pages).
Bingjian, Y. et al., 'A Hybrid Circuit Breaker for DC-Application,' IEEE (2015) (6 pages).
Ouaida, R. et al., 'State of Art Current and Future Technologies in Current Limiting Devices,' IEEE (2015) (6 pages).
Shen, Z.J. et al., 'Wide-Bandgap Solid-State Circuit Breakers for DC Power Systems: Device and Circuit Considerations,' IEEE Transactions on Electron Devices, vol. 62, No. 2 (Feb. 2015) (7 pages).
Miao, Z. et al., 'A Self-Powered Ultra-Fast DC Solid State Circuit Breaker Using a Normally-on SiC JFET,' IEEE (2015) (7 pages).
Zhang, Y. et al., 'Over-Current Protection Scheme for SiC Power MOSFET DC Circuit Breaker,' IEEE (2014) (5 pages).
Konrad, W. et al., 'A Simple SiC JFET based AC vaiable current limiter,' Electric Drives and Machines Institute, Graz University of Technology (7 pages).

(56) References Cited

OTHER PUBLICATIONS

Kedia, S. et al., 'Simulation, Design, Fabrication, and testing of a MEMS Resettable Circuit Breaker,' IEEE Journal of Microelectromechanical Systems, vol. 24, No. 1 (Feb. 2015) (9 pages).
Peftitsis, D et al., 'Self-Powered Gate Driver for Normally-ON SiC JFETs: Design Considerations and Systems Limitations,' IEEE Transactions on Power Electronics, vol. 29, No. 10 (Oct. 2014) (7 pages).
Kampitsis, G. et al., 'Performance Consideration of an AC Coupled Gate Drive Circuit With Forward Bias for Normally-ON SiC JFETs,' IEEE (2013) (6 pages).
Juvekar, S. et al., 'A fast acting DC solid state fault isolation device (FID) with Si and SiC devices for MVDC distribution system,' IEEE (2012) (6 pages).
Chen, P. et al., 'A 80-m V Input, Fast Startup Dual-Mode Boost Converter with Charge-Pumped Pulse Generator for Energy Harvesting,' IEEE Asian Solid-State Circuits Conference (Nov. 2011) (4 pages).
Alexandrov, P. et al., 'Solid-State Disconnects Based on SiC Power JFETs,' IEEE (2011) (5 pages).
Dubois, F. et al., 'Ultrafast Safety System to Turn-Off Normally on Sic JFETs,' SAFRAN Group and CPES (10 pages).
Urciuoli, D.P. et al., 'Demonstration of a 600-V, 60-A, Bidirectional Silicon Carbide Solid-state Circuit Breaker,' US Government Work (5 pages).
Guedon, F. et al., 'Gate driver for SiC JFETs with portection against normally-on behaviour induces fault,' Electronic Letter, vol. 47, No. 6 (Mar. 2011) (2 pages).
Bergogne, D. et al., 'Normally-On SiC JFETs in Power Converters: Gate Driver and Safe Operation,' CIPS (Mar. 2010) (6 pages).
Kim, J.H. et al., 'Protection Circuit of Normally-On SiC JFET Using an Inrush Current,' (4 pages).
Luo, F. et al., 'A Novel Solid State Fault Current Limiter for DC Power Distribution,' IEEE (2008) (6 pages).
Domes, D. et al., 'A New, Universal and Fast Switching Gate-Drive-Concept for SiC-JFETs based on Current Source Principle' (6 pages).
Kelley, R.L. et al., 'Inherently Safe DC/DC Converter using a Normally-On SiC JFET,' IEEE (2005) (5 pages).
Heldwein, M. et al., 'A Novel SiC J-FET Gate Drive Circuit for Sparse Matrix Converter Applications,' IEEE (2004) (6 pages).
Yeatman, E.M. et al., 'Thermally tripped MEMS Circuit Breakers,' Micosaic Systems and Imperial College London (1 page).
Vinko, D. et al., 'Modification of the Cockcroft-Walton charge pump by using switched capacitors technique for improved performance under capacitive loads,' WSEAS Transactions on Circuits and Systems, Issue 1, vol. 8 (Jan. 2009) (10 pages).
Gregory, G.D., 'Applying Low-Voltage Circuit Breakers in Direct Current Systems,' IEEE (1994) (10 pages).
Geear, M.C. et al., 'Microengineered Electrically Resettable Circuit Breaker,' Journal of Microelectromechanical Systems, vol. 13, No. 6 (Dec. 2004) (8 pages).
Emphatec, 'Fused Overvoltage Protector,' www.emphatec.com (4 pages).
Linear Technology, 'Low Quiescent Current Surge Stopper,' www.linear.com (22 pages).
Schmitt, H., Presentation 'Fault Current Limiters Report on the Activitires of CIGRE WG A3.10,' Siemens AG, (Sep. 2003) (31 pages).
Magnecraft Solution Guide, 'Advantages of the 861 Solid State Relay,' (7 pages).
Tournier, D. et al., 'SiC Current Limiting FETs (CLFs) for DC Appplications,' Materials Science Forum, vols. 778-780 (2014) (5 pages).
Omron, 'RF MEMS Switch 2SMES-01,' (9 pages).
Bouarroudj-Berkani, M. et al., 'Ageing of SiC JFET transistors under repetitive current limitation conditions,' Elsevier, Microelectronics Reliability (2010) (6 pages).
Bourns, 'TCS-DL Series—TCS Dual Transient Current Suppressors,' www.bourns.com (2011) (7 pages).
Bourns, 'TBU-DT Series—TBU High-Speed Protectors,' www.bourns.com (2011) (5 pages).
Jones, E.F., Presentation 'Understanding Arc Flash,' Schneider Electric (34 pages).
Brenda Kovacevic, MICREL, 'Solid State Circuit Breakers' Application Note 5 (1997) (7 pages).
Dominique Bergogne et al., Normally-On SiC JFETs in Power Converters: Gate Driver and Safe Operations (6 pages).
Dominique Tournier et al., 'Sic Current Limiting FETs (CLFs) for DC applications,' Materials Science Forum (2014) (5 pages).
ETA Engineering technology, White Paper 'Reliable disconnection of photovoltaic,' (May 2012) (6 pages).
Toru Tanzawa, 'Innovation of Switched-Capacitor Voltage Multiplier,' IEEE Solid-State Circuits Magazine (2016) (9 pages).
www.ResearchGate.net, Conference paper 'Active protections for normally-on Sic JFETs,' (Oct. 2011) (11 pages).
Chen, Cheng et al., 'Robustness of Sic MOSFETs in short-circuit mode,' https://hal.archives-ouvertes.fr (Sep. 15, 2015) (9 pages).
Steve Mannas, 'Overcurrent-Protection ICs Have Their Current Limits,' Power Electronics Technology (Oct. 2008) (3 pages).
Omron Electronic Components, White Paper 'RF MEMS Switching: What you need to know,' (13 pages).
Semiconductor Components Industries, LLC, 'NIS5132 Series, +12 Volt Electronic Fuse,' https://onsemi.corn (Jul. 2014) (11 pages).
Kempkes, M. et al., 'Solid-State Circuit Breakers for Medium Voltage DC Power,' Diversified Technologies, Inc. (4 pages).
MICREL, Inc., 'MIC5021: High-Speed High-Side MOSFET Driver,' https://www.micrel.com (Jul. 2005) (10 pages).
MICREL, Inc., 'MIC5011: Minimum Parts High- or Low-Side MOSFET Driver,' https://www.micrel.com (Jul. 2005) (12 pages).
Dr. Huikai Xie, 'Advanced MEMS, Lecture 17,' University of Florida (2005) (11 pages).
Jin Qiu et al., 'A High-Current Electrothermal Bistable MEMS Relay,' ABB Corporate Research Ltd. (4 pages).
Jo-Ey Wong et al., 'An Electrostatically-Actuated MEMS Switch for Power Applications,' Massachusetts Institute of Technology (2000) (6 pages).
Radant MEMS, 'RF MEMS Switches and Products,' www.radantmems.com (2013) (92 pages).
Surgegate—MC025 Analog Station Set & Central Office Line Protector, www.itwlinx.com (1 page).
MAXIM; '60mA, SOT23 Inverting Charge Pump with Shutdown,' Maxim Integrated Products (Dec. 2008) (14 pages).
Linear Technology, 'Auto-Reset Electronic Circuit Breaker,' (16 pages).
Francois D. Martzloff et al., 'Selecting varistor clamping voltage: Lower is not better!,'0 National Institute of Standards and Technology (7 pages).
Texas Instruments, 'LM5064 Negative Voltage System Power Management and Protection IC with PMBus,' (Feb. 2013) (62 pages).
Abdus Sattar, 'Depletion-Mode Power MOSFETs and Applications,' IXYS Corporation (10 pages).
Janusz A. Starzyk et al., 'A DC-DC Charge Pump Design Based on Voltage Doublers,' IEEE Transactions on Circuits and Systems, Fundamental Theory and Applications, vol. 48, No. 3 (Mar. 2001) (10 pages).
Zhang et al., 'Over-Current Protection Scheme for Sic Power MOSFET DC Circuit Breaker,' Center for Research in Energy Systems Transformation (2015) (6 pages).
Device Engineering Incorporated, 'Surge Blocking Module,' (2011) (12 pages).
Caly Technologies, '1200V, 600 mOHM, SIC Current Limiting Device with Standard Short-Circuit Capabilities,' (2017) (4 pages).
Atmel, 'AVR4100: Selecting and testing 32kHz crystal oscillators for Atmel AVR microcontrollers,' (Mar. 2015) (24 pages).
ETA, 'Electronic Relay with Timer Function,' www.e-t-a.de (4 pages).
ETA, 'Thermal Automotive Circuit Breaker,' www.e-t-a.de (2015/16) (2 pages).

(56) References Cited

OTHER PUBLICATIONS

ETA Engineering Technology, 'Current—Customer Magazine of E-T-A Elektrotechnische Apparate GmbH,' Issue Jan. 2012 (16 pages).

Ming-Dou Ker et al., 'Impact of MOSFET Gate-Oxide Reliability on CMOS Operational Amplifier in a 130-nm Low-Voltage Process,' IEEE Transactions on Device and Materials Reliability, vol. 8, No. 2 (Jun. 2008) (14 pages).

Tim Howell, PEG Conference, 'Comparing Circuit Protection Technologies for 48 V DC in High Surge Environments,' (36 pages).

Andy Fewster et al., Power Design 'Latched Overcurrent Fault Detector Has Fast Response Time,' Power Electronic Technology, www.powerelectronics.com (Oct. 2005) (2 pages).

Anup Bhalla et al., 'Robustness of SiC JFETs and Cascodes,' Bodo's Power Systems, www.bodospower.com (May 2015) (3 pages).

Sze Chin, 'Boosting the Current Limit of Current Limiting Diodes,' Central Semiconductor Corp. (3 pages).

IXYS Corporation, 'Power Semiconductor Solutions for Automotive Applications,' www.IXYS.com (Apr. 2015) (46 pages).

Xiang W. et al., 'Research on fast solid state DC breaker based on a natural current zero-crossing point,' State Grid Electric Power Research Institute, J. Mod. Power Syst. Clean Energy (2014) (9 pages).

US Army, 'Ultra-Fast Bi-Directional Solid State Circuit Breaker,' (2 pages).

Peter Mairutti, 'Crystal Oscillator of the C500 and C166 Microcontroller Families,' Infineon technologies (46 pages).

J-P Laur et al., 'A New Circuit-Breaker Integrated Device for Protection Applications,' IEEE (1999) (4 pages).

Johannes Andersson et al., 'Circuit breakers, Melting fuses and Electronic fuses,' Chalmers Universtiy of Technology (2010) (78 pages).

Office Action dated Aug. 7, 2018 from Korean Intellectual Property Office (5 pages).

Translation of Office Action dated Aug. 7, 2018 (Redacted) (4 pages).

Notice of Allowance dated Nov. 29, 2018 from Korean Intellectual Property Office (5 pages).

Letter regarding Notice of Allowance dated Nov. 30, 2018 (Redacted) (2 pages).

\* cited by examiner

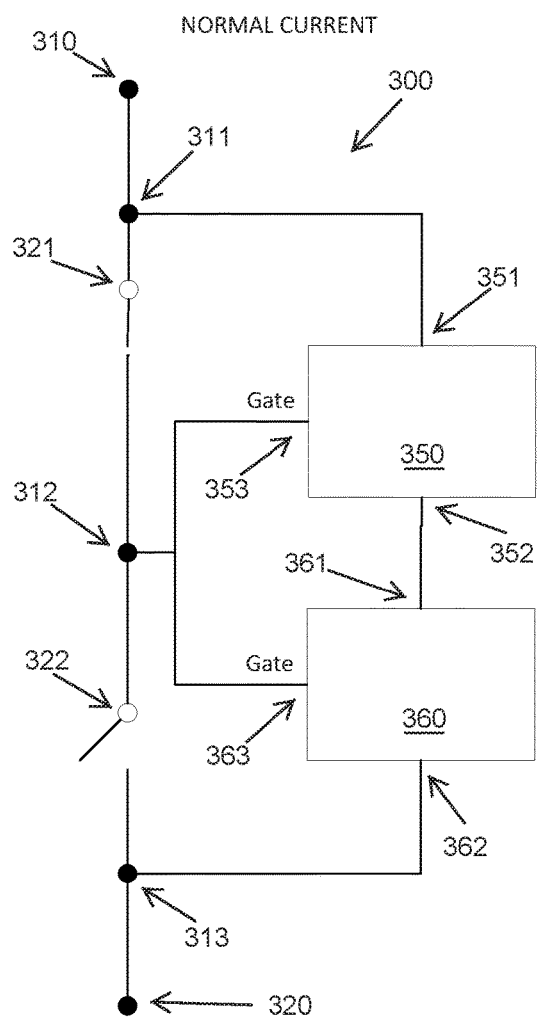
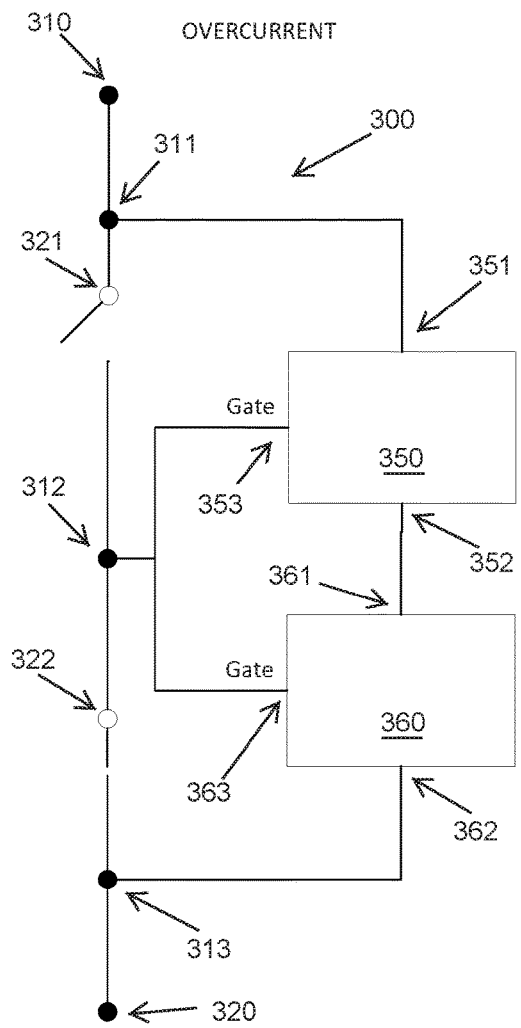
Fig. 3                    Fig. 4

TWO-TRANSISTOR DEVICES FOR PROTECTING CIRCUITS FROM SUSTAINED OVERCURRENT

RELATED APPLICATIONS

This application claims benefit of priority under 35 U.S.C. § 119(e) to U.S. Provisional Patent Application No. 62/196,567, filed Jul. 24, 2015, and entitled, "TWO-TRANSISTOR DEVICES FOR PROTECTING CIRCUITS FROM SUSTAINED OVERCURRENT," which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

FIELD OF INVENTION

This invention relates to devices and methods for protecting electrical circuits.

BACKGROUND OF THE INVENTION

Fuses, circuit breakers, and lambda diodes are known for protecting electrical circuits from spikes in current that could damage other components of the circuits. Fuses and circuit breakers, however, suffer from the disadvantage that they must be manually replaced or reset. Lambda diodes and devices derived from them unfortunately may introduce an undesirably high impedance in series with the load to be protected, and often require an auxiliary power supply to function properly. Sometimes that auxiliary power supply is provided by a battery or an independent circuit. If the auxiliary power supply fails, the protected circuit either no longer functions, or functions without adequate protection. The power consumed by a lambda diode may not impact a conventional low-power circuit; however, a high-power circuit will experience energy waste, shortened service life, and potentially significant thermal effects from conventional lambda diode configurations. Additionally, ultra-low power circuits such as so-called "nano-power" circuits, and various energy harvesting circuits are especially vulnerable to the effects of wasted energy.

Some lambda diode configurations also fail to take into account the significant variability in the performance characteristics of the transistors employed in the lambda diode. For example, the pinch-off voltage of standard manufactured junction gate field-effect transistors ("JFETs") can vary considerably over a range of several volts, causing the lambda diode to block current at higher- or lower-than-expected currents. Other conventional configurations begin blocking current too quickly, because they are triggered by relatively harmless transient spikes. Still other configurations do not wait long enough before resetting and allowing current flow, potentially subjecting the protected circuit to still-dangerous overcurrents. Accordingly, a lambda diode configuration that does not account for those shortcomings will yield a device of questionable protective value.

Solid-state fuses other than lambda circuits usually appear as an integrated circuit and require at least one pin to be grounded. In this way, the solid-state fuse is partially in parallel with the load to be protected instead of entirely in series with that load. This reduces the effectiveness of those solid-state fuses. Further, the necessity of grounding the integrated circuit may restrict the placement of integrated power field effect transistors ("FETs") to either high side or low side placement. Whichever placement is chosen, the additional burden is imposed of necessarily having to drive the potentials at the gates beyond the potential of the power rails. For higher-voltage applications especially, driving the gates above the high side rail or below the negative rail can be difficult and/or dangerous. In addition, solid-state fuses usually require a dedicated external power supply. Chaotic electrical conditions may cause power failure of the external power supply, resulting in the circuit to be protected being left unprotected. All of this reduces the effectiveness of those solid-state fuses.

Circuit protection devices are needed that do not require an auxiliary power source, more efficiently guard high-power circuit applications, adapt to high-side and low-side applications, serve any circuit with strict or sensitive energy requirements, and adequately protect electrical circuits.

SUMMARY OF THE INVENTION

Applicant has unexpectedly discovered that many, if not all, conventional circuits such as lambda diodes fail to place the primary transistors into enhancement mode during normal current conditions, and into blocking depletion mode during sustained overcurrent conditions. Heretofore, it has been acceptable to place just one primary transistor into the desired mode; but that leaves the protective device with inadequate performance characteristics in many common circumstances. Applicant has invented novel devices and methods for protecting electrical circuits based on that and other observations.

Some embodiments of the present invention are configured to protect a circuit from a sustained overcurrent condition by providing two transistors that operate in enhancement mode during normal current conditions, and then enter blocking depletion mode when a sustained overcurrent condition is detected. In this way, the two transistors in enhancement mode have very low impedances and therefore have low conduction losses during normal current conditions. But when they enter blocking depletion mode, those transistors exhibit very high impedances, and thereby block the overcurrent from harming the rest of the circuit. As used herein, "blocking depletion" indicates that the transistor has moved into depletion beyond its threshold voltage ($V_{TH}$), and is substantially non-conductive between its source and its drain.

Accordingly, certain embodiments provide a device for protecting a circuit having a primary current path from a sustained overcurrent condition, comprising:

a first terminal and a second terminal;

a first transistor comprising a first gate, a first drain, and a first source;

a second transistor comprising a second gate, a second drain, and a second source;

wherein the first transistor and the second transistor are arranged in series in the primary current path between the first terminal and the second terminal;

wherein, when a first positive voltage and a normal current condition exist from the first terminal to the second terminal, the first transistor is configured to operate substantially in enhancement mode; and the second transistor is configured to operate substantially in enhancement mode; and wherein, when a second positive voltage and a sustained overcurrent condition exist from the first terminal to the second terminal, the first transistor is configured to operate in blocking depletion mode; and the second transistor is configured to operate in blocking depletion mode; and wherein the device is configured to pass current during normal current conditions, and to substantially block current during sustained overcurrent conditions.

Other embodiments provide a device for protecting a circuit having a primary current path from a sustained overcurrent condition, comprising:

a first terminal and a second terminal;

a first transistor comprising a first gate, a first drain, and a first source;

a second transistor comprising a second gate, a second drain, and a second source;

wherein the first transistor and the second transistor are arranged in series in the primary current path between the first terminal and the second terminal;

wherein, when a first positive voltage and a normal current condition exist from the first terminal to the second terminal, the first transistor is configured substantially in diode mode; and the second transistor is configured substantially in diode mode; and wherein, when a second positive voltage and a sustained overcurrent condition exist from the first terminal to the second terminal, the first transistor is configured to operate in blocking depletion mode; and the second transistor is configured to operate in blocking depletion mode; and wherein the device is configured to pass current during normal current conditions, and to substantially block current during sustained overcurrent conditions.

Still other embodiments provide a device for protecting a circuit having a primary current path from a sustained overcurrent condition, comprising:

a first terminal and a second terminal;

a first transistor comprising a first gate, a first drain, and a first source;

a second transistor comprising a second gate, a second drain, and a second source;

wherein the first transistor and the second transistor are arranged in series in the primary current path between the first terminal and the second terminal;

wherein, when a first positive voltage and a normal current condition exist from the first terminal to the second terminal, a voltage difference between the first gate minus the first source is substantially less negative than a voltage difference between the second drain minus the first source; and a voltage difference between the second gate minus the second source is substantially less positive than a voltage difference between the first drain and the second source;

wherein, when a second positive voltage and a sustained overcurrent condition exist from the first terminal to the second terminal, a voltage at the first gate is driven lower than the second source so that at least a substantial portion of the voltage across the second transistor drives the first gate negative, and the first transistor enters blocking depletion mode; and a voltage at the second gate is driven higher than the first source so that at least a substantial portion of the voltage across the first transistor drives the second gate positive, and the second transistor enters blocking depletion mode; and wherein the device is configured to pass current during normal current conditions, and to substantially block current during sustained overcurrent conditions.

Certain embodiments of the present invention involve devices that oscillate between current-allowing and current-blocking states. Oscillations can occur at one or at more than one frequency. As described herein, those oscillations can be controlled and applied usefully to protect circuits from sustained overcurrent conditions.

Further embodiments relate to methods of manufacturing the devices of the various embodiments of the present invention.

Additional embodiments relate to methods of using the devices of the various embodiments of the present invention. For example, certain embodiments relate to methods for protecting a circuit from an overcurrent condition, comprising placing a device in series in the circuit, the device comprising a first terminal and a second terminal;

a first transistor comprising a first gate, a first drain, and a first source;

a second transistor comprising a second gate, a second drain, and a second source;

wherein the first transistor and the second transistor are arranged in series in the primary current path between the first terminal and the second terminal;

monitoring the current flowing through the device;

wherein, when a first positive voltage and a normal current condition exist from the first terminal to the second terminal, configuring the first transistor to operate substantially in enhancement mode; and configuring the second transistor to operate substantially in enhancement mode;

thereby allowing current to flow between the first terminal and the second terminal; and wherein, when a second positive voltage and a sustained overcurrent condition exist from the first terminal to the second terminal, configuring the first transistor to operate in blocking depletion mode; and configuring the second transistor to operate in blocking depletion mode;

thereby blocking current between the first terminal and the second terminal;

thereby protecting the circuit from an overcurrent condition.

While the disclosure provides certain specific embodiments, the invention is not limited to those embodiments. A person of ordinary skill will appreciate from the description herein that modifications can be made to the described embodiments and therefore that the specification is broader in scope than the described embodiments. All examples are therefore non-limiting.

BRIEF DESCRIPTION OF THE DRAWINGS

FIG. 3 conceptually depicts another embodiment of the invention comprising two transistors configured to pass current during normal current conditions.

FIG. 4 conceptually depicts the embodiment appearing in FIG. 3 configured to block current during overcurrent conditions.

DETAILED DESCRIPTION

Figure 1:
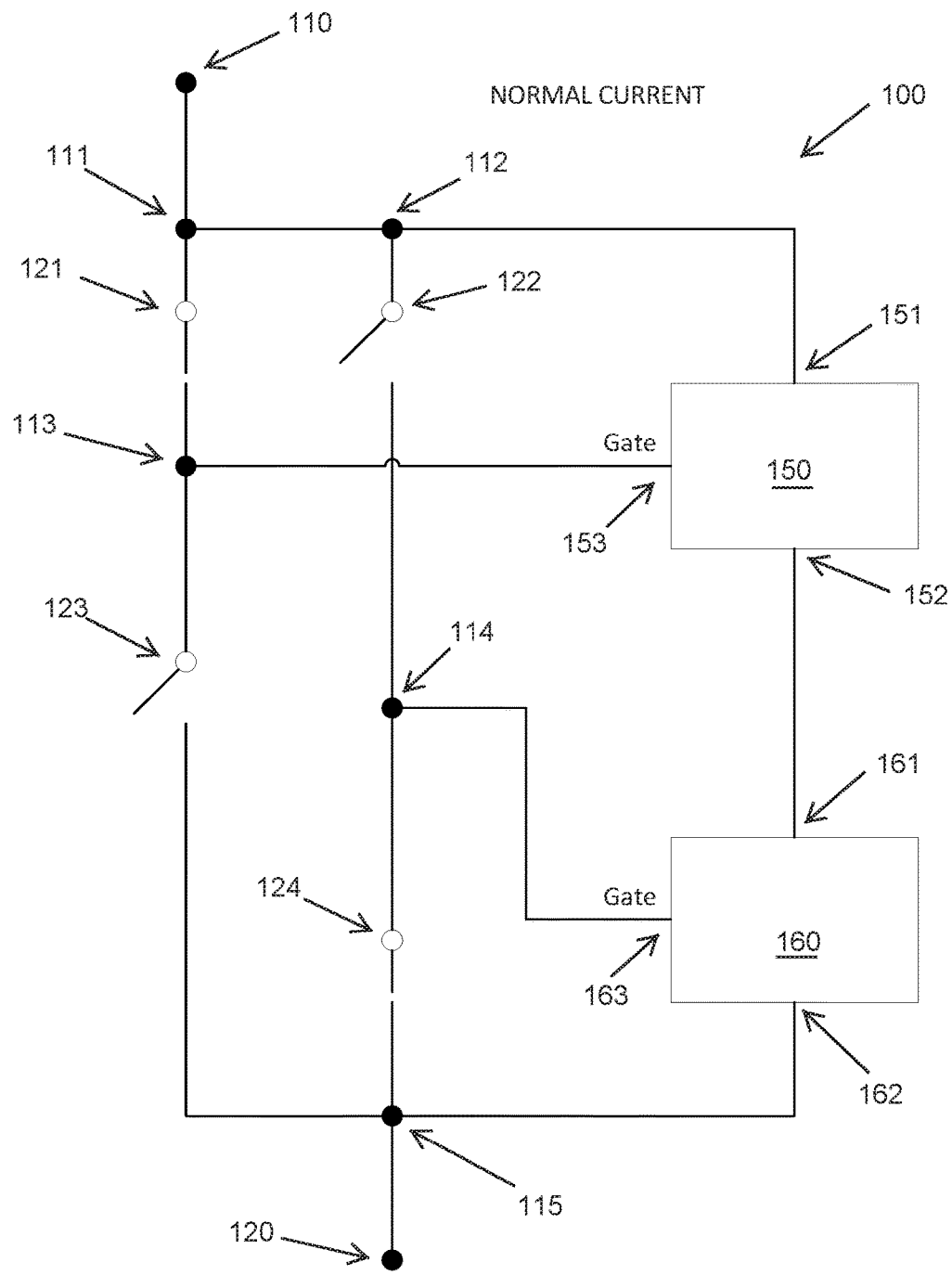
FIG. 1 conceptually depicts one embodiment of the invention comprising two transistors configured to pass current during normal current conditions.

As required, detailed embodiments of the present invention are disclosed herein; however, it is to be understood that the disclosed embodiments are merely exemplary of the invention that may be embodied in various forms. The figures are not necessarily to scale, and some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Where ever the phrase "for example," "such as," "including" and the like are used herein, the phrase "and without limitation" is understood to follow unless explicitly stated otherwise. Similarly "an example," "exemplary" and the like are understood to be non-limiting.

The term "substantially" allows for deviations from the descriptor that don't negatively impact the intended purpose. Descriptive terms are understood to be modified by the term "substantially" even if the word "substantially" is not explicitly recited.

The term "about" when used in connection with a numerical value refers to the actual given value, and to the approximation to such given value that would reasonably be inferred by one of ordinary skill in the art, including approximations due to the experimental and or measurement conditions for such given value.

The terms "comprising" and "including" and "having" and "involving" (and similarly "comprises", "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Any discussion of the prior art throughout the specification should in no way be considered as an admission that such prior art is widely known or forms part of common general knowledge in the field.

It is an object of the present invention to overcome or ameliorate at least one of the disadvantages of the prior art, or to provide a useful alternative.

As stated above, certain embodiments provide a device for protecting a circuit having a primary current path from a sustained overcurrent condition, comprising:

a first terminal and a second terminal;

a first transistor comprising a first gate, a first drain, and a first source;

a second transistor comprising a second gate, a second drain, and a second source;

wherein the first transistor and the second transistor are arranged in series in the primary current path between the first terminal and the second terminal;

wherein, when a first positive voltage and a normal current condition exist from the first terminal to the second terminal, the first transistor is configured to operate in enhancement mode; and the second transistor is configured to operate in enhancement mode; and wherein, when a second positive voltage and a sustained overcurrent condition exist from the first terminal to the second terminal, the first transistor is configured to operate in blocking depletion mode; and the second transistor is configured to operate in blocking depletion mode; and wherein the device is configured to pass current during normal current conditions, and to substantially block current during sustained overcurrent conditions.

As used herein, "blocking depletion" indicates that the transistor has moved into depletion beyond its threshold voltage ($V_{TH}$), and is substantially non-conductive between its source and its drain. To the extent that "depletion" can include a conductive state between the threshold or pinch-off voltage and the beginning of enhancement mode behavior, such conductive state is excluded from "blocking depletion." The point of the present invention is to protect circuitry from harmful overcurrent conditions, and some embodiments accomplish that by placing certain transistors into blocking depletion mode.

Some embodiments of the present invention comprise at least two "primary" transistors in series with each other. That means the sources and the drains of two transistors are in electrical communication and imposed in the primary current path of the device, and those two transistors function to allow or block current through the device. That device is then placed in series in the circuit to be protected, allowing for the complete blockage of the current in some cases. Of course, more than two transistors can be used, if desired. Additionally, further transistors can be used in a device of the present invention for purposes other than directly allowing or blocking current. Moreover, those two transistors ultimately connect to two terminals, a first terminal and a second terminal. Those terminals can be used to impose the device comprising the at least two transistors into series electrical communication with the circuit to be protected.

It also can be said that in certain embodiments of the present invention, the two primary transistors are arranged so that their "blocking ends" are electronically closer to the first terminal, or the terminal of greater electrical potential in a DC-compatible device. For an n-channel transistor, the drain is the blocking end; for a p-channel transistor, the source is the blocking end. In the case of a symmetrical transistor, such as, for example a low-power p-channel JFET, either end of the transistor can be considered the blocking end.

Further embodiments of the present invention provide the voltage at the gate of one or both of the primary transistors is controlled such that the transistor is biased toward or into enhancement mode during normal current conditions. In some cases, both transistors are biased into enhancement mode during normal current conditions. In other cases, at least one transistor is biased into enhancement mode during normal current conditions. For those embodiments that do not rely on an auxiliary power source to bias the gates, the gates will have no bias if the device is "unplugged," or there is no current or potential in the circuit to be protected. In other words, the gate voltage is harvested from the potential drop from the first terminal to the second terminal.

Several embodiments provide that the voltage across the two transistors is monitored for an overcurrent event. In certain instances, the voltage across the two transistors will indicate that the current passing through the device will exceed a predetermined threshold. In some cases, the overcurrent event must be a sustained overcurrent event, which means the current passing through the device exceeds a predetermined threshold for a predetermined duration. Any suitable predetermined threshold can be chosen. The unsafe current level selected for the predetermined threshold can depend on any suitable factors, such as, for example, the normal expected current load for the circuit to be protected; the sensitivity of the components of the circuit to increased current; and the desired level of protection sought. For example, the predetermined threshold can be 1.5 times, two times, five times, 10 times, 50 times, or 100 times the normal expected current load for the circuit to be protected. For another example, the preselected threshold can be 500 mA, 1 A, 5 A, 10 A, 50 A, 100 A, 500 A, 1000 A, 10,000 A, or 100,000 A. For another example, the predetermined threshold can be expressed in terms of voltage, such as for example, 500 mV, 1 V, 5 V, 10 V, 50 V, 100 V, 500 V, 1000 V, 10,000 V, or 100,000 V. Normal current conditions, in some cases, can be considered to be current and/or voltage within the predetermined threshold(s). In other cases, normal current conditions can be considered to be current and/or voltage within the predetermined threshold(s), and the absence of a recent overcurrent condition. Similarly, overcurrent conditions exist when the current and/or voltage exceed the predetermined thresholds. Sustained overcurrent conditions exist when the current and/or voltage exceed those thresholds for a predetermined duration.

The predetermined duration can be any suitable length of time. In some cases, the purpose of requiring a duration of an overcurrent condition is to avoid blocking current due to relatively-harmless nuisance spikes that pose no real danger to the circuit to be protected. Suitable lengths of time for the predetermined duration include, but are not limited to, one millisecond, 5 ms, 10 ms, 100 ms, one second, five seconds, 10 seconds, 30 seconds, and one minute. Once an overcurrent event, or optionally a sustained overcurrent event, is detected, the device will block current through the device, in some embodiments. This is accomplished in several instances of the present invention by applying a voltage to the gates of the two primary transistors to drive those two transistors into blocking depletion mode to decrease their conductivity.

Similarly, still other embodiments allow the device to "reset" after an overcurrent event, so the device will resume passing current. Any suitable method of resetting the device can be used. Powering down the circuit to be protected, manually resetting the device, automatic resetting, or a combination thereof, can be used. In some cases, the device resets after the current that would flow through the device returns to a safe level. That safe level can be any suitable current, such as below the first preselected threshold or a second preselected threshold that is higher or lower than the first preselected threshold. Moreover, the device can reset after the current that would flow through the device returns to a safe level for a second predetermined duration. Suitable lengths of time for the second predetermined duration include, but are not limited to, one millisecond, 5 ms, 10 ms, 100 ms, one second, five seconds, 10 seconds, 30 seconds, and one minute. The current that would flow through the device can be determined from the voltage drop from the first terminal to the second terminal, in some cases. In other words, the device can be reset based on the voltage drop from the first terminal to the second terminal. Or, other instances provide that the device can be reset based on the voltage drop across the two or more primary transistors. The voltage at which the device resets can be any suitable voltage, such as, for example below a preselected reset voltage. Any suitable preselected reset voltage can be chosen, such as for example, 0 V, 500 mV, 1 V, 5 V, 10 V, 50 V, 100 V, 500 V, 1000 V, 10,000 V, or 100,000 V. Moreover, the resetting can be delayed for any suitable length of time, such as, for example, one millisecond, 5 ms, 10 ms, 100 ms, one second, five seconds, 10 seconds, 30 seconds, and one minute.

Further embodiments provide gate protection circuitry. Nonlimiting examples thereof appear in FIGS. 5-7, described below. Gate protection circuitry can be configured to limit gate voltages to predetermined ranges. Any suitable predetermined range can be used. In some cases, a suitable predetermined range does not exceed a certain voltage considered to be unsafe for the transistor(s) being protected. Certain instances provide a gate-to-source voltage that is no greater than about 1 V, about 10 V, about 50 V, about 100 V, or about 1000 V. It is to be appreciated that negative voltages also can be limited to a negative suitable predetermined range of a magnitude that is the same as or different from the predetermined range for positive voltages. The predetermined ranges for the first transistor, the second transistor, and any other transistor enjoying gate protection can be independently selected.

Certain embodiments of the present invention provide a device that requires no auxiliary power. This can be particularly advantageous, because such a device will tend to be more reliable than a device that requires its own power supply. Accordingly, some instances provide a device that is self-driven, that is, the device derives all of its power needs from the circuit to be protected. Further instances provide a device that has only two terminals. Such a device can be inserted in series with a circuit to be protected, and no further efforts need be undertaken to provide additional power to that device.

Additional embodiments of the present invention provide devices having at least two "primary" transistors, wherein both transistors are depletion mode, normally-on transistors. In some cases, the first transistor has a negative gate threshold characteristic. A negative gate threshold characteristic means that the pinch-off voltage for that transistor occurs below 0 V. In further cases, the second transistor has a positive gate threshold. A positive gate threshold characteristic means that the pinch-off voltage for that transistor occurs above 0 V. For example, the first transistor can be an n-channel, depletion mode, normally-on transistor, and the second transistor can be a p-channel, depletion mode, normally-on transistor. The first transistor has a first gate, a first drain, and a first source; the first drain would be in electrical communication with the first terminal. The second transistor has a second gate, a second drain, and a second source; the second drain would be in electrical communication with the second terminal. Under normal current conditions, and with a positive voltage drop from the first terminal to the second terminal, the potential at the first gate is less negative than it would be if the first gate were in direct electrical communication with the second drain. Also, the potential at the second gate would be less positive than it would be if the second gate were in direct electrical communication with the first drain. The potential at a gate is determined by the voltage difference of the gate minus the source. As can be appreciated, that difference can yield a positive or negative value. During a sustained overcurrent event, at least a portion of the voltage across the second transistor (second source to second drain) is applied to the first gate to drive it negative, thereby putting the first transistor into blocking depletion. Also, at least a portion of the voltage across the first transistor (first drain to first source) is applied to the second gate to drive it positive, thereby putting the second transistor into blocking depletion.

Additional instances of the present invention comprise gate drive circuitry. Any suitable gate drive circuitry can be used, such as, for example, one transistor as exemplified by transistor 1821 in FIG. 18. Another example provides two transistors in a totem pole driver stage configuration, such as exemplified by transistors 1121, 1122 in FIG. 11. Many other gate drive circuitries are possible, such as those known in the art for biasing the gates of various transistors. For example, active output, push-pull, complimentary pair, BJT totem pole, and MOSFET totem pole configurations can be mentioned. As used herein, "totem pole" indicates at least two transistors stacked on top of each other, electrically speaking, between a positive side and a negative side or ground (conventionally, between the positive rail and the negative rail or ground), and an output is obtained between the at least two transistors. A totem pole arrangement includes, for example, a pnp bipolar junction transistor and an npn bipolar junction transistor configured as emitter followers. The order of p-type and n-type transistors or zones thereof are not critical. The output of the totem pole arrangement can function as a current source or current sink.

Some instances of the present invention monitor and react to "good power," such as by employing "power good" circuitry within the device. As used herein, power is "good" if the voltage drop from first terminal to second terminal and/or the voltage stored in any voltage storage/generation circuitry is not dangerously high or uselessly low, according to suitable predetermined thresholds. Any suitable thresholds can be used. The upper threshold for good power can correspond to the threshold for triggering blocking mode, in some instances. In other instances, the upper threshold can be greater than or less than the predetermined threshold for triggering blocking mode. The lower threshold in certain instances refers to the minimum power requirement for the device to function properly. Devices may require, for example, at least about 0.005 V, about 0.01 V, about 0.05 V, about 0.10 V, about 0.50 V, about 1 V, about 5 V, about 10 V, about 20 V, about 30V, or about 50V, to operate, or to have "good power."

An example device comprising two depletion-type transistors can be described as follows. The first transistor is an n-channel, depletion mode, normally-on transistor, in this example. The second transistor is a p-channel, depletion mode, normally-on transistor. Both transistors are configured to operate substantially in diode mode under normal current conditions. Diode mode means that a transistor's gate is in electrical communication with its own drain, so the potential at both the gate and the drain are the same. Accordingly, the first gate is in electrical communication with the first drain, and the second gate is in electrical communication with the second drain during normal current conditions. The first drain is in electrical communication with the first terminal, and the second drain is in electrical communication with the second terminal. During a sustained overcurrent event, the first gate is now placed at the potential of the second drain, and so the potential across the second transistor drives the potential at the first gate negative, placing the first transistor into blocking depletion. Similarly, and in some cases simultaneously, the second gate is placed at the potential of the first drain, and so the potential across the first transistor drives the potential at the second gate positive, placing the second transistor into blocking depletion. This example device can be a two-terminal device requiring no auxiliary power to control the primary transistors. Optionally, additional circuitry within the device protects the first gate and/or the second gate, capping the potentials at those two gates and thereby protecting the transistors.

Further embodiments of the present invention provide devices having at least two primary transistors, wherein one transistor is a depletion mode, normally-on transistor, and another transistor is an enhancement mode, normally-off transistor. For example, the first transistor can be a depletion mode transistor having a negative gate threshold characteristic. Under normal current conditions with a positive voltage drop from the first terminal to the second terminal, the voltage at the first gate is less negative than it would be if the first gate were driven by the entire potential drop across the second transistor. That is, the example device in those circumstances would see a voltage at the first gate that is less negative than if the entire potential difference between the second source and the second drain appeared at the first gate. The potential at a gate is determined by the voltage drop from the gate to the source. Under a sustained overcurrent condition, at least a portion of the voltage drop across the second transistor would drive the potential at the first gate negative, putting the first transistor into blocking depletion. Alternatively, if the second transistor is the depletion mode transistor, it would have a positive gate threshold characteristic, and under normal current conditions with a positive voltage drop from the first terminal to the second terminal, the voltage at the second gate is less positive than it would be if the second gate were driven by the entire potential drop across the first transistor. That is, the example device in those circumstances would see a voltage at the second gate that is less positive than if the entire potential difference between the first drain and the first source appeared at the second gate. Under a sustained overcurrent condition, at least a portion of the voltage drop across the first transistor would drive the potential at the second gate positive, putting the second transistor into blocking depletion.

An example device comprising one depletion mode transistor and one enhancement-mode transistor can be described as follows. The first transistor is an n-channel, depletion mode, normally-on transistor. The second transistor is an n-channel, enhancement mode, normally-off transistor. Both transistors are arranged so that the drains are electrically closer to the first terminal then to the second terminal (that is, the blocking ends are oriented towards the first terminal). The voltage across the two transistors is multiplied, and under normal current conditions, the voltages at the first gate and the second gate are driven positive by the multiplied voltage, thereby putting the first transistor and the second transistor deeply into enhancement. During a sustained overcurrent event, the potential at the first gate is driven negative by switching it to the second source, so the voltage across the second transistor now causes the first transistor to enter blocking depletion. The second gate is placed in electrical communication to the second source, thereby reducing the potential at the second gate to 0 V, placing the second transistor into blocking depletion. Optionally, additional circuitry within the device protects the first gate and/or the second gate, capping the potentials at those two gates and thereby protecting the transistors.

As used herein, Vgs=gate-to-source voltage, Vds=drain-to-source voltage, and $V_{TH}$=threshold voltage.

Some embodiments of the present invention provide a transistor operating substantially in enhancement mode during normal current conditions. If the transistor is an enhancement mode transistor, this means that the gate to source voltage in enhancement mode is of the same polarity as the threshold voltage (Vth) of that transistor. If the transistor is a depletion mode transistor, this means that the gate to source voltage in enhancement mode is opposite in polarity compared to the polarity of $V_{TH}$. For example, enhancement mode for an n-channel enhancement metal oxide semiconductor field-effect transistor ("MOSFET") is achieved when Vgs is positive, so it is of the same polarity as $V_{TH}$. For an n-channel depletion MOSFET enhancement mode is achieved when Vgs is positive and that is of opposite polarity as $V_{TH}$. So for a fixed Vds, a transistor operating in enhancement mode will exhibit significantly lower impedance between its drain and source than would be exhibited in depletion mode. For a transistor to be considered fully enhanced, or fully in enhancement mode, the gate to source voltage must reach a sufficient magnitude and be of the correct polarity, call it Vfull. Certain embodiments provide that a transistor operating substantially in enhancement mode is fully in enhancement mode. In other cases, operating substantially in enhancement mode means that Vgs is at least 99%, 90%, 80%, 50%, 25%, 10%, 1%, or 0.1% of Vfull. Similarly, some embodiments of the present invention provide a transistor operating in blocking depletion mode. For an enhancement mode transistor, this means that the gate to source is of the opposite polarity as the threshold voltage of that transistor ($V_{TH}$), or that the gate to source voltage is substantially equal to zero. If the transistor is instead a depletion mode transistor, this means that the gate to source voltage is of the same polarity as $V_{TH}$. For a depletion mode transistor to substantially block all current flowing between its drain and source, the transistor gate must be driven close to or beyond $V_{TH}$.

A transistor is in series in the primary current path if current flowing between a first terminal and a second terminal of a device would flow through the transistor, namely between its drain and its source. For transistors employed in an alternating current environment, a transistor is in series in the primary current path if current flowing between a first terminal and a second terminal of a device would flow through the transistor during at least one of the positive cycle and the negative cycle.

Among the various embodiments of the present invention, various components such as transistors, resistors, diodes, zener diodes, capacitors, and the like can be used. Any suitable components can be used, such as, for example, those components already known in the art. Among transistors, field effect transistors including JFETs, GaN FETs, depletion-mode MOSFETs, and enhancement-mode MOSFETs, may be mentioned, as well as bipolar junction transistors, in addition to combinations of any of the foregoing.

Some devices according to the present invention are adapted to protect direct current circuits. Other devices are adapted to protect alternating current circuits. Still other devices can be employed in direct current or alternating current circuits. Still other devices, for example a device designed for direct current protection, can be employed in an alternating current circuit by adding an appropriate rectifier so the components of the device receive the proper polarity. In still other embodiments, two devices can be employed in such a manner so that one device protects the circuit under positive polarity conditions, and the second device protects the circuit under negative polarity conditions.

Certain instances of the present invention provide a device wherein the first drain is in electrical communication with the first terminal; wherein the first source is in electrical communication with the second source; and wherein the second drain is in electrical communication with the second terminal. Other instances provide a device wherein the first transistor and the second transistor are similarly aligned toward the first terminal; and wherein the first transistor is arranged closer to the first terminal, and the second transistor is closer to the second terminal. When two transistors are similarly aligned, that means that the blocking ends as described above are electronically oriented in the same direction. In some cases, that means the drain of an n-channel transistor is electrically closer to the first terminal, while the source of a p-channel transistor is electrically closer to the first terminal as well.

Further instances relate to a device wherein the first drain is in series electrical communication with the first terminal. Other instances provide a device wherein the second drain is in series electrical communication with the second terminal. Additional instances relate to a device wherein the first transistor comprises a depletion type transistor or an enhancement type transistor. Other instances relate to a device wherein the second transistor comprises a depletion type transistor or an enhancement type transistor. Some instances of the present invention provide a device wherein the first transistor has a negative gate threshold characteristic or a positive gate threshold characteristic. Other instances relate to a device wherein the second transistor has a negative gate threshold characteristic or a positive gate threshold characteristic. Still other instances relate to a device wherein the first transistor has a first majority carrier characteristic that is n-type or p-type. Further instances provide a device wherein the second transistor has a second majority characteristic that is p-type or n-type. Certain cases involve a device wherein the first transistor is an n-channel depletion mode transistor. Additional cases relate to a device wherein the second transistor is a p-channel depletion mode transistor. Other cases provide a device that is a 2-terminal device. Still other cases relate to a device configured to operate without any auxiliary power supply.

Devices that embody various aspects of the present invention can be manufactured according to any suitable method. Devices can comprise discrete components, or those components can be manufactured together in an integrated circuit. Or, a combination of integrated circuitry and discrete components can be used. Some methods of manufacturing a device according to the present invention comprise assembling the components so that there is or can be electrical communication between the various components.

Devices of the present invention can be used in any suitable manner. In some cases, a method of protecting a circuit from sustained overcurrent conditions comprises placing a device as described herein in series electrical communication in the primary current path of the circuit to be protected. Other methods of using one or more devices of the present invention employ those devices to protect only part of the circuit, such as for example, a portion of a circuit in parallel electrical communication with another portion of the circuit. In that case, a device can be placed in series with that portion of the circuit to be protected. Optionally, another device can be used to protect another portion of that circuit. Still further embodiments provide more than one device of the present invention protecting a circuit.

DETAILED DESCRIPTION OF THE DRAWINGS

Further embodiments of the present invention can be described by reference to the accompanying drawings. The same reference number across different figures is intended to reference the same or a similar item in each such figure. Not every item is labeled in every figure for ease of viewing and understanding.

Figure 2:
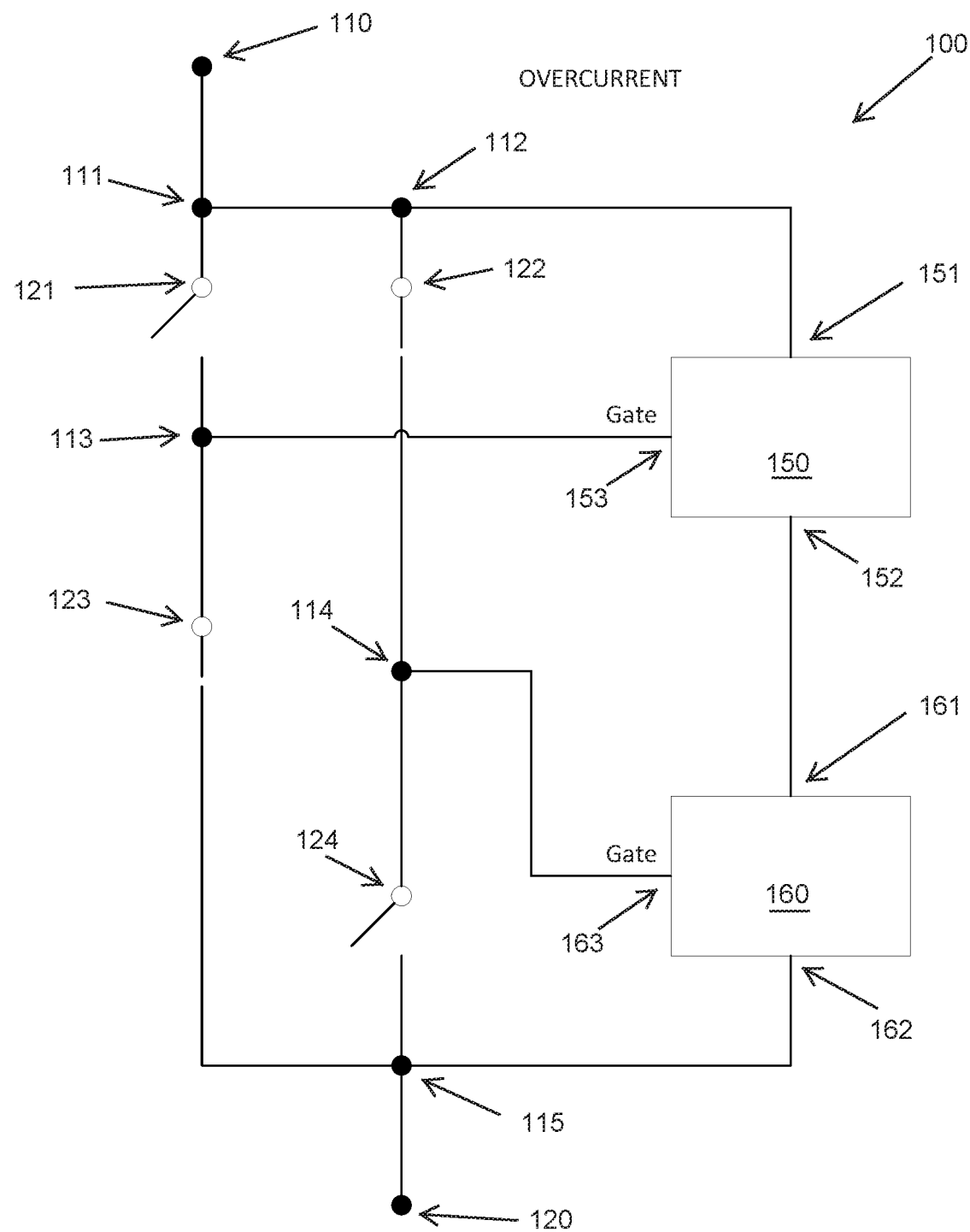
FIG. 2 conceptually depicts the embodiment appearing in FIG. 1 configured to block current during overcurrent conditions.

FIG. 1 conceptually depicts one embodiment of the invention comprising two transistors configured to pass current under normal current conditions. FIG. 2 conceptually depicts the embodiment appearing in FIG. 1 configured to block current under overcurrent conditions. Device 100 comprises a first terminal 110 and a second terminal 120. First transistor 150 is in series with a second transistor 160. Pin 151 of first transistor 150 is in electrical communication with the first terminal 110. Pin 162 of second transistor 160 is in electrical communication with the second terminal 120. First transistor 150 also has first gate 153; second transistor 160 has second gate 163. Pin 152 from first transistor 150 is in electrical communication with pin 161 of second transistor 160.

FIG. 1 shows device 100 configured for normal current conditions. If first terminal 110 has a positive potential relative to the second terminal 120, the circuit proceeds from first terminal 110 to connection 111. Switch 121 is closed, so that first gate 153 is in electrical communication with the first terminal 110 through connection 113. First terminal 110 is also in electrical communication with pin 151 via connection 112. Switch 123 is open so that, in combination with closed switch 121, the potential at gate 153 is close to the potential at pin 151 of the first transistor 150. Switch 124 is closed, so that second gate 163 is in electrical communication with the second terminal 120 through connection 115. Second terminal 120 is also in electrical communication with pin 162 via connection 115. Switch 122 is open so that, in combination with closed switch 124, the potential at gate 163 is close to the potential at pin 162. If the first terminal 110 has a potential more positive than the potential at the second terminal 120, the potential difference between first gate 153 and pin 152 will be a positive quantity. If the first terminal 110 has a potential more positive than the potential at the second terminal 120, the potential difference between second gate 163 and pin 161 will be a negative quantity. In this way, first transistor 150 and second transistor 160 are configured to be driven into enhancement mode during normal current conditions. If either first transistor 150 or second transistor 160 are suitable enhancement mode transistors, then they are driven to allow current between first terminal 110 in second terminal 120. If either first transistor 150 or second transistor 160 are suitable depletion mode transistors, then they are driven to be more efficient. In this way, first transistor 150 and second transistor 160 are configured to allow current between first terminal 110 in second terminal 120 during normal current conditions. Switches 121, 122, 123, 124 can be any suitable switches, such as for example any suitable transistors. They may be normally on or normally off devices. They may be n or p-channel devices. They may be: MOSFETs, JFETs, or bipolar junction transistors. They may be any device with negative differential resistance such as: lambda diodes, or thyristors. Solely to encourage an understanding of the invention, they are shown as switches in FIGS. 1 and 2.

When the device 100 detects an overcurrent condition, switches 121 and 124 open, while switches 122 and 123 close. First gate 153 is now in electrical communication with the second terminal 120, while second gate 163 is now in electrical communication with the first terminal 110. If the first terminal 110 has a potential more positive than the potential at the second terminal 120, the potential at first gate 153 will be lower than pins 152 and 161 so that the potential difference between gate 153 and pin 152 is negative and also so that the voltage drop between 161 and 162 is driving said difference between pins 153 and 152. Again, if the first terminal 110 has a potential more positive than the potential at the second terminal 120, the potential at the second gate will be higher than pins 161 and 152 so that the potential difference between gate 163 and pin 161 is positive and also so that the voltage drop between pin 151 and pin 152 is driving said difference between pins 161 and 152. In this way, first transistor 150 and second transistor 160 are configured to enter blocking depletion mode and block current between first terminal 110 in second terminal 120 during an overcurrent condition.

The first transistor 150 and the second transistor 160 can be any suitable transistor. For example, first transistor 150 can be an n-channel depletion transistor, or any negative gate threshold characteristic, normally-on transistor. That would make pin 151 the first drain and pin 152 the first source of first transistor 150. In that example, the second transistor 160 can be a p-channel depletion transistor, or any positive gate threshold characteristic, normally-on transistor. That would make pin 161 the second source and pin 162 the second drain of second transistor 160.

In an alternative example, first transistor 150 can be an n-channel depletion transistor, or any negative gate threshold characteristic, normally-on transistor. Pin 151 would be the first drain, and pin 152 would be the first source of first transistor 150. Second transistor 160 can be a p-channel enhancement transistor, or any negative gate threshold characteristic, normally-off transistor. Pin 161 would be the second source, and pin 162 would be the second drain, in that example. Using the conceptual circuit shown in FIGS. 1 and 2, if the second transistor 160 is a normally-off type, then it cannot be fully-on during normal current conditions.

In a further alternative example, first transistor 150 can be an n-channel enhancement transistor, or any positive gate threshold characteristic, normally-off transistor. Pin 151 would be the first drain, and pin 152 would be the first source of first transistor 150. Second transistor 160 can be a p-channel depletion transistor, or any positive gate threshold characteristic, normally-on transistor. Pin 161 would be the second source, and pin 162 would be the second drain, in that example.

In another alternative example, first transistor 150 can be an n-channel, depletion transistor, or any negative gate threshold characteristic, normally-on transistor. Pin 151 would be the first drain, and pin 152 would be the first source of first transistor 150. Second transistor 160 can be an n-channel enhancement transistor, or any positive gate threshold characteristic, normally-off transistor. Pin 161 would be the second drain, and pin 162 would be the second source, in that example.

FIG. 3 conceptually depicts another embodiment of the invention comprising two transistors configured to pass current under normal current conditions. FIG. 4 conceptually depicts the embodiment appearing in FIG. 3 configured to block current under overcurrent conditions. Device 300 comprises a first terminal 310 and a second terminal 320. First transistor 350, via pin 352, is in series electrical communication with the second transistor 360, via pin 361. Pin 351 places first transistor 350 in electrical communication with the first terminal 310 via connection 311. Pin 362 places second transistor 360 in electrical communication with the second terminal 320 via connection 313. During normal current conditions, first terminal 310 is in electrical communication with first gate 353 of first transistor 350 and second gate 363 of second transistor 360 via connections 311 and 312, because switch 321 is closed and switch 322 is open (FIG. 3). When a sustained overcurrent condition is detected (FIG. 4), switch 321 opens and switch 322 closes, so first gate 353 and second gate 363 are in electrical communication with the second terminal 320 via connection 313.

Any suitable transistors can be used in device 300. For example, first transistor 350 can be an n-channel depletion transistor or any negative threshold characteristic, normally-on transistor. Pin 351 would be the first drain, and pin 352 would be the first source. Second transistor 360 can be an n-channel enhancement transistor or any positive gate threshold characteristic, normally-off transistor. Pin 361 would be the second drain and pin 362 would be the second source. In this case, because both first transistor 350 and second transistor 360 are n-channel transistors, their "blocking ends," their drains, are oriented closer to first terminal 310 than to second terminal 320. Moreover, both transistors 350, 360 are similarly aligned.

In an alternative example, device 300 comprises first transistor 350 as a p-channel enhancement transistor, or any negative gate threshold characteristic, normally-off transistor. Pin 351 would be the first source, and pin 352 would be the first drain. Second transistor 360 in this example is a p-channel depletion transistor, or any positive gate threshold characteristic, normally-on transistor. Pin 361 would be the second source, and pin 362 would be the second drain for second transistor 360. Because both first transistor 350 and second transistor 360 in this example are p-channel transistors, their "blocking ends," their sources, are oriented closer to first terminal 310 than the second terminal 320. Moreover, both transistors 350, 360 are similarly aligned. Notably, FIG. 4 would depict the arrangement of switches 321, 322 during normal current conditions, and FIG. 3 would depict the arrangement of those switches during overcurrent conditions, in this alternative example.

Figure 5:
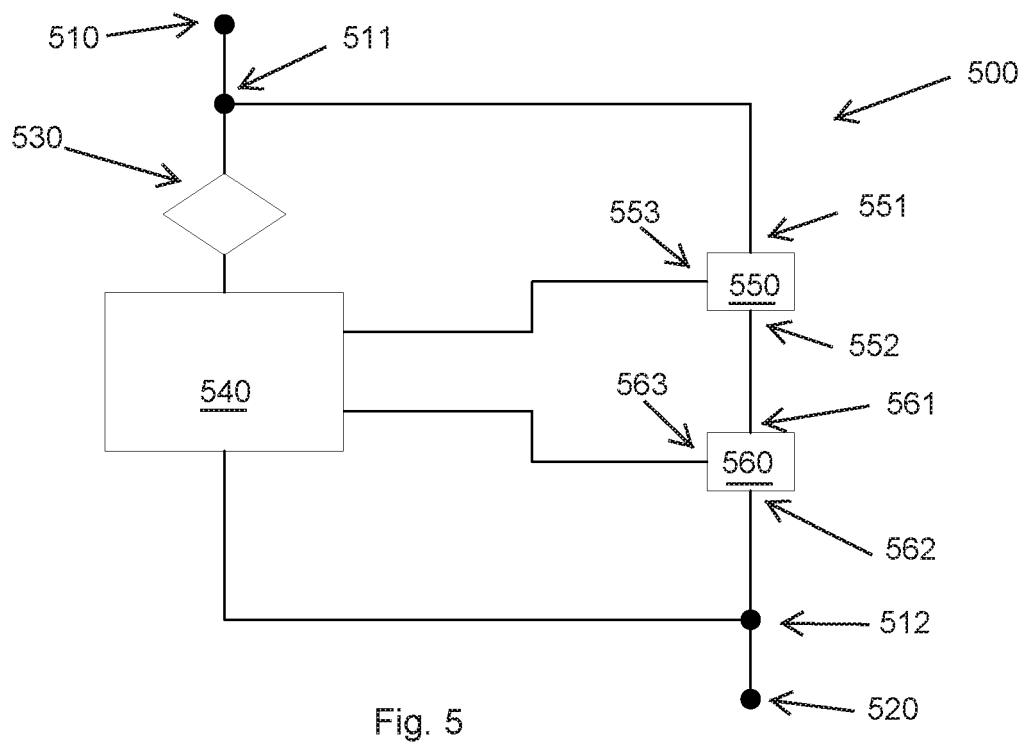
FIG. 5 conceptually depicts an embodiment comprising gate protection circuitry.

FIG. 5 conceptually depicts an embodiment comprising gate protection circuitry. Device 500 comprises first terminal 510 and second terminal 520, along with first transistor 550 and second transistor 560. Gate drive circuitry 540, analogous to the switches shown in FIGS. 1-4, are in electrical communication with first gate 553 on first transistor 550, and second gate 563 on second transistor 563. First terminal 510 is in electrical communication with gate drive circuitry 540 and first transistor 550 via connection 511. Second terminal 520 is in electrical communication with gate drive circuitry 540 and second transistor 560 via connection 512. If first transistor 550 is an n-channel transistor, pin 551 is the first drain while pin 552 is the first source. Alternatively, if first transistor 550 is a p-channel transistor, pin 551 is the first source while pin 552 is the first drain. Similarly, if second transistor 560 is an n-channel transistor, pin 561 is the second drain while pin 562 is the second source. Alternatively, if second transistor 560 is a p-channel transistor, pin 561 is the second source while pin 562 is the second drain. In this way, both first transistor 550 and the second transistor 560 have their blocking ends oriented towards first terminal 510, and are similarly aligned. Gate protection circuitry 530 is in series electrical communication between connection 511 and gate drive circuitry 540, and is designed to limit the voltage appearing at first gate 553 and second gate 563. Gate protection circuitry also protects gate drive circuitry 540 if gate drive circuitry 540 does not have its own protective circuitry. Any suitable gate protection circuitry can be used as gate protection circuitry 530. Moreover, it should be appreciated that gate drive circuitry 540, like many components, can perform more than one function.

Figure 6:
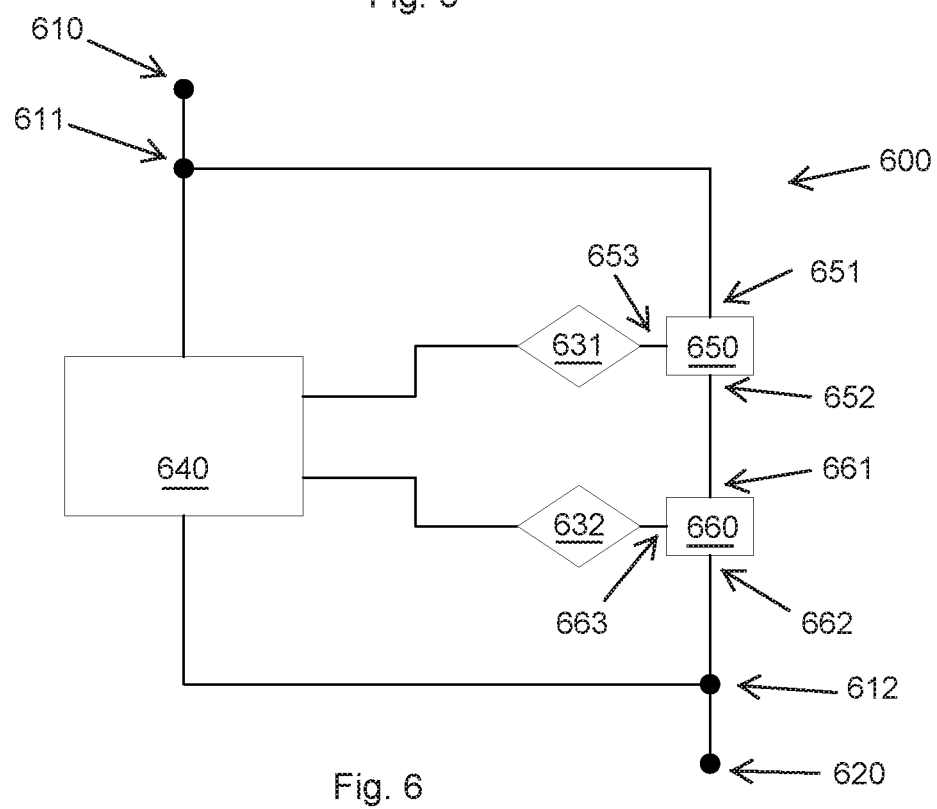
FIG. 6 conceptually depicts another embodiment comprising gate protection circuitry.

FIG. 6 conceptually depicts another embodiment comprising gate protection circuitry. Device 600 comprises first terminal 610 and second terminal 620, along with first transistor 650 and second transistor 660. Gate drive circuitry 640, analogous to the switches shown in FIGS. 1-4, are in electrical communication with first gate 653 on first transistor 650, and second gate 663 on second transistor 663. Gate drive circuitry 640, like many components, can perform more than one function in a circuit. First terminal 610 is in electrical communication with gate drive circuitry 640 and first transistor 650 via connection 611. Second terminal 620 is in electrical communication with gate drive circuitry 640 and second transistor 660 via connection 612. If first transistor 650 is an n-channel transistor, pin 651 is the first drain while pin 652 is the first source. Alternatively, if first transistor 650 is a p-channel transistor, pin 651 is the first source while pin 652 is the first drain. Similarly, if second transistor 660 is an n-channel transistor, pin 661 is the second drain while pin 662 is the second source. Alternatively, if second transistor 660 is a p-channel transistor, pin 661 is the second source while pin 662 is the second drain. In this way, both first transistor 650 and the second transistor 660 have their blocking ends oriented towards first terminal 610, and are thereby similarly aligned. Gate protection circuitry 631 is in electrical communication between gate drive circuitry 640 and first gate 653, and is designed to limit the voltage appearing at first gate 653 and prevent overcurrent to first gate 653. Gate protection circuitry 632 is in electrical communication between gate drive circuitry 640 and second gate 663, and is designed to limit the voltage appearing at second gate 663 and prevent overcurrent to second gate 663. Any suitable gate protection circuitry can be used as gate protection circuitry 631 and 632.

Figure 7:
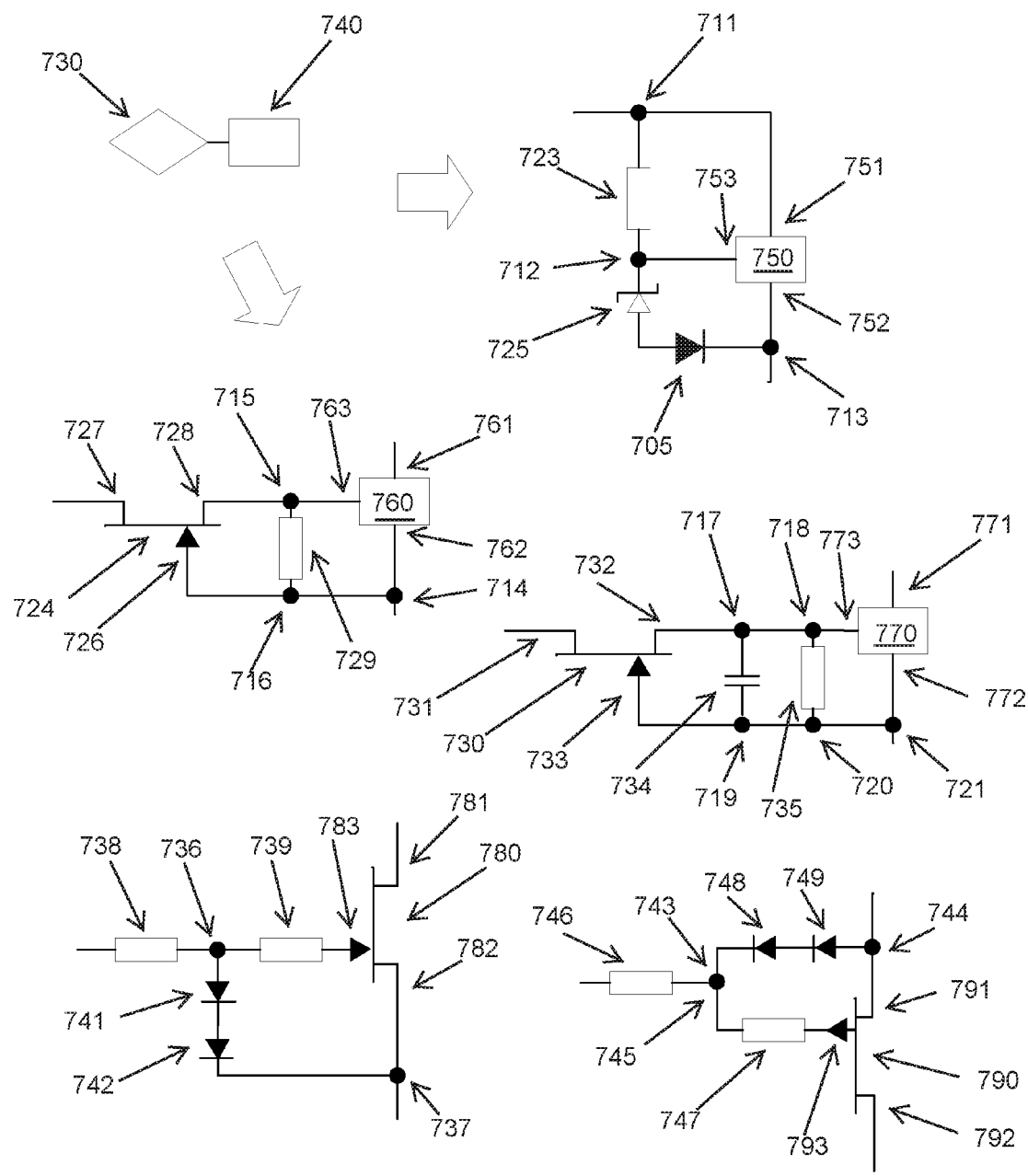
FIG. 7 illustrates several embodiments of gate protection circuitry.

FIG. 7 illustrates several embodiments of gate protection circuitry. Schematically-shown gate protection circuitry 730 and transistor 740 can be exemplified by the several partial circuits protecting the gates of transistors 750, 760, 770, 780, and 790, respectively. Transistor 750 is in electrical communication via pin 751 with connection 711, and via pin 752 with connection 713. The gate 753 connects via connection 712 with resistor 723 to connection 711, and zener diode 725 and diode 705 to connection 713. Selection of zener diode 725 with the desired zener voltage allows control over the voltage seen at gate 753. Adjusting the magnitude of the resistance of resistor 723 allows control over the currents through the zener diode 725 and through the gate 753. Diode 705 protects against negative surges from connection 713. Accordingly, some embodiments provide gate protection for a transistor comprising a resistor in electrical communication between a first pin and the gate, and a zener diode and a diode between the gate and a second pin.

Alternatively, primary transistor 760 having a pin 761 ultimately connecting to first terminal (not shown) and pin 762 ultimately connecting to second terminal (not shown) via connection 714 can employ transistor 724 connected by source 728 to gate 763. Drain 727 connects to gate drive circuitry (not shown). Here, transistor 724 is an n-channel depletion mode transistor with its gate 726 ultimately connecting to second terminal (not shown). Resistor 729 appears between connections 715, 716, and is chosen to have a low enough impedance to allow transistor 724 to reliably maintain a voltage less than or equal to its threshold voltage across it. Transistor 724 protects gate 763 against positive currents and voltages. If source 728 is at a higher potential than gate 726 connected to connection 714, then the voltage difference between gate 763 and source 762 is limited to approximately that of the threshold voltage of the transistor 724. Similarly, if source 728 is at a higher potential than gate 726 connected to pin 714, then the current through transistor 724 and through gate 763 is limited to that specified on transistor 724's characteristic curves. Other embodiments relate to gate protection circuitry for a transistor to be protected comprising a gate-protecting n-channel depletion mode transistor having its source and gate in parallel electrical communication with a resistor, in turn the resistor being in parallel electrical communication with the gate and a pin of the transistor to be protected.

Another alternative partial circuit protects gate 773 of primary transistor 770. Pin 771 ultimately connects to first terminal (not shown) and pin 772 ultimately connects to second terminal (not shown) via connection 721. This partial circuit employs transistor 730 connected by source 732 to gate 773 via connections 717, 718. Drain 731 connects to gate drive circuitry (not shown). Here, transistor 730 is an n-channel depletion mode transistor with its gate 733 ultimately connecting to second terminal (not shown) via connections 719, 720, 721. Capacitor 734, between connections 717 and 719, and resistor 735, between connections 718 and 720 further protect gate 773, since capacitor 734 acts as a bypass capacitor and allows initial current surges to flow through it instead of gate 773. Still other embodiments relate to gate protection circuitry for a transistor to be protected comprising a gate-protecting n-channel depletion mode transistor having its source and gate in parallel electrical communication with a resistor, and in parallel electrical communication with a capacitor, in turn the resistor and the capacitor being in parallel electrical communication with the gate and a pin of the transistor to be protected.

In a further alternative, primary transistor 780, being an n-channel depletion mode, normally-on transistor, has drain 781 connecting ultimately to first terminal (not shown) and source 782 connecting ultimately to second terminal (not shown) via connection 737. Gate 783 is protected by resistors 738, 739 which are joined at connection 736. Resistor 738 limits current through gate 783 and diodes 741, 742 between connection 736 and 737. Resistor 739 has its voltage limited by diodes 741, 742, thereby limiting current to gate 783. Thus, still other embodiments relate to gate protection circuitry for a transistor to be protected comprising two resistors in electrical communication with the gate of the transistor to be protected, wherein the resistors are divided by a connection point having one, two, or three diodes in electrical communication with the source of the transistor to be protected. The partial circuit involving transistor 790 provides another example of this.

P-channel, depletion mode, normally-on transistor 790 has a source 791 ultimately connecting with first terminal (not shown) via connection 744. Drain 792 ultimately connects with second terminal (not shown). Gate 793 is in electrical communication with resistors 746, 747, which are divided at connection 743. From connection 743, two diodes 748, 749 connect to connection 744. Note the diodes 741, 742 and diodes 748, 749, are each oriented to limit voltage, and thereby with resistors 746,747, limit the current, to gate 793.

Figure 8:
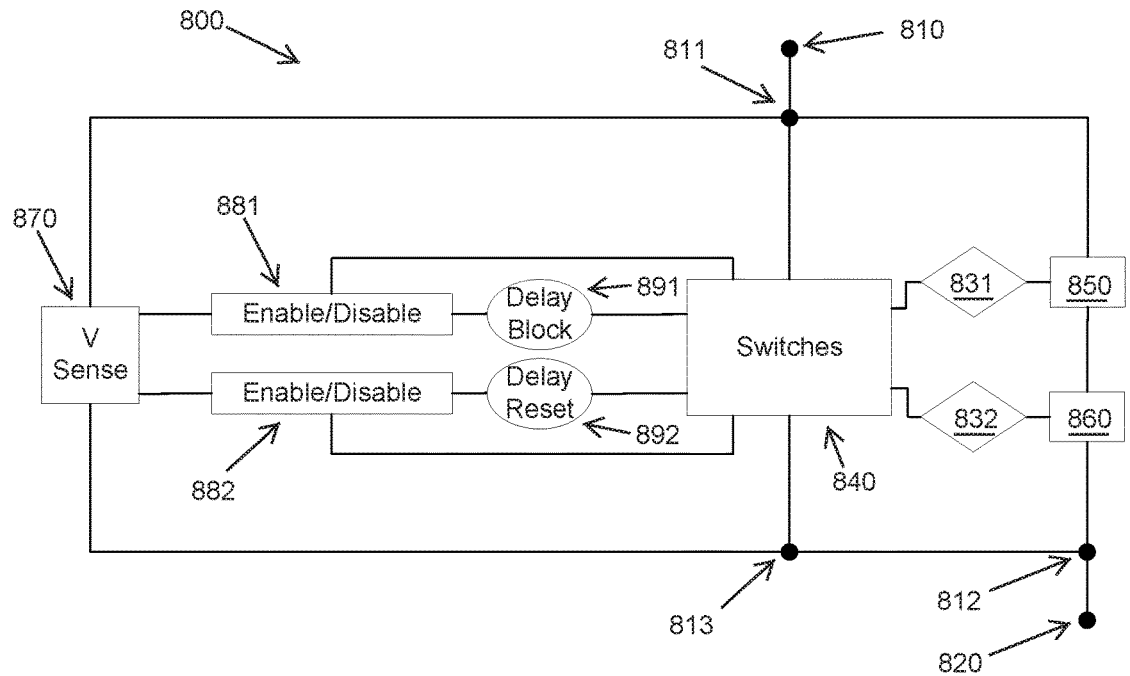
FIG. 8 conceptually depicts a further embodiment comprising timing circuitry designed to delay blocking of current at the onset of a sustained overcurrent condition, and to delay the resetting of the device to allow the passage of current at the conclusion of a sustained overcurrent condition.

FIG. 8 conceptually depicts a further embodiment comprising timing circuitry designed to delay blocking of current at the onset of a sustained overcurrent condition, and to delay the resetting of the device to allow the passage of current at the conclusion of a sustained overcurrent condition. Device 800 comprises first terminal 810 and second terminal 820, and the circuit protection circuitry between connections 811 and 812. Primary transistors 850 and 860 are configured to allow current to flow from first terminal 810 to second terminal 820 during normal current conditions, and to block current during a sustained overcurrent condition. Voltage sensor circuitry 870 measures the voltage between connections 811 and 812, and thereby monitors the voltage drop across first transistor 850 and second transistor 860. Under normal current conditions, gate drive circuitry 840, analogous to the switches shown in FIGS. 1-4, control the gates of first transistor 850 and second transistor 860 using the voltages at connections 811 and 813 at least in part, placing first transistor 850 and second transistor 860 substantially in enhancement. Gate drive circuitry 840, like many components, can perform more than one function in the device. Gate protection circuitry 831, 832 protect the gates of first transistor 850 and second transistor 860, respectively.

Gate drive circuitry 840 electrically relays information to the enabling blocking circuitry 881 to indicate whether device 800 is currently blocking or in normal, conducting mode. With this electrically stored information, enabling blocking circuitry 881 interprets the input from the voltage sensor circuitry 870. If normal mode is the present state, the enabling blocking circuitry 881 interprets the signal output from the voltage sensor circuitry 870 as representative of current levels. If, in normal mode, enabling blocking circuitry 881 receives a signal from gate drive circuitry 840 and voltage sensor circuitry 870 indicating an overcurrent exists, the delay block timer circuitry 891 is enabled. Once enabled, delay block timer circuitry 891 times the duration of the overcurrent and electrically communicates the status of the timing with gate drive circuitry 840. Once a first sufficient interval of time has elapsed the gate drive circuitry 840 appropriately switches the gates of first transistor 850 and second transistor 860 so that transistors 850 and 860 enter blocking depletion mode and substantially cease conduction; thus entering blocking mode. Once in blocking mode, gate drive circuitry 840 electrically communicates this information to the enabling blocking circuitry 881, and to the enabling reset circuitry 882, In this blocking state, enabling blocking circuitry 881 electrically communicates to the delay block timer circuitry 891 to either: ignore inputs from voltage sensor circuitry 870, or disable/reset its timing feature. Like enabling blocking circuitry 881, enabling reset circuitry 882 also receives electrical input from both control circuit 840 and voltage sensor circuitry 870 and uses the input from gate drive circuitry 840 to appropriately respond to, or interpret, the electrical information coming from voltage sensor circuitry 870. During blocking mode, if enabling reset circuit 882 receives electrical input from both gate drive circuitry 840 and voltage sensor circuitry 870 indicating that a dangerously high voltage is being blocked, the enabling reset circuitry 882 resets the delay reset timer circuitry 892. During blocking mode, if enabling reset circuitry 882 receives electrical input from both gate drive circuitry 840 and voltage sensor circuitry 870 indicating a lower safe voltage is being blocked, the enabling reset circuitry 882 enables the delay reset timer circuitry 892 which begins timing. Delay reset timer circuitry 892 electrically communicates the result of timing to gate drive circuitry 840. When a second sufficient interval of time has elapsed in the delay reset timer circuitry 892, the gate drive circuitry 840 appropriately switches the gates of first transistor 850 and second transistor 860 so that transistors 850 and 860 enter into conduction, or normal mode, once again. Both timers in timer circuitry 891 and 892 are also reset at this stage.

When an overcurrent condition initiates, voltage sensor circuitry 870 electrically communicates with enabling blocking circuitry 881. If the overcurrent condition persists for a suitable predetermined duration, gate drive circuitry 840 adjusts the voltages at the gates of first transistor 850 and second transistor 860, placing first transistor 850 and second transistor 860 into blocking depletion. During the sustained overcurrent condition, current between first terminal 810 and second terminal 820 is blocked. When the sustained overcurrent condition begins to subside, voltage sensor circuitry 870 electrically communicates with enabling reset circuitry 882. If the safe current or normal current conditions persist for a suitable predetermined duration, gate drive circuitry 840 adjusts the voltages at the gates of first transistor 850 and second transistor 860, placing first transistor 850 and second transistor 860 substantially into enhancement. Current begins to flow again between the first terminal 810 and second terminal 820. Any suitable voltage sensor circuitry 870, enabling blocking circuitry 881, enabling reset circuitry 882, timing circuitry 891, 892, gate drive circuitry 840, gate protection circuitry 831, 832, and first transistor 850 and second transistor 860 can be used.

Figure 9:
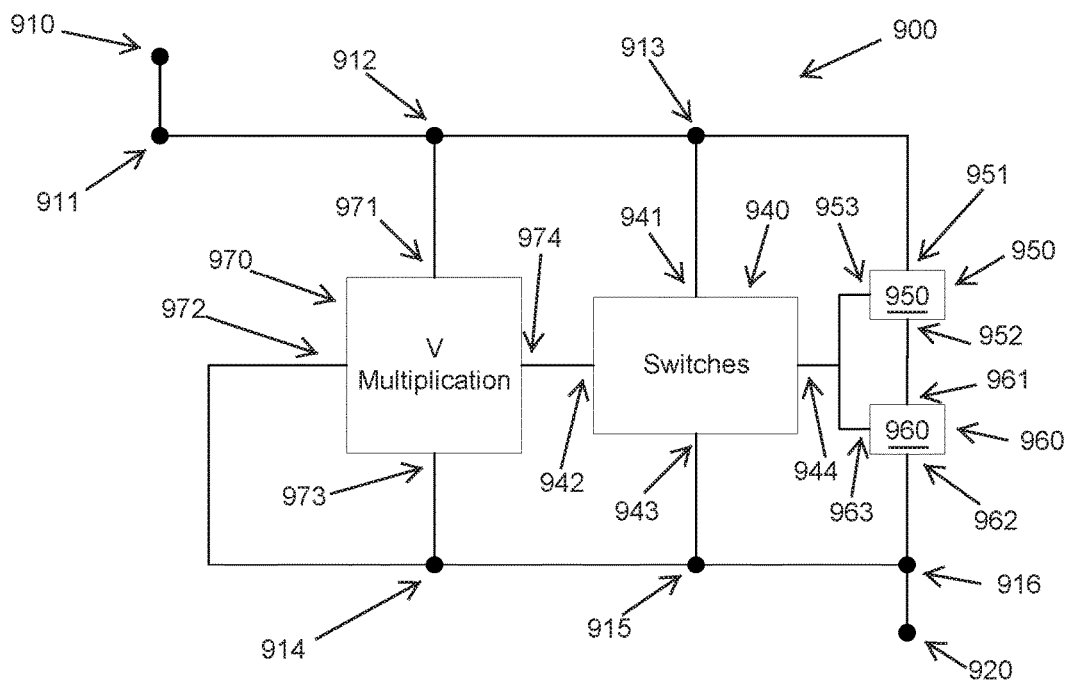
FIG. 9 conceptually depicts an embodiment comprising two transistors employing voltage multiplication.

FIG. 9 conceptually depicts an embodiment comprising two transistors employing voltage multiplication. Device 900 comprises first terminal 910 and second terminal 920. Connections 911, 912, 913 provide electrical communication between first terminal 910, voltage multiplication circuitry 970, gate drive circuitry 940, and the primary transistors 950, 960, respectively. Primary first transistor 950 is in series electrical communication with primary second transistor 960 via pins 952 and 961, respectively. Pin 951 connects first transistor 950 ultimately to first terminal 910. Connections 914, 915, 916 provide electrical communication between voltage multiplication circuitry 970, gate drive circuitry 940, and the primary transistors 950, 960, respectively.

Pin 971 provides positive voltage input, while pin 973 provides negative voltage input for voltage multiplication circuitry 970; also, pin 972 provides negative voltage output, while pin 974 provides positive voltage output. Any suitable voltage multiplication circuitry can be used as voltage multiplication circuitry 970. This component increases the voltage sensed across the primary transistors 950, 960, so that the primary transistors can be placed fully on or fully off, as the need may be. This accounts for variability in threshold voltages due to manufacturing anomalies.

Pin 941 provides positive voltage input, while pin 943 provides negative voltage input to gate drive circuitry 940. Pin 942 receives multiplied voltage input from the voltage multiplication circuitry 970 to the gate drive circuitry 940, and pin 944 controls the gate voltage at first gate 953 and second gate 963.

The primary transistors 950, 960 can be any suitable transistors. For example, first transistor 950 can be an n-channel, depletion mode, normally-on transistor, with pin 951 being the first drain and pin 952 being the first source. In that example, second transistor 960 can be an n-channel, enhancement mode, normally-off transistor, with pin 961 being the second drain, and pin 962 being the second source. In this way, both primary transistors 950, 960 have their blocking ends electrically oriented towards first terminal 910. With both blocking ends oriented towards first terminal 910, both primary transistors 950, 960 are similarly aligned. In another example, first transistor 950 can be a p-channel, enhancement mode, normally-off transistor, while second transistor 960 can be a p-channel, depletion mode, normally-on transistor. Pin 951 in this example would be the first source, well pin 952 would be the first drain; also pin 961 would be the second source and pin 962 would be the second drain. Accordingly, both primary transistors 950, 960 have their blocking ends electrically oriented towards first terminal 910, and are similarly aligned.

Device 900 can work, for example, in the following manner. While normal current conditions exist, suppose the voltage difference between connections 912 and 914 is about 0.08 V. Voltage multiplication circuitry 970 would boost the difference to 3.3 V between pins 972 and 974. The voltage difference between the first gate 953 and the first source (952 for n-channel transistor 950; 951 for p-channel transistor 950) would be about 3.3 V. The voltage difference between the second gate 963 and the second source (962 for n-channel transistor 960; 961 for p-channel transistor 960) would be 3.3 V. This 3.3 V gate-to-source potential difference would cause both transistors 950, 960 to normally operate in enhancement mode.

Figure 10:
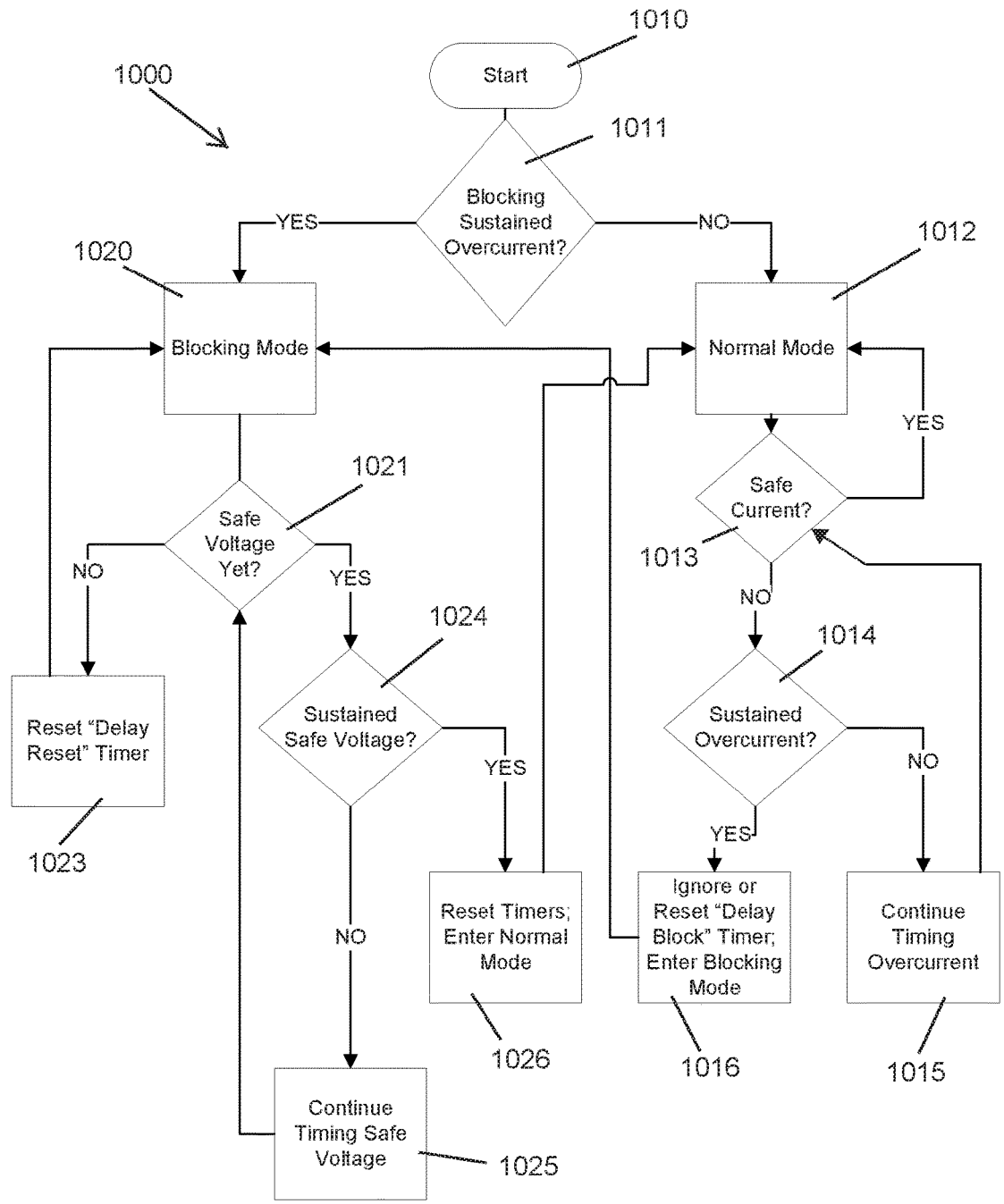
FIG. 10 depicts in flow chart form an inventive method for protecting a circuit from a sustained overcurrent condition.

FIG. 10 depicts in flow chart form an inventive method for protecting a circuit from a sustained overcurrent condition. Employing a device with suitable components such as device 800 depicted in FIG. 8, the method 1000 depicted in FIG. 10 can be performed. To start 1010, it is determined 1011 whether the device 800 is blocking a sustained overcurrent. If not, the device is configured for normal mode 1012, and first transistor 850 and second transistor 860 allow current to pass between first terminal 810 and second terminal 820. The current passing through the device 800 is monitored, and it is determined whether the current persists at a safe level 1013. If so, normal mode 1012 continues. If not, the duration of the overcurrent condition is monitored 1014. If the overcurrent condition has not persisted for a predetermined duration, the unsafe current 1013 and its duration 1014 continue to be monitored. Once the predetermined duration has been achieved 1016, the timing circuitry 891 is ignored or reset by enabling blocking circuitry 881 and the device 800 enters blocking mode 1020. As discussed for FIG. 8, transistors 850 and 860 now block current between first terminal 810 and second terminal 820. The overcurrent condition is monitored 1021 by measuring the voltage between first terminal 810 and second terminal 820 by voltage sensor circuitry 870, and if the voltage remains above a predetermined threshold, the device remains in blocking mode 1020. However, if the voltage across device 800 returns to a safe level 1021, then the duration of the safe voltage is monitored 1024, such as by reset timing circuitry 892. If the safe voltage or normal current condition does not persist for a sufficient duration 1025, the device resets the timed duration to zero in reset timing circuitry 892, and continues to time the normal current condition 1025 using reset timing circuitry 892. Once the safe voltage has persisted for a suitable duration 1026, the device 800 enters normal mode 1012, timers such as timing circuitries 891, 892 are reset, and current once again may pass between first terminal 810 and second terminal 820 via primary transistors 850, 860.

Figure 23:
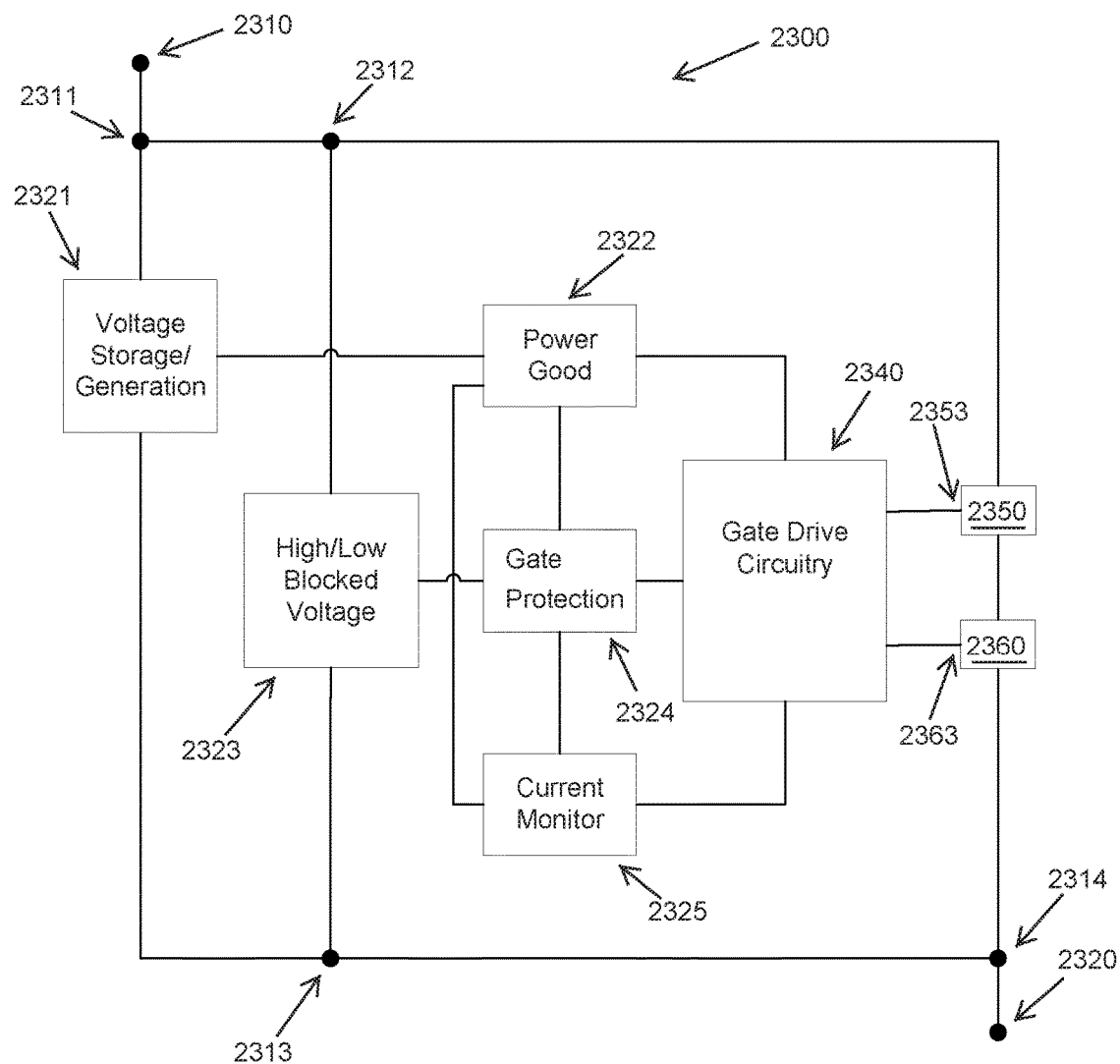
FIG. 23 conceptually depicts another embodiment of a device 2300 for blocking a sustained overcurrent.

FIG. 23 conceptually depicts another embodiment of a device 2300 for blocking a sustained overcurrent. Device 2300 comprises first terminal 2310 and second terminal 2320. First transistor 2350 and second transistor 2360 are arranged in series electrical communication in the primary current path between first terminal 2310 and second terminal 2320. Connection 2311 from first terminal 2310 links voltage storage/generation circuitry 2321, which is configured to store voltage such as with a capacitor, and then supply that voltage to the rest of the device as needed. Voltage storage/generation circuitry 2321 is also in electrical communication with the second terminal 2320 via connections 2313, 2314. Voltage storage/generation circuitry 2321 is in electrical communication with power good circuitry 2322, which power good circuitry 2322 is configured to monitor the electrical energy within the device 2300 and influence its operation based on whether the device 2300 has adequate power. Power good circuitry 2322 also receives input from current monitor 2325, and is in electrical communication with gate protection circuitry 2324 and gate drive circuitry 2340. The gate protection circuitry 2324 also receives input from high low blocked voltage circuitry 2323, which is configured to monitor the voltage drop across the first terminal 2310 and second terminal 2320 via connections 2312, 2313. Gate drive circuitry 2340 also receives input from gate protection circuitry 2324 and current monitor 2325, and provides the voltages to first gate 2353 of first transistor 2350, and to second gate 2363 of second transistor 2360, to properly bias those transistors 2350, 2360 as needed to allow or block current. FIG. 23 depicts conceptually devices 1900, 2100, further explained below.

Figure 24:
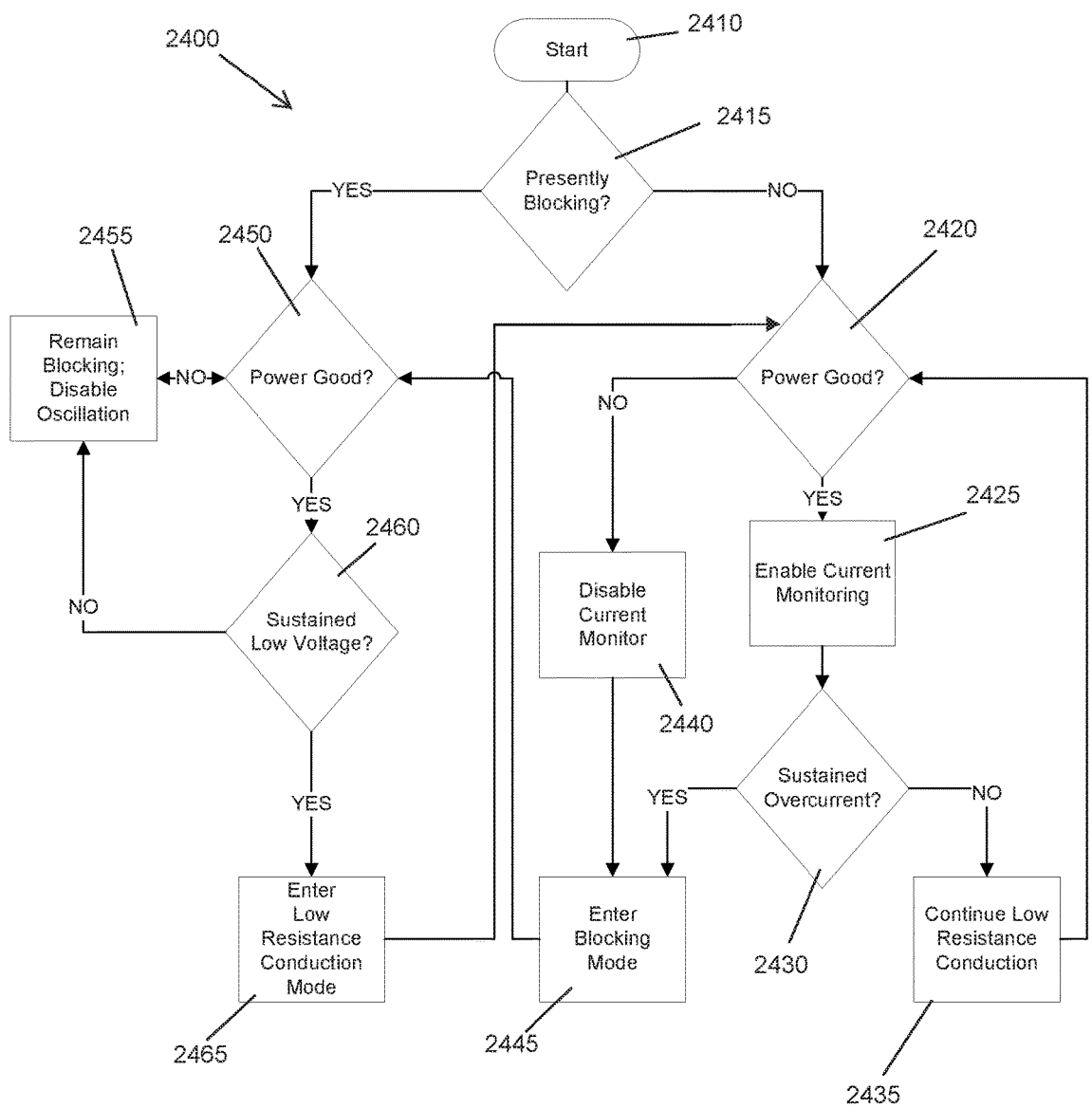
FIG. 24 depicts in flow chart form another inventive method for protecting a circuit from a sustained overcurrent condition employing device 2300.

FIG. 24 depicts in flow chart form another inventive method for protecting a circuit from a sustained overcurrent condition. Method 2400 can employ device 2300, for example. To begin 2410 the method at point 2415, if device 2300 is not presently blocking current, then the power good circuitry 2322 determines 2420 whether the power to the device is good. If so, current monitor 2325 is enabled 2425. The current monitor 2325 then monitors the current to determine whether there is a sustained overcurrent 2430. While there is no sustained overcurrent, the device will continue its low resistance conduction 2435. That can mean, for example, that first transistor 2350 and second transistor 2360 are biased into enhancement mode by gate drive circuitry 2340. The power good circuitry 2322 will continue to monitor whether the power is good 2420. If the power is not good, current monitor 2325 will be disabled 2440, and the device will enter blocking mode 2445. That can mean, for example that first transistor 2350 and second transistor 2360 are biased into blocking depletion mode by gate drive circuitry 2340. The power good circuitry 2322 will measure the power in device 2300 and determine 2450 whether the power is good. If the power is good, high/low blocked voltage circuitry 2323 will determine whether the device is experiencing a sustained low voltage condition 2460. If such a condition exists, the device will enter the low resistance conduction mode 2465, such as, for example, by causing gate drive circuitry 2340 to bias the gates 2353, 2363 so that first transistor 2350 and second transistor 2360 move toward or into enhancement mode. If the power is not good 2450, or if there is no sustained low-voltage 2460 during blocking mode, the device will remain in blocking mode 2455.

Some embodiments enter or maintain blocking mode under the following conditions:
1.) The power-good circuitry indicates power bad
2.) The overcurrent circuitry indicates a sustained overcurrent
3.) The external voltage sensor circuitry (high/low) indicates that a high voltage exists.
4.) The high/low voltage sensor circuitry is disabled, and the secondary oscillations are operating. For a portion of the oscillations, the device is blocking.

The remaining figures can be better understood by reference to the Examples below.

EXAMPLES

Example 1

Devices with Two Depletion Mode Transistors

Figure 11:
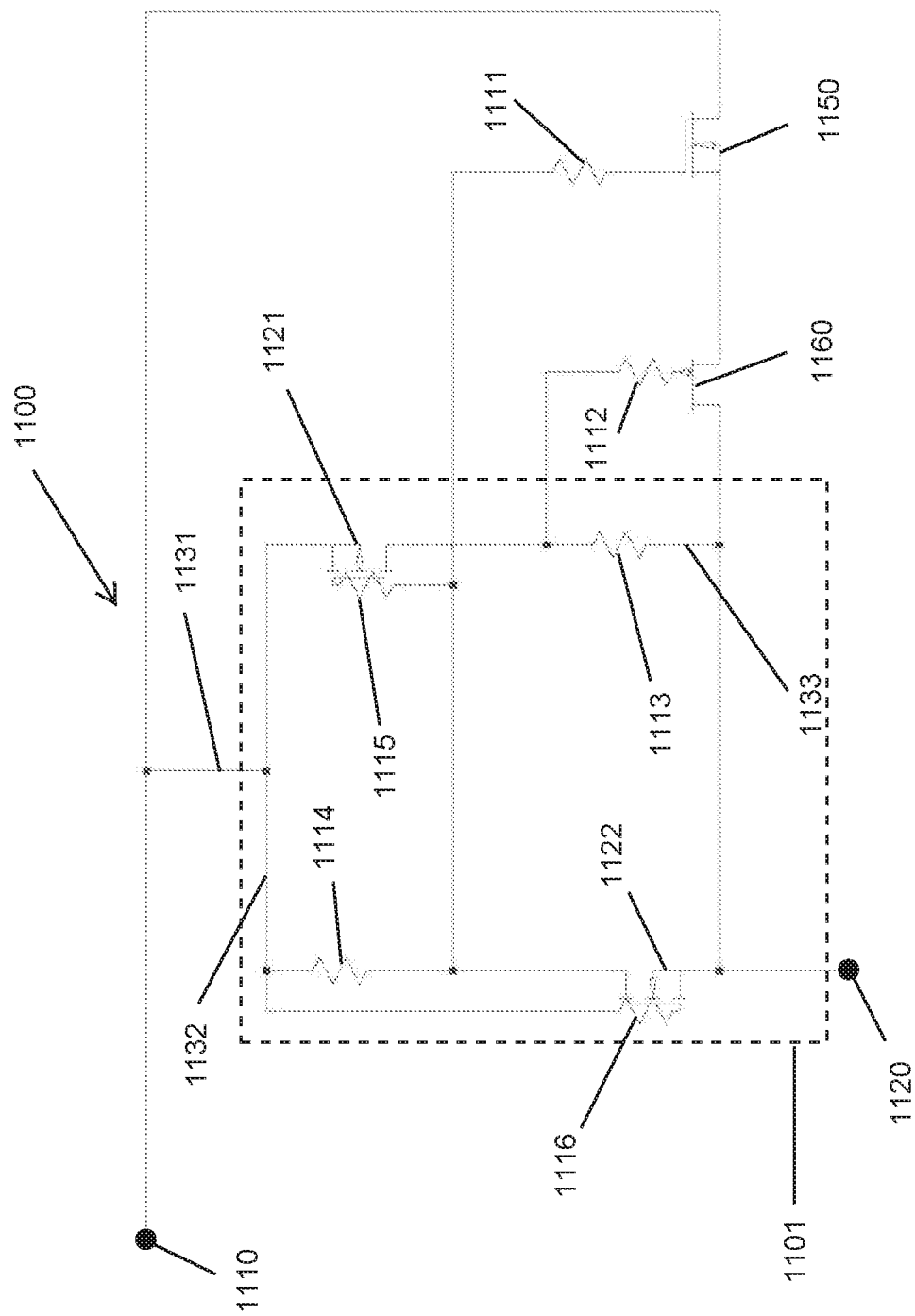
FIG. 11 provides a wiring diagram for device 1100 that comprises two depletion mode, normally-on transistors for protecting a circuit against overcurrent conditions.

FIG. 11 provides a wiring diagram for device 1100 that comprises two depletion mode, normally-on transistors for protecting a circuit against overcurrent conditions. In series electrical communication between first terminal 1110 and second terminal 1120 are positioned first transistor 1150 and second transistor 1160. First transistor 1150 is an n-channel, depletion mode, normally-on transistor with its drain closer to first terminal 1110. Second transistor 1160 is a p-channel, depletion mode, normally-on transistor with its source closer to first terminal 1110. In this way, first transistor 1150 and second transistor 1160 are similarly aligned. Transistor 1121, a p-channel enhancement mode transistor, together with transistors 1113 and 1115 provide a structure akin to two switches: under normal current conditions, transistor 1121 can be considered an open switch and transistor 1115 can be considered a closed switch. Similarly, transistor 1122, an n-channel enhancement mode transistor, together with resistors 1114 and 1116, provide a second structure akin to two switches: under normal current conditions, transistor 1122 can be considered an open switch and resistor 1114 can be considered a closed switch. The potentials at the gates of first transistor 1150 and second transistor 1160 cause those transistors to approach or enter enhancement mode, so that the transistors 1150, 1160 operate substantially in enhancement mode. It can be said that the gates of transistors 1150, 1160 are pulled to their respective drains, thereby putting both transistors 1150, 1160 into diode mode. Current is allowed to pass between first terminal 1110 and second terminal 1120. The gates of transistors 1150, 1160 are protected from high currents by resistors 1111, 1112, respectively. When an overcurrent condition arises, open switches close, and closed switches open, causing the first gate to be at or close to the drain potential of second transistor 1160, and causing the second gate to be at or close to the drain potential of first transistor 1150. This results in first transistor 1150 and second transistor 1162 entering blocking depletion mode, thereby blocking current between first terminal 1110 and second terminal 1120.

It can be said that area 1101 on FIG. 11 represents gate drive circuitry. Thus, some embodiments relate to a device for protecting a circuit from an overcurrent condition comprising two transistors as described herein such as transistors 1150, 1160 and gate drive circuitry 1101.

In an alternative embodiment, resistor 1114 could be accompanied by a capacitor in parallel. Such a capacitor would function as a delay reset timer, and it would help to maintain the blocking state if device 1100 is subjected to an alternating current.

In another alternative embodiment, a normally-on transistor in series with a small resistor can be placed in parallel with resistor 1114. That combination can provide a smaller resistance to help correctly bias the gates of transistors 1150, 1160.

In still another alternative embodiment, one or more diodes can be added between the gate and the drain of one or both primary transistors 1150, 1160, for example at positions 1131, 1132, and/or 1133. Such diodes offer stabilizing behavior during negative or zero voltage pulses by maintaining correct internal polarities and voltages, by releasing stored charge accumulated at other times, or by a combination of the two. Care should be taken, however, so such diodes and their attendant voltage drops do not make maintaining enhancement mode too difficult. Such diodes can also assist one or more capacitors (not shown) to store charge as voltage storage/generation circuitry to aid the device's operation during those pulses.

Example 2

Device with Two Depletion Mode Transistors and Gate Protection

Figure 12:
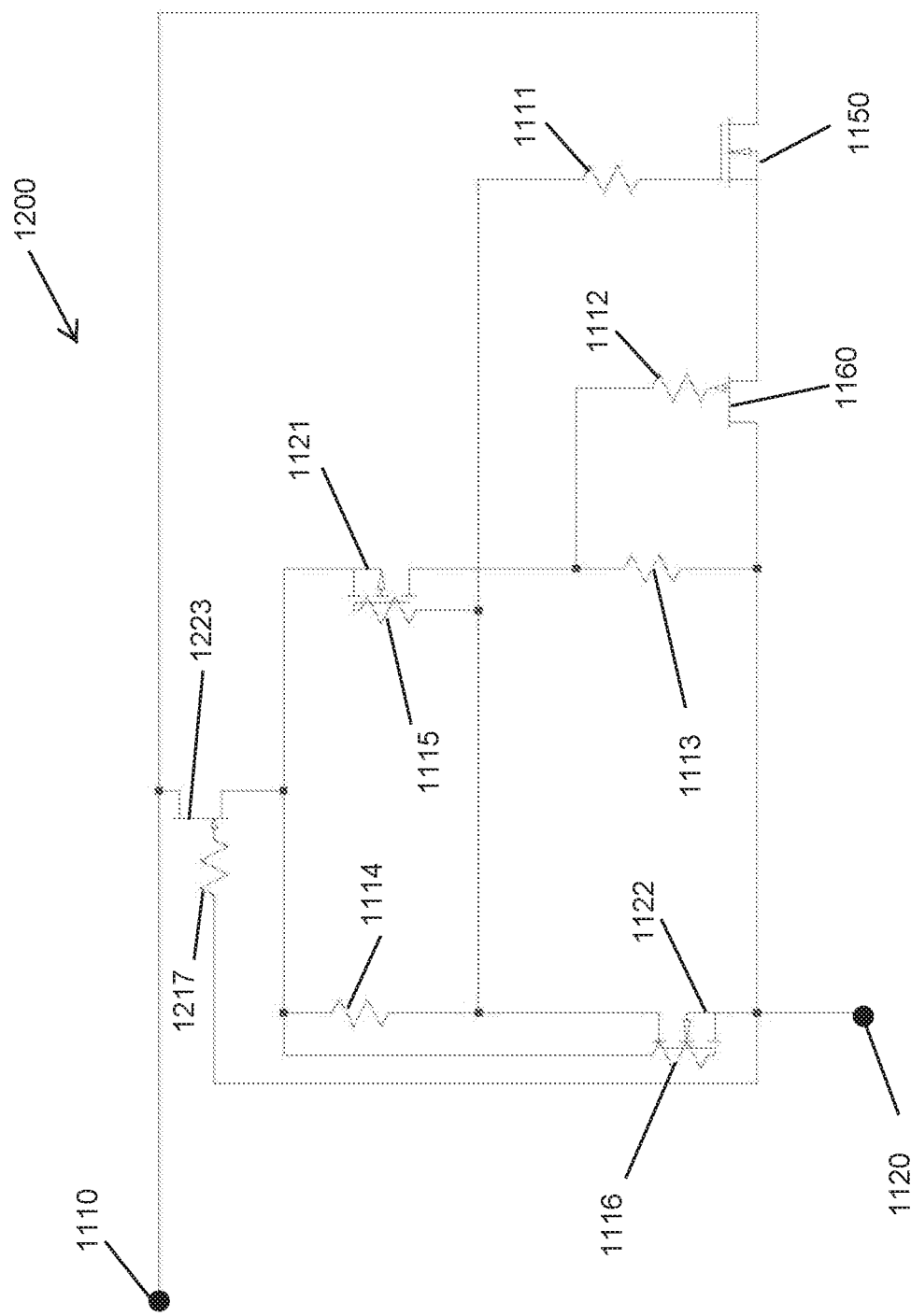
FIG. 12 provides a wiring diagram for device 1200 that is similar to device 1100, further comprising gate protection circuitry.

FIG. 12 provides a wiring diagram for device 1200 that comprises two depletion mode, normally-on transistors for protecting a circuit against overcurrent conditions. Device 1200 adds to device 1100 gate protection circuitry in the form of transistor 1223 and resistor 1217. Transistor 1223 is an n-channel depletion mode, normally-on transistor with its gate in electrical communication with the second terminal 1120. Transistor 1223 is roughly analogous to transistor 724 in FIG. 7. Thus, some embodiments relate to a device for protecting a circuit from an overcurrent condition comprising two transistors as described herein, gate drive circuitry, and gate protection circuitry.

Figure 13:
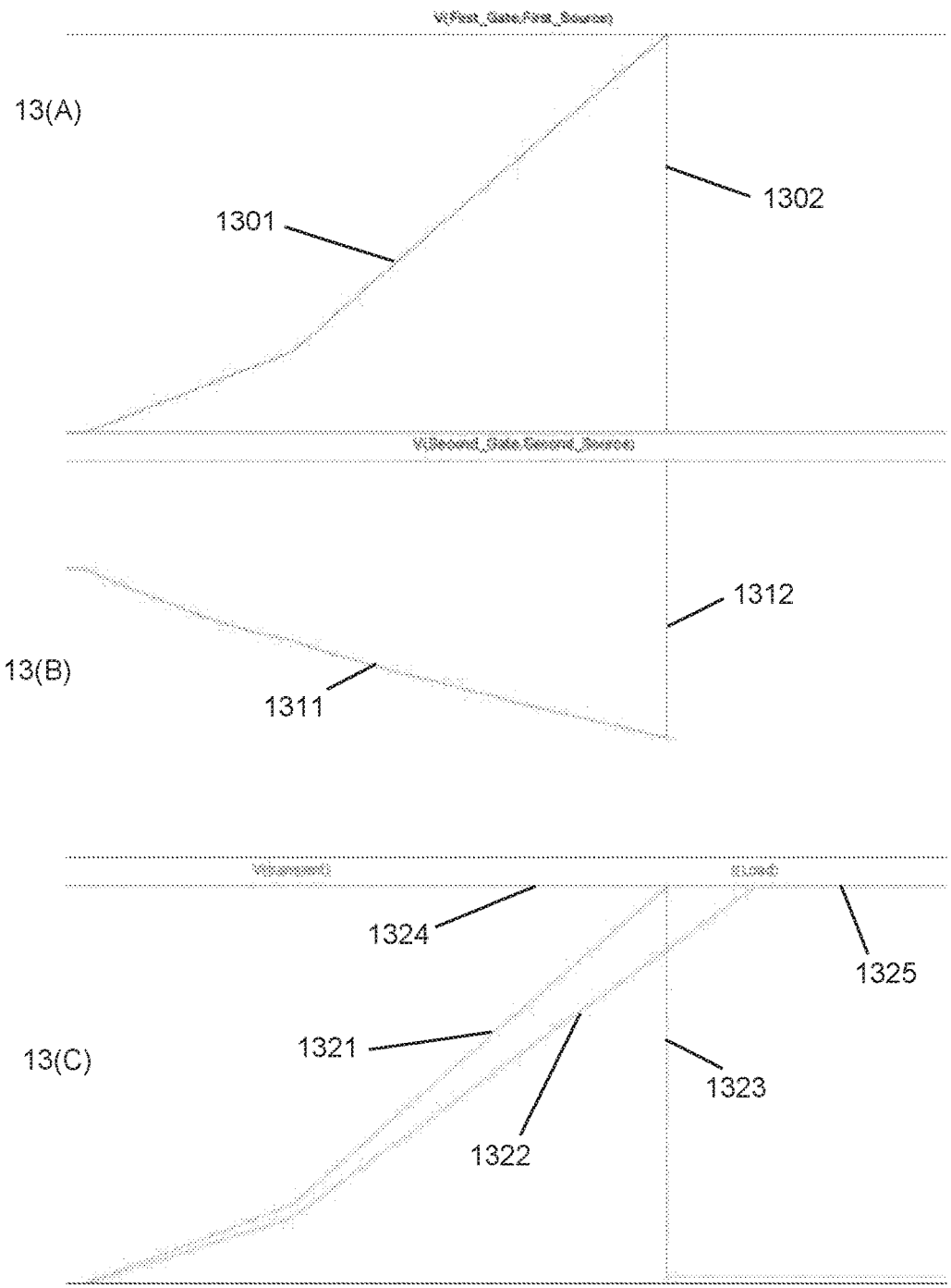
FIG. 13 depicts a simulation of normal current conditions followed by an overcurrent condition, using device 1200 shown in FIG. 12.

FIG. 13 depicts a simulation of a normal current condition followed by an overcurrent condition, using device 1200 shown in FIG. 12. FIG. 13(A) shows the voltage versus time curve for the voltage drop between the first gate and the first source for first transistor 1150. FIG. 13(B) shows the voltage versus time curve for the voltage drop between the second gate and the second source for second transistor 1160. FIG. 13(C) shows the total available system voltage 1322, and the current 1321 through a simulated load (not shown in FIG. 12) to be protected by device 1200. During a normal current condition 1321, the voltage curve 1301 shows first transistor 1150 operates in enhancement mode, while the voltage curve 1311 shows second transistor 1160 also operates in enhancement mode. Device 1200 passes current 1321, and a voltage drop 1322 across device 1200 is observed. When the current reaches an overcurrent threshold 1324, the voltage drop from the first gate to the first source goes negative 1302, and the voltage drop from the second gate to the second source goes positive 1312. Both transistors 1150, 1160 are thereby placed into blocking depletion, and the current across the load to be protected drops to zero 1323. Device 1200 now blocks current through the simulated load while the voltage across device 1200 remains high and unsafe 1325.

Figure 14:
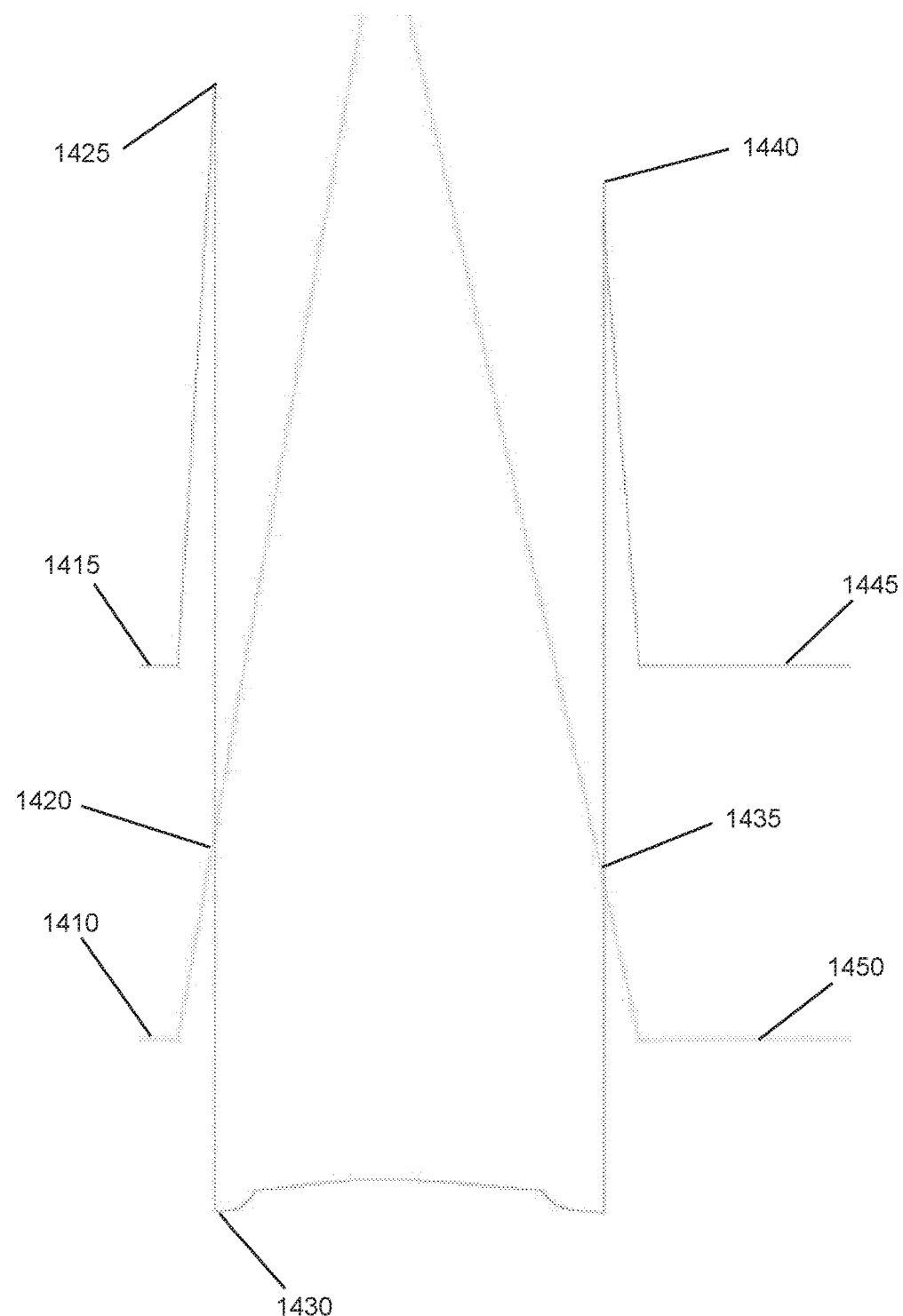
FIG. 14 depicts another simulation of the behavior of device 1200, including resetting the device.

FIG. 14 also simulates the behavior of device 1200. The X axis plots time and the y-axis plots voltage and current. Total voltage across device 1200 and load protected by device 1200 begins at a low, safe level 1410. The current through device 1200 also begins at a low, safe level 1415. As voltage rises 1420, current also rises to a first threshold 1425, whereupon device 1200 enters blocking mode, and the current drops 1430. Only once the voltage drops to a safe level 1435, does device 1200 allow current to flow again 1440. Current falls with voltage, and when the voltage reaches a low safe level 1450, so does current 1445.

Example 3

Device with Two Depletion Mode Transistors and Current Monitoring Circuitry

Figure 15:
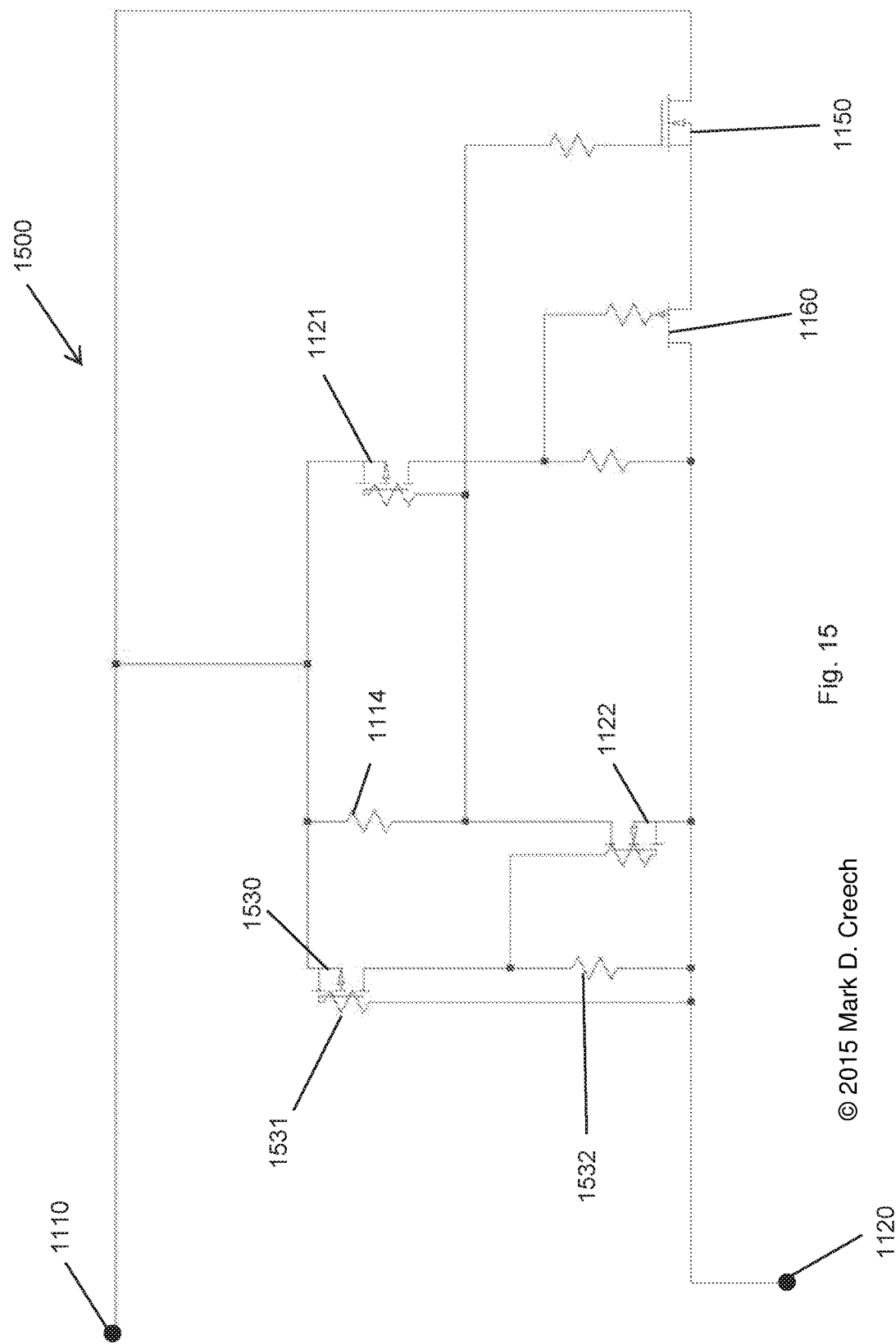
FIG. 15 provides a wiring diagram for device 1500 that is similar to device 1100, further comprising current monitoring circuitry.

FIG. 15 provides a wiring diagram for device 1500 that is similar to device 1100 but also comprises current monitoring circuitry in the form of transistor 1530 and resistors 1531 and 1532. As explained above, under normal current conditions, transistor 1122 can be considered an open switch and resistor 1114 can be considered a closed switch. Device 1500 monitors the current flowing between first terminal 1110 and second terminal 1120 with transistor 1530, which is a p-channel, enhancement mode, normally-off transistor with its gate biased toward second terminal 1120 via resistor 1531. When the current reaches a dangerous level, transistor 1530 together with resistors 1531, 1532 influence the gates of gate drive transistors 1121, 1122, which in turn drives the gates of primary transistors 1150, 1160 to block that current. Certain embodiments relate to a device for protecting a circuit from an overcurrent condition comprising two transistors as described herein, gate drive circuitry, and current monitoring circuitry.

Example 4

Device with Two Depletion Mode Transistors and Gate Protection

Figure 16:
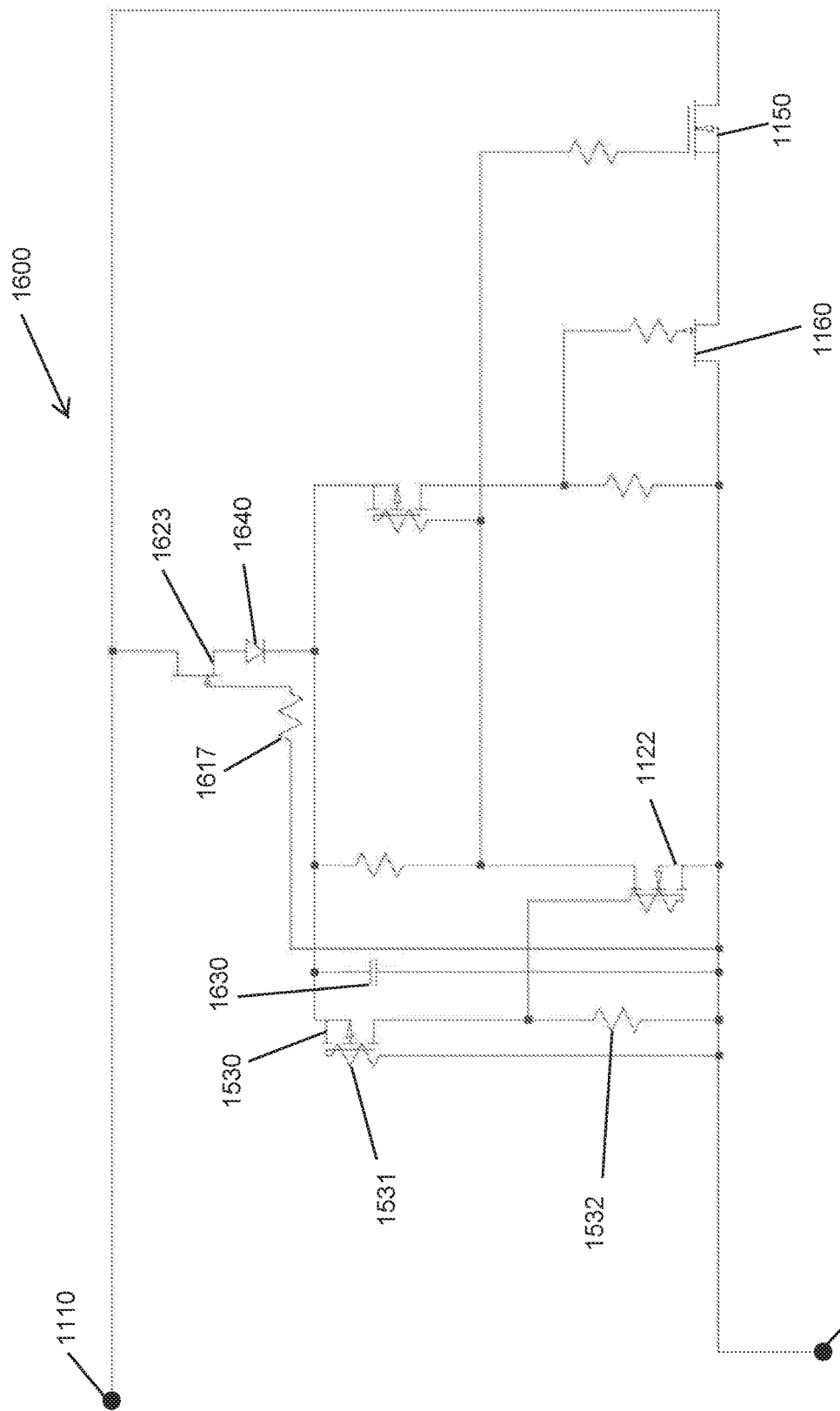
FIG. 16 provides a wiring diagram for device 1600 that is similar to device 1500, further comprising gate protection circuitry and voltage storage/generation circuitry.

FIG. 16 provides a wiring diagram for device 1600 that is similar to device 1500 but also comprises gate protection circuitry in the form of transistor 1623 and resistor 1617. Transistor 1623 is analogous to transistor 1223, while resistor 1617 is analogous to resistor 1217, in FIG. 12. But between transistor 1623 and second terminal 1120 in device 1600 is current monitoring circuitry comprising transistor 1530 and resistors 1531, 1532. In addition, device 1600 provides voltage storage/generation circuitry in the form of capacitor 1630 and diode 1640. During overcurrent conditions and while device 1600 is blocking, and to some extent during normal current conditions, capacitor 1630 charges, and diode 1640 retains charge in capacitor 1630. If the potential drop across first terminal 1110 and second terminal 1120 becomes very low such as when external power is shut off, the charge on capacitor 1630 ensures proper operation of device 1600 for a short period of time. Therefore, further embodiments relate to a device for protecting a circuit from an overcurrent condition comprising two transistors as described herein, gate drive circuitry, gate protection circuitry, voltage storage/generation circuitry, and current monitoring circuitry.

Example 5

Device with Two Depletion Mode Transistors and High/Low Voltage Sensor

Figure 17:
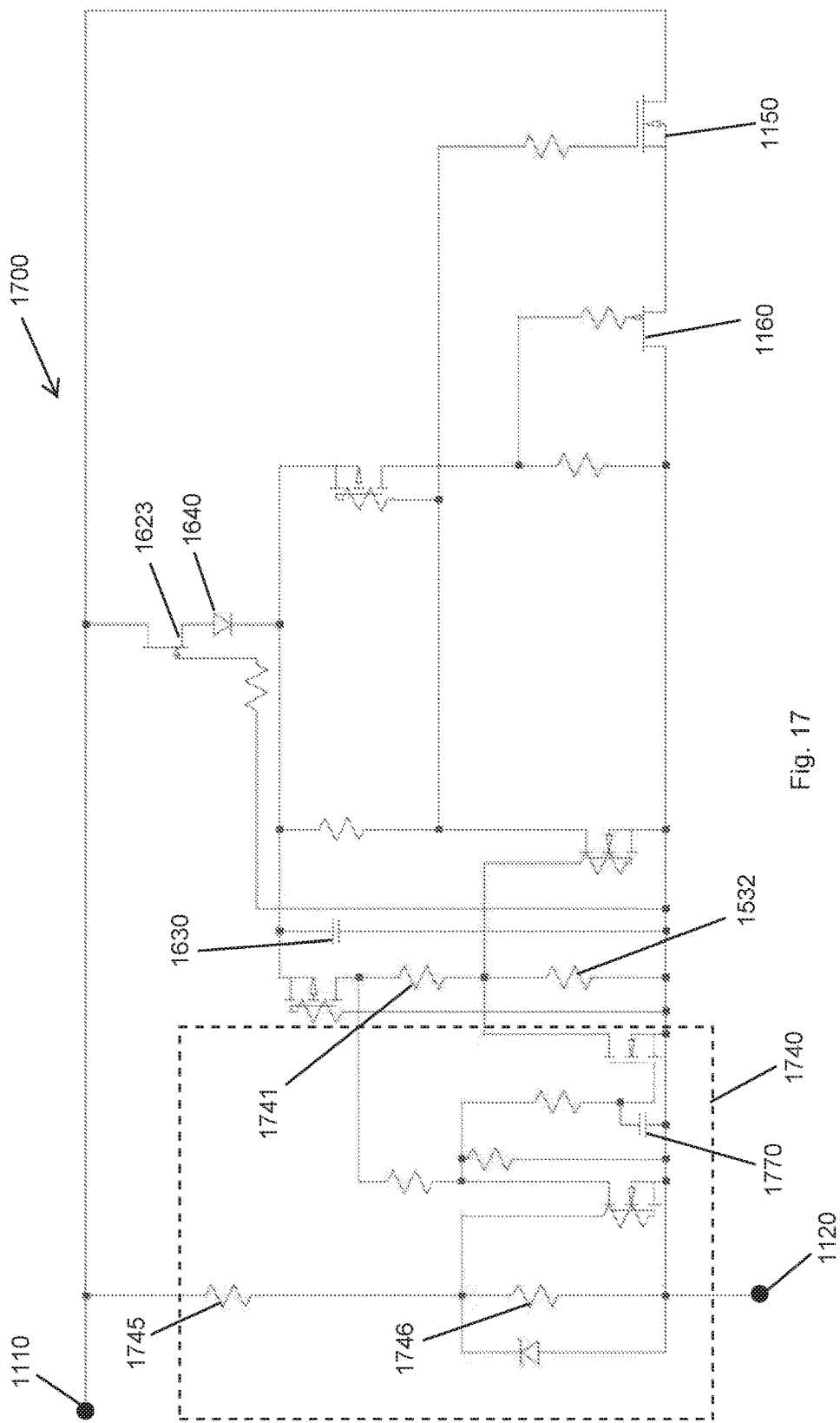
FIG. 17 provides a wiring diagram for device 1700 that is similar to device 1600, further comprising high/low voltage sensor circuitry.

FIG. 17 provides a wiring diagram for device 1700 that is similar to device 1600 but also comprises high/low voltage sensor circuitry in the form of those components appearing in area 1740. High/low voltage sensor 1740 monitors the potential drop between first terminal 1110 and second terminal 1120, which is especially useful when device 1700 is blocking current. Resistors 1745, 1746 are configured to act as a voltage divider in electrical communication with the first terminal and the second terminal, and allow the high/low voltage sensor circuitry 1740 to monitor the potential drop between first terminal 1110 and second terminal 1120. Capacitor 1770, among other components, allows a reset timing function so the high/low voltage sensor circuitry 1740 does not allow device 1700 to return to normal mode allowing current before unsafe high voltage has truly resolved. Accordingly, yet other embodiments relate to a device for protecting a circuit from an overcurrent condition comprising two transistors as described herein, gate drive circuitry, gate protection circuitry, voltage storage/generation circuitry, current monitoring circuitry, and high/low voltage sensing circuitry.

Example 6

Device with Two N-Channel Transistors and Gate Protection

Figure 18:
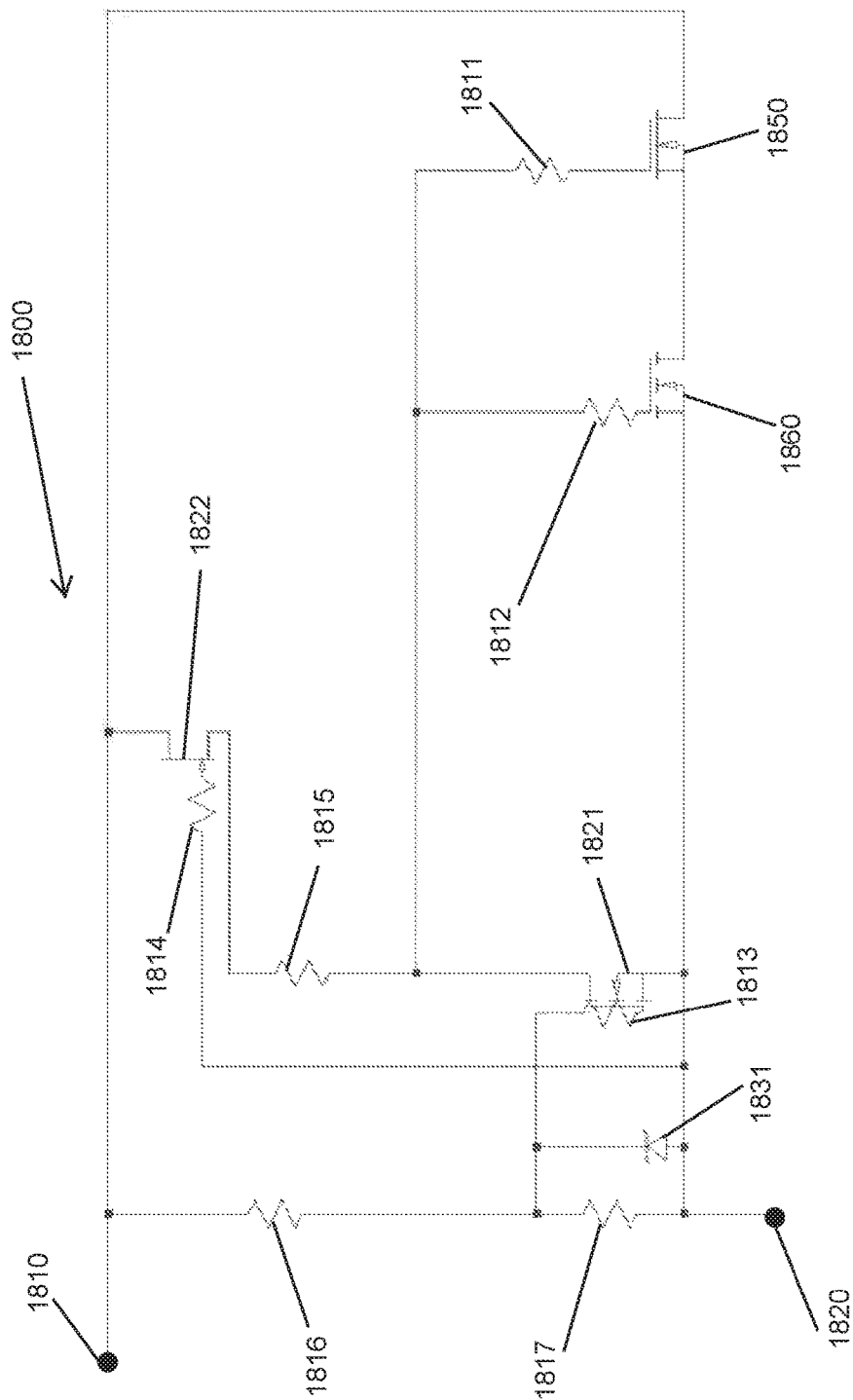
FIG. 18 provides a wiring diagram for device 1800 that comprises two n-channel transistors for protecting a circuit against overcurrent conditions.

FIG. 18 provides a wiring diagram for device 1800 that comprises two n-channel transistors for protecting a circuit against overcurrent conditions. First transistor 1850 and second transistor 1860 are arranged in series electrical communication between first terminal 1810 and second terminal 1820. First transistor 1850 is an n-channel, depletion mode, normally-on transistor, while second transistor 1860 is an n-channel, enhancement mode, normally-off transistor. Both transistors 1850 and 1860 are oriented so that their drains, their blocking ends, are closer to first terminal 1810, as determined by the pass current flowing through those transistors would take. Transistors 1850 and 1860 are therefore similarly aligned. Transistor 1821, which is an n-channel, enhancement mode, normally-off transistor, together with resistors 1813 and 1815, provide a structure akin to two switches. Under normal current conditions, the switch represented by resistor 1815 is closed, while the switch represented by transistor 1821 is open. That is to say, the gates of transistors 1850 and 1860 are subject to the potential at first terminal 1810. Transistors 1850 and 1860 are biased towards or into enhancement mode, and current is allowed to flow between first terminal 1810 and second terminal 1820. When a sustained overcurrent condition arises, the closed switch opens and the open switch closes. That is to say, the gates of transistors 1850 and 1860 become subject to the potential at second terminal 1820. The transistors 1850 and 1860 are biased into blocking depletion, and current is blocked between first terminal 1810 and second terminal 1820. Transistor 1822 and resistor 1814 provide gate protection circuitry for transistors 1850 and 1860. Resistors 1816 and 1817 function as a voltage divider, and set the voltage level at which transistor 1821 turns on. Resistor 1816 with zener diode 1831 provide gate protection circuitry for transistor 1821, and are roughly analogous to resistor 723 and zener diode 725 shown in FIG. 7. The gates of transistors 1850, 1860 are further protected by resistors 1811, 1812, respectively.

Example 7

Device with Two N-Channel Transistors and Additional Features

Figure 19:
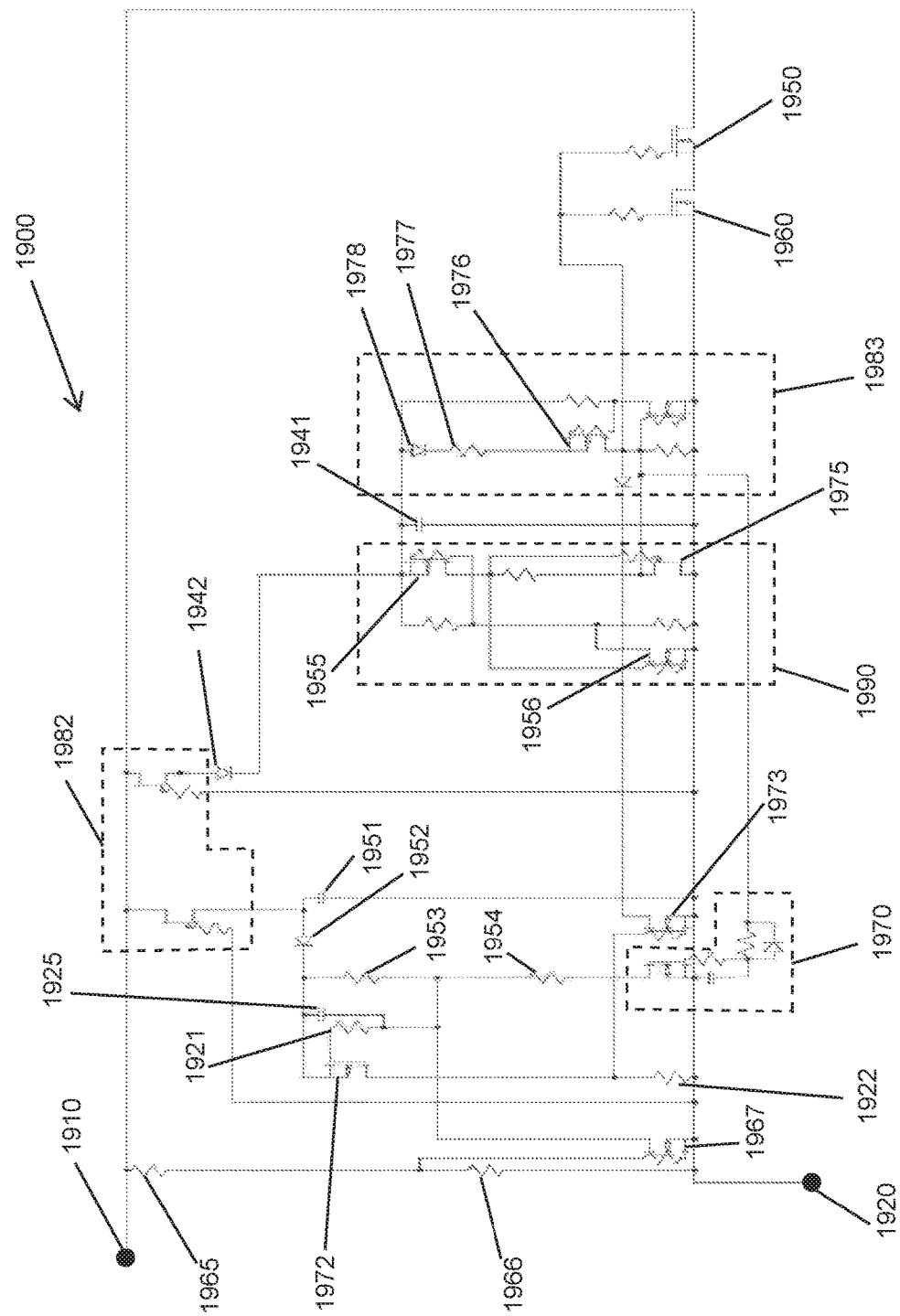
FIG. 19 provides a wiring diagram for device 1900 that comprises two n-channel transistors for protecting a circuit against overcurrent conditions.

FIG. 19 provides a wiring diagram for device 1900 that comprises two n-channel transistors for protecting a circuit against overcurrent conditions. First transistor 1950 and the second transistor 1960 are arranged in series electrical communication with their drains and sources in the primary current path between first terminal 1910 and second terminal 1920. First transistor 1950 is an n-channel, depletion mode, normally-on transistor, while second transistor 1960 is an n-channel, enhancement mode, normally-off transistor. Both transistors 1950, 1960 have their drains, their blocking ends, oriented towards first terminal 1910. Accordingly, both transistors 1950, 1960 are similarly aligned.

Under normal current conditions, primary transistors 1950, 1960 oscillate between blocking and allowing current as necessary to store charge. Under steady conditions, these oscillations occur within a first frequency range ("the first oscillations"—see FIG. 20 at 2021, 2022, 2051). Under normal conditions, while in a conductive state, device 1900 stores some of the voltage developed across transistors 1950 and 1960 between terminals 1910 and 1920 in capacitor 1941 in order to power the circuit and drive the transistors gates. While in a conductive state, this stored voltage may not be adequate. Together with diode 1942, capacitor 1941 corresponds to the voltage storage/generation circuitry 2321 of FIG. 23. Diode 1942 assists capacitor 1941 to retain charge, and protects against negative cycles. Similarly, diode 1952 assists capacitor 1925 and the gates of transistors 1972, 1973 to retain charge and also ensures proper operation during very low power situations or during negative voltages from first terminal 1910 to second terminal 1920.

There is "power good" circuitry, comprising areas 1970 and 1990. Power good transistors 1955, 1956 indicate when the stored voltage (at capacitor 1941) exceeds a first predetermined threshold or decreases below a second threshold possibly the same as the first threshold. When the power-good circuitry indicates that the stored charge has decreased below the second threshold, current monitoring is disabled, and gate drive circuitry drives primary transistors 1950 and 1960 into blocking depletion and device 1900 enters blocking mode. Current monitor circuitry, corresponding to current monitor circuitry 1825 of FIG. 18, comprises a p-channel enhancement mode normally-off MOSFET 1972, capacitor 1925, and resistors 1921, 1922. Resistors 1953, 1954 provide a voltage divider for fine-tuning the voltage at which current monitor circuitry transitions device 1900 from conducting mode to blocking mode. Gate drive circuitry, corresponding to gate drive circuitry 1840 of FIG. 18, comprises n-channel, enhancement mode normally-on MOSFET 1973, p-channel enhancement mode normally-off MOSFET 1976, resistor 1977, and diode 1978, among other components identified in area 1983. Device 1900 will remain in blocking mode, thereby disabling oscillations, as long as the high voltage sensing circuitry indicates that the external voltage exceeds a predetermined high voltage threshold.

In blocking mode, device 1900 stores some of the voltage developed across transistors 1950 and 1960 between terminals 1910 and 1920 in capacitor 1941 in order to power the circuit and drive the transistors gates. When the power-good circuitry indicates that sufficient charge has been stored, the device 1900 may either reset to a conductive state, or depending on input from the high voltage circuit, remain blocked. If the high/low voltage sensing circuitry, comprising resistors 1965, 1966 and n-channel enhancement mode normally-off MOSFET 1967 and corresponding to the high/low blocked voltage circuitry 2323 of FIG. 23, indicates the voltage across device 1900 has exceeded a predetermined high voltage threshold for a sufficient length of time, gate drive circuitry drives transistors 1950, 1960 into blocking depletion, and the oscillations are disabled so that device 1900 enters and/or remains in the blocked state. If there is no such indication of a high voltage, and the voltage remains below the predetermined high voltage threshold for a sufficient length of time, then device 1900 resets to a conductive state. In this case, gate drive circuitry utilizes some, or all, of the stored voltage to fully enhance transistors 1950 and 1960 so that they present a very low resistance current path. Removing or disabling the high voltage sensor (comprising resistors 1965, 1966 and transistor 1967) can be easily done and will allow the circuit to oscillate within a second frequency range ("the second oscillations"), possibly the same as the first, into and out of the blocking state even when high voltage is imposed on device 1900. In addition, resistors 1953, 1954 provide timing delays for those second oscillations.

During normal conduction, if the power-good indicates true then current monitoring is enabled. When a sustained overcurrent condition arises, gate drive circuitry drives transistors 1950 and 1960 into blocking depletion, and device 1900 enters blocking mode. Notably, in addition to entering blocking mode upon overcurrent, the device will also enter blocking mode if a sufficiently low current is reached and sustained. Such an oscillating circuit can also be advantageously applied, such as for example to assist or replace a standard synchronous PWM controller in a step-up boost converter. Gate protection circuitry is identified in area 1982. Thus, device 1900 comprises high/low voltage sensor circuitry, voltage storage/generation circuitry, power-good circuitry, current monitoring circuitry, gate protection circuitry, and gate drive circuitry.

Figure 20:
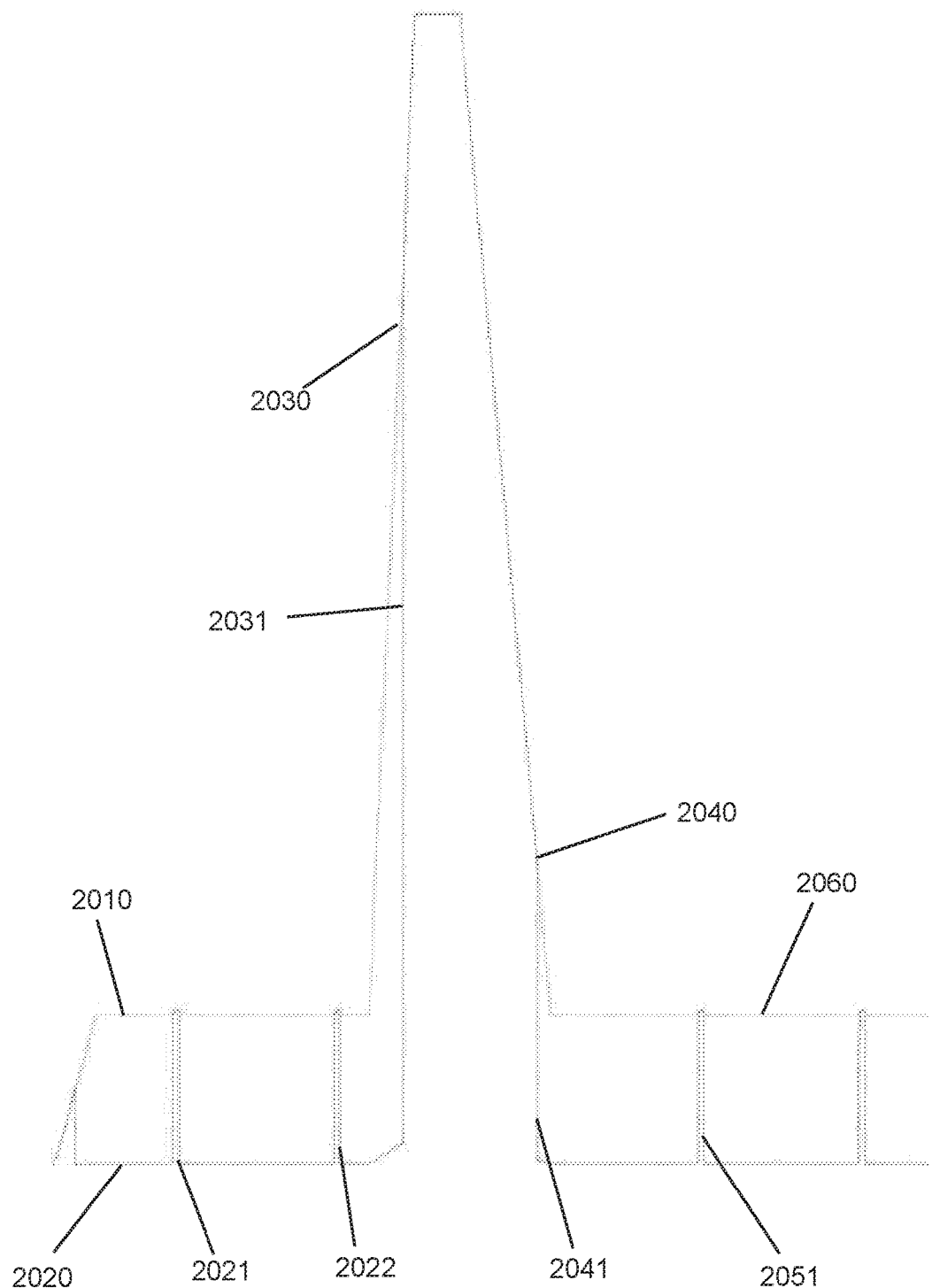
FIG. 20 depicts a simulation of normal current conditions followed by an overcurrent condition and then a return to normal current conditions, using device 1900 shown in FIG. 19.

FIG. 20 depicts a simulation of normal current conditions followed by an overcurrent condition and then a return to normal current conditions, using device 1900 shown in FIG. 19. The y-axis shows total voltage across both device and load, while the x-axis shows time. Measurements were taken by simulating device 1900 in series with a resistive load (not shown). When the voltage across the device, and therefore the load to be protected reaches a steady, normal level 2010, the voltage 2020 across the first terminal 1910 to second terminal 1920 exhibits a periodic oscillation 2021, 2022—the first oscillations. These oscillations are required to charge the voltage storage/generation circuitry, comprising capacitor 1941. When the voltage across the device and therefore the load spikes to a first threshold 2030, device 1900 responds by placing transistors 1950, 1960 in blocking depletion mode and blocking current between first terminal 1910 and second terminal 1920. This is represented in FIG. 20 by voltage spike 2031. When the voltage across the device returns to below a second threshold 2040 and to a normal level 2060, device 1900 responds by returning to a normal current-allowing condition 2041. Oscillations 2051 resume.

Example 8

Figure 21:
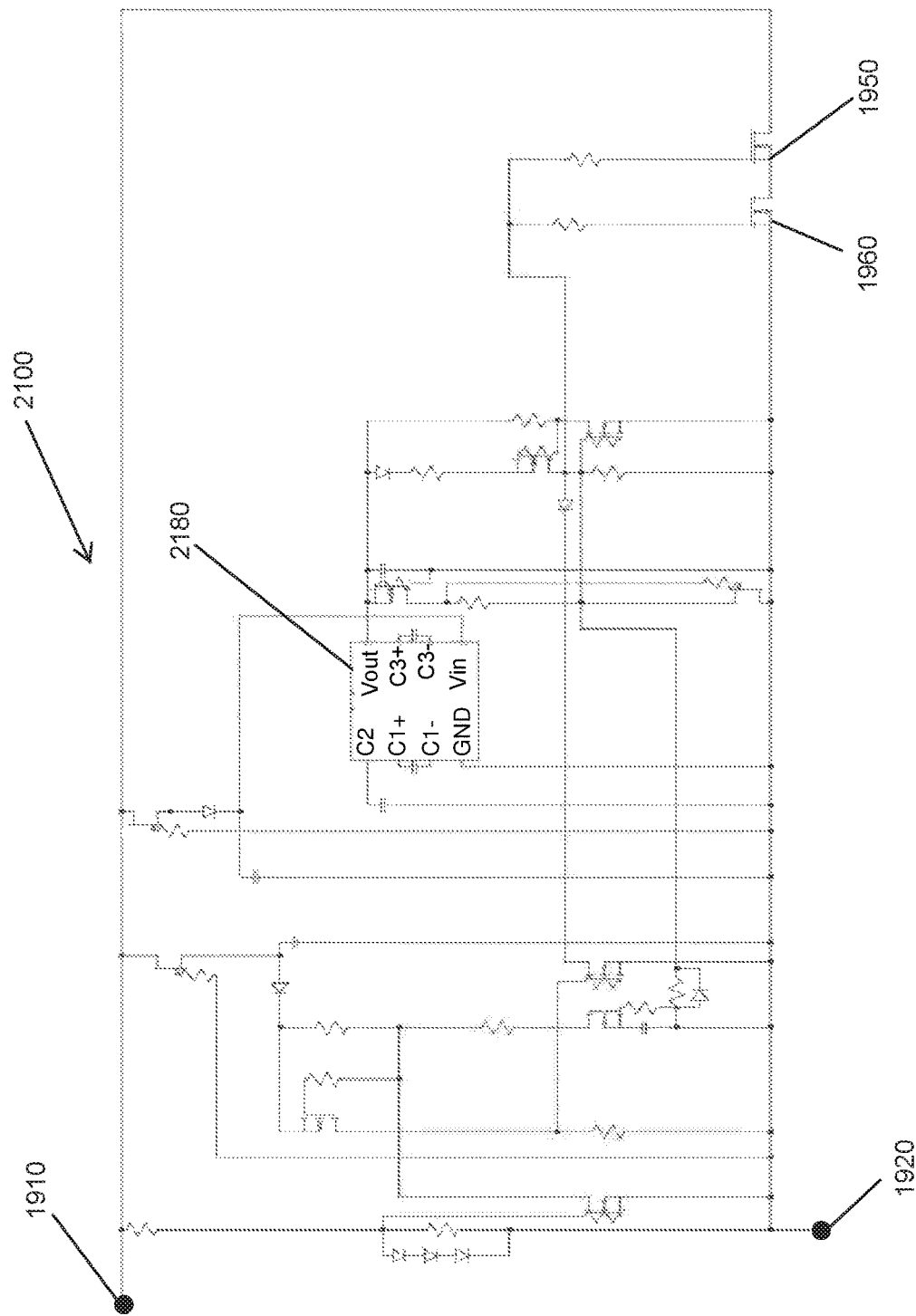
FIG. 21 provides a wiring diagram for device 2100 that is similar to device 1900, but adds an integrated circuit 2180 for voltage multiplication.

Device with Two N-Channel Transistors and Integrated Circuit for Voltage Multiplication FIG. 21 provides a wiring diagram for device 2100 that adds an integrated circuit 2180 to the device 1900 shown in FIG. 19. Other minor changes also appear. Integrated circuit 2180 is added here to function as a voltage multiplier, so that for a wide range of currents, device 2100 is able to firmly bias the gates of first transistor 1950 and second transistor 1960 into enhancement or blocking depletion as desired. Consequently, for a wide range of currents transistors 1950 and 1960 are able to continuously operate in a low resistance state during normal conditions, and without the need for oscillations. Moreover, gate voltage multiplication enables any oscillations that may be due to low current to occur only at a lower range of currents than observed with device 1900 during normal current conditions. Integrated circuit 2180 can be any suitable integrated circuit. Shown in FIG. 21 is an LTC 1502-3.3 by Linear Technology Company, Milpitas, Calif. Neither device 1900 or 2100 comprises an inductor, and relies entirely on the voltage drop between first terminal 1910 and second terminal 1920.

Example 9

Device with Timing Circuitry

Figure 22:
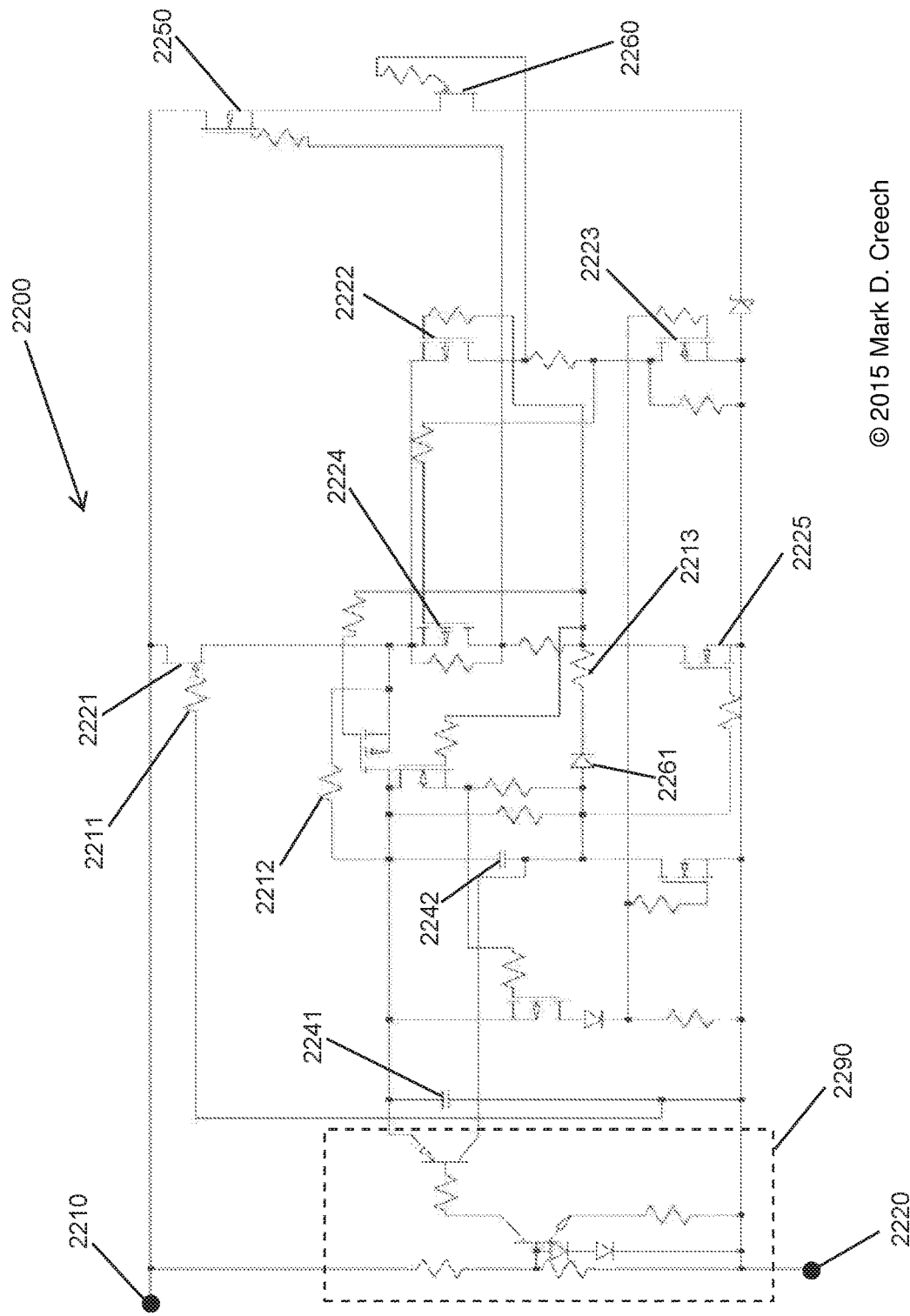
FIG. 22 provides a wiring diagram for device 2200 for protecting a circuit against overcurrent conditions featuring timing circuitry.

FIG. 22 provides a wiring diagram for device 2200 for protecting a circuit against overcurrent conditions featuring timing circuitry. First transistor 2250 and second transistor 2260 are arranged in electrical communication between first terminal 2210 and second terminal 2220. First transistor 2250 is an n-channel depletion mode, normally-on transistor, while second transistor 2260 is a p-channel, depletion mode, normally-on transistor. The drain of first transistor 2250 and the source of second transistor 2260 are oriented toward first terminal 2210; both transistors 2250, 2260 are similarly aligned. Transistor 2221 and resistor 2211 provide gate protection circuitry. Resistor 2212 and capacitor 2241 provide a delay blocking timer circuitry. Also, during the transition between current-allowing and current-blocking modes, capacitor 2241 acts as a bypass capacitor and protects device 2200 from any current surge during the transition. Capacitor 2241 also acts as an energy storage device to ensure device 2200 operates properly in the event of a power shut-down. Capacitor 2242, diode 2261, and resistor 2213 provide delay reset timer circuitry. The portion of device 2200 indicated by area 2290 provides voltage level timer disable circuitry. Area 2290 monitors the voltage drop from first terminal 2210 to second terminal 2220, even during blocking mode, allowing the device 2200 to reset. Transistors 2222, 2223, on one hand, and transistors 2224, 2225, on the other hand, provide two totem pole driver stages to speed up the turn on and turn off of the transistors 2250, 2260. Transistors 2222, 2223 control the gate of second transistor 2260; while transistors 2224, 2225 control the gate of first transistor 2250. Under normal current conditions, it can be said that transistors 2223, 2224 are "closed," while transistors 2222, 2225 are "open." Device 2200 does not employ significant voltage multiplication circuitry; it is expected that transistors 2250, 2260 will operate substantially in diode mode or just into the saturation region of their current voltage curves under normal current conditions.

Example 10

Device with Rectifier and Four Transistors for AC Current Protection

Figure 25:
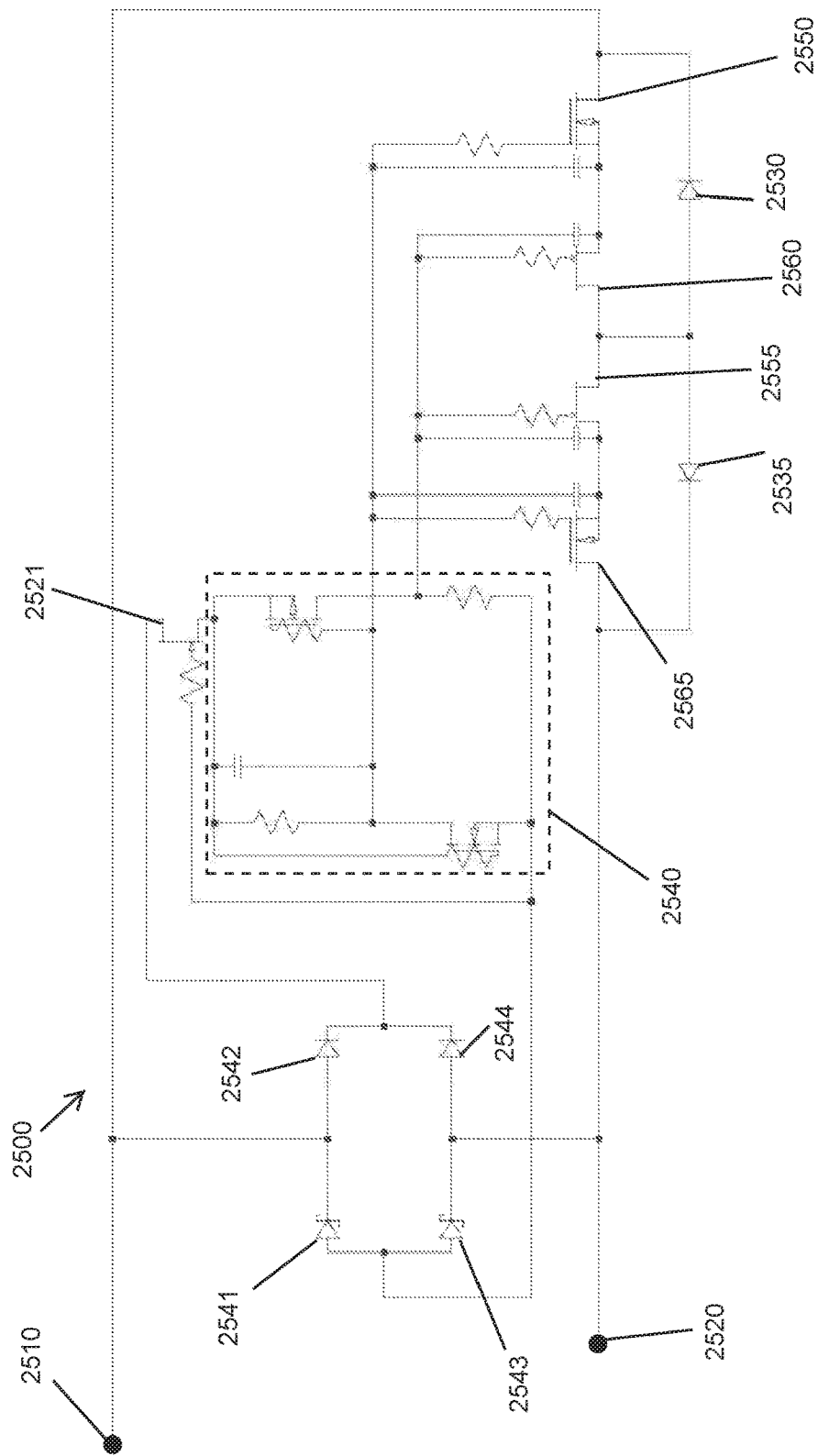
FIG. 25 provides a wiring diagram for device 2500 for protecting a circuit against overcurrent conditions in an alternating current environment featuring four primary transistors.

FIG. 25 provides a wiring diagram for device 2500 for protecting a circuit against overcurrent conditions in an alternating current environment featuring four primary transistors. Device 2500 comprises first terminal 2510 and second terminal 2520, with first transistor 2550 and second transistor 2560 similarly aligned toward first terminal 2510 with their drains and sources in the primary current path. Specifically, the drain of the n-channel, depletion mode, normally-on transistor 2550, and the source of the p-channel, depletion mode, normally-on transistor 2560 are oriented toward first electrode terminal 2510. When the voltage drop between first terminal 2510 and second terminal 2520 cycles positive, diodes 2530, 2535 operate to allow first transistor 2550 and second transistor 2560 to reference the low side of the rectifier bridge and second terminal 2520 to govern whether device 2500 passes current. When the voltage drop between first terminal 2510 and second terminal 2520 cycles negative, diodes 2530, 2535 operate to allow third transistor 2555 and fourth transistor 2565 to reference the now low side of the rectifier bridge and first terminal 2510 to govern whether device 2500 passes current. Diodes 2530 and 2535 can be optional, since their function can be performed by the body diodes of the relevant transistors. Note that the source of the p-channel, depletion mode, normally-on transistor 2555 and the drain of the n-channel, depletion mode, normally-on transistor 2565 are oriented toward second terminal 2520; the drains and sources of transistors 2555, 2565 also appear in the primary current path. Device 2500 also includes diodes 2542, 2544 together with schottky diodes 2541, 2543 arranged as a rectifier bridge. As can be appreciated, the rectifier bridge can include any suitable diodes, schottky diodes, and combinations thereof. Rectified voltage approaches transistor 2521, which provides gate protection for the device 2500. Gate drive circuitry 2540 controls the gates of the primary transistors 2550, 2560, 2555, 2565 to place them into enhancement mode or blocking depletion mode as needed. Accordingly, some embodiments provide a device for protecting a circuit from sustained overcurrent conditions in an alternating current environment comprising two or more transistors as described herein, further comprising a rectifier bridge, gate protection circuitry, and gate drive circuitry.

Example 11

Device with Rectifier and Three Transistors for AC Current Protection

Figure 26:
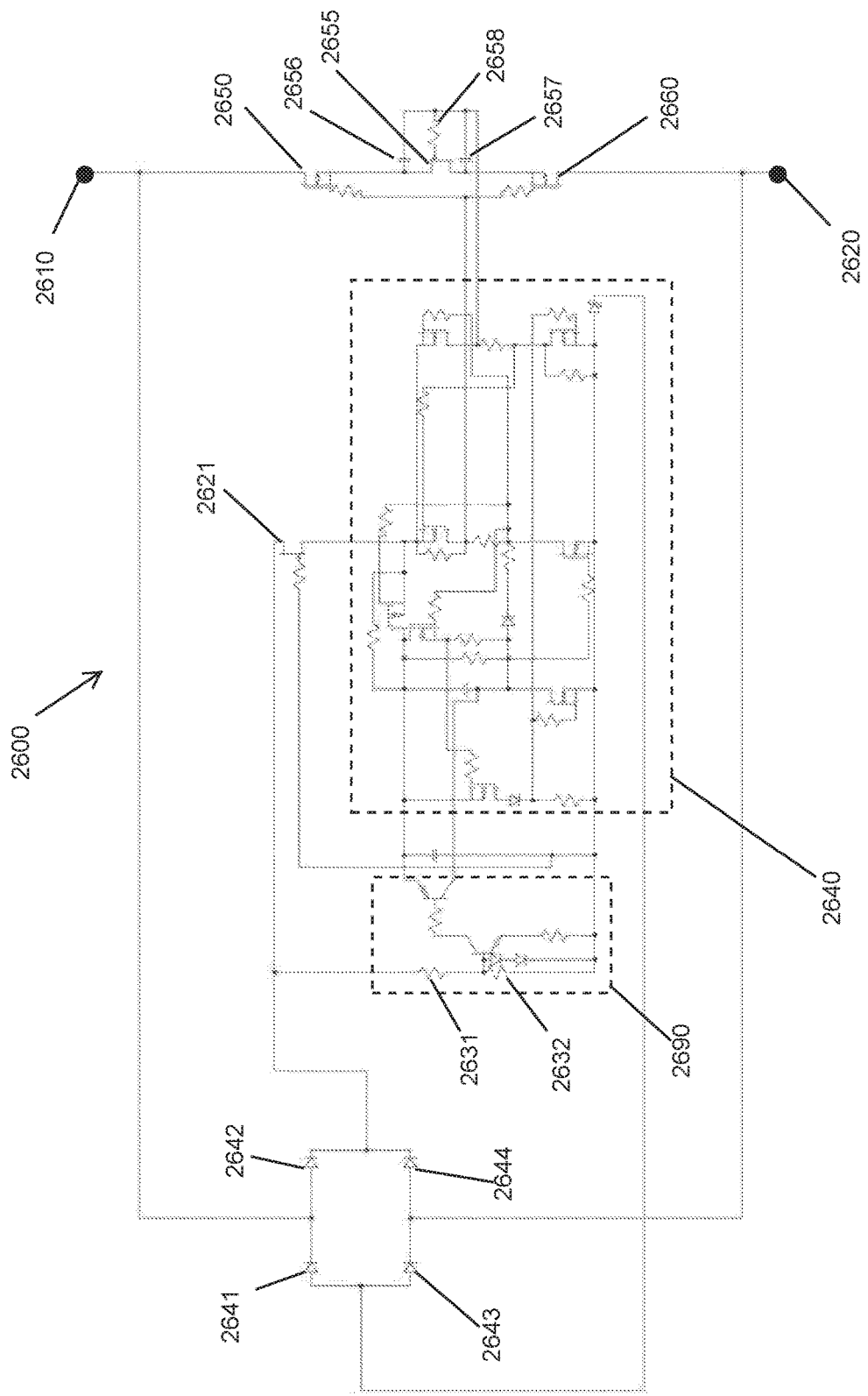
FIG. 26 provides a wiring diagram for device 2600 for protecting a circuit against overcurrent conditions in an alternating current environment featuring three primary transistors.

FIG. 26 provides a wiring diagram for device 2600 for protecting a circuit against overcurrent conditions in an alternating current environment featuring three primary transistors. Device 2600 comprises first terminal 2610 and second terminal 2620. Primary transistors 2650, 2655, and 2660 each have their drains and sources within the primary current path between first terminal 2610 and second terminal 2620. A rectifier bridge comprising diodes 2641, 2642, 2643, 2644 ensure that gate drive circuitry 2640 receives the correct rectified voltage to properly bias the gates of the primary transistors toward or into enhancement mode on the one hand, or blocking depletion mode on the other hand as required to protect an external circuit (not shown) from a sustained overcurrent condition. Device 2600 also comprises a high/low voltage sensor circuitry defined by area 2690 comprising resistors 2631, 2632, which function to detect the rectified voltage drop across first terminal 2610 and second terminal 2620. Area 2690 monitors the voltage drop across device 2600, even during blocking mode, allowing the device 2200 to reset. Gate protection circuitry, in the form of transistor 2621, on the one hand, and capacitors 2656, 2657 and resistor 2658, on the other hand, also appear. Accordingly, other embodiments provide a device for protecting a circuit from sustained overcurrent conditions in an alternating current environment comprising three primary transistors as described herein, further comprising a rectifier bridge, gate protection circuitry, voltage sensing circuitry, and gate drive circuitry.

EMBODIMENTS

Embodiment 1

A device for protecting a circuit having a primary current path from a sustained overcurrent condition, comprising:
a first terminal and a second terminal;
a first transistor comprising a first gate, a first drain, and a first source;
a second transistor comprising a second gate, a second drain, and a second source;
wherein the first transistor and the second transistor are arranged in series in the primary current path between the first terminal and the second terminal; and
wherein the device is configured to pass current during normal current conditions, and to substantially block current during sustained overcurrent conditions.

Embodiment 2

The device of embodiment 1,
wherein the first drain is in electrical communication with the first terminal;
wherein the first source is in electrical communication with the second source;
wherein the second drain is in electrical communication with the second terminal.

Embodiment 3

The device of any one of embodiments 1 or 2,
wherein the first transistor and the second transistor are similarly aligned toward the first terminal; and
wherein the first transistor is closer to the first terminal, and the second transistor is closer to the second terminal.

Embodiment 4

The device of any one of embodiments 1-3, wherein the first drain is in electrical communication with the first terminal.

Embodiment 5

The device of any one of embodiments 1-4, wherein the second drain is in electrical communication with the second terminal.

Embodiment 6

The device of any one of embodiments 1-5, wherein the first transistor comprises a depletion type transistor.

Embodiment 7

The device of any one of embodiments 1-5, wherein the first transistor comprises an enhancement type transistor.

Embodiment 8

The device of any one of embodiments 1-7, wherein the second transistor comprises a depletion type transistor.

Embodiment 9

The device of any one of embodiments 1-7, wherein the second transistor comprises an enhancement type transistor.

Embodiment 10

The device of any one of embodiments 1-9, wherein the first transistor has a negative gate threshold characteristic.

Embodiment 11

The device of any one of embodiments 1-9, wherein the first transistor has a positive gate threshold characteristic.

Embodiment 12

The device of any one of embodiments 1-11, wherein the second transistor has a negative gate threshold characteristic.

Embodiment 13

The device of any one of embodiments 1-11 wherein the second transistor has a positive gate threshold characteristic.

Embodiment 14

The device of any one of embodiments 1-13, wherein the first transistor has a first majority carrier characteristic that is n-type.

Embodiment 15

The device of any one of embodiments 1-14, wherein the second transistor has a second majority characteristic that is p-type.

Embodiment 16

The device of any one of embodiments 1-13 or 15, wherein the first transistor has a first majority carrier characteristic that is p-type.

Embodiment 17

The device of any one of embodiments 1-14 or 16, wherein the second transistor has a second majority characteristic that is n-type.

Embodiment 18

The device of any one of embodiments 1-6, 8-15, and 17, wherein the first transistor is an n-channel depletion mode transistor.

Embodiment 19

The device of any one of embodiments 1-8, 10-16, and 18, wherein the second transistor is a p-channel depletion mode transistor.

Embodiment 20

The device of any one of embodiments 1-19, wherein the device is a two-terminal device.

Embodiment 21

The device of any one of embodiments 1-20, wherein the device is configured to operate without any auxiliary power supply.

Embodiment 22

The device of any one of embodiments 1-21,
wherein, when a first positive voltage and a normal current condition exist from the first terminal to the second terminal,
the first gate is arranged so that at least a substantial portion of the positive voltage drives a voltage difference between the first gate minus the first source to be substantially less negative than a voltage difference between the second drain minus the first source; and
the second gate is arranged so that at least a substantial portion of the positive voltage drives a voltage difference of the second gate minus the second source to be substantially less positive than a voltage difference between the first drain and the second source; and
wherein, when a second positive voltage and a sustained overcurrent condition exist from the first terminal to the second terminal,
the gate of the first transistor is switched so that at least a substantial portion of a voltage across the second transistor drives the gate of the first transistor negative, thereby forcing the first transistor into blocking depletion mode; and
the gate of the second transistor is switched so that at least a substantial portion of the voltage across the first transistor drives the gate of the second transistor positive, thereby forcing the second transistor into blocking depletion mode.

Embodiment 23

The device of any one of embodiments 1-22,
wherein, when a first positive voltage and a normal current condition exist from the first terminal to the second terminal,
a voltage difference between the first gate minus the first source is substantially less negative than a voltage difference between the second drain minus the first source; and
a voltage difference between the second gate minus the second source is substantially less positive than a voltage difference between the first drain and the second source;
wherein, when a second positive voltage and a sustained overcurrent condition exist from the first terminal to the second terminal,
a voltage at the first gate is driven lower than the second source so that at least a substantial portion of the voltage across the second transistor drives the first gate negative, and the first transistor enters blocking depletion mode; and
a voltage at the second gate is driven higher than the first source so that at least a substantial portion of the voltage across the first transistor drives the second gate positive, and the second transistor enters blocking depletion mode.

Embodiment 24

The device of any one of embodiments 1-23,
wherein, when a first positive voltage and a normal current condition exist from the first terminal to the second terminal,
a voltage at the first gate is driven higher than the first source so that at least a substantial portion of the voltage across the first transistor drives the first transistor into enhancement mode; and
a voltage at the second gate is driven lower than the second source so that at least a substantial portion of the voltage across the second transistor drives the second transistor into enhancement mode;
wherein, when a second positive voltage and a sustained overcurrent condition exist from the first terminal to the second terminal,
a voltage at the first gate is driven lower than the second source so that at least a substantial portion of the voltage across the second transistor drives the first gate negative, and the first transistor enters blocking depletion mode; and
a voltage at the second gate is driven higher than the first source so that at least a substantial portion of the voltage across the first transistor drives the second gate positive, and the second transistor enters blocking depletion mode.

Embodiment 25

The device of any one of embodiments 1-24,
wherein, when a first positive voltage and a normal current condition exist from the first terminal to the second terminal,
a voltage difference between the first gate minus the first source is substantially less negative than a voltage difference between the second drain minus the first source; and
a voltage difference between the second gate minus the second source is substantially less positive than a voltage difference between the first drain and the second source;
wherein, when a second positive voltage and a sustained overcurrent condition exist from the first terminal to the second terminal,
a voltage at the first gate is driven negative and the first transistor enters blocking depletion mode; and
a voltage at the second gate is driven positive and the second transistor enters blocking depletion mode.

Embodiment 26

The device of any one of embodiments 1-25,
wherein, when a first positive voltage and a normal current condition exist from the first terminal to the second terminal,
a voltage difference between the first gate minus the first source is substantially less negative than a voltage difference between the second drain minus the first source; and
a voltage difference between the second gate minus the second source is substantially less positive than a voltage difference between the first drain and the second source;
wherein, when a second positive voltage and a sustained overcurrent condition exist from the first terminal to the second terminal,
a voltage at the first gate is driven lower than the second source so that at least a substantial portion of the voltage across the second transistor drives the first gate negative, and the first transistor enters blocking depletion mode; and
a voltage at the second gate is driven higher than the first source so that at least a substantial portion of the voltage across the first transistor drives the second gate positive, and the second transistor enters blocking depletion mode.

Embodiment 27

The device of any one of embodiments 1-26,
wherein, when a first positive voltage and a normal current condition exist from the first terminal to the second terminal,
- a voltage at the first gate is driven higher than the first source so that at least a substantial portion of the voltage across the first transistor drives the first transistor into enhancement mode; and
- a voltage at the second gate is driven lower than the second source so that at least a substantial portion of the voltage across the second transistor drives the second transistor into enhancement mode;

wherein, when a second positive voltage and a sustained overcurrent condition exist from the first terminal to the second terminal,
- a voltage at the first gate is driven lower than the second source so that at least a substantial portion of the voltage across the second transistor drives the first gate negative, and the first transistor enters blocking depletion mode; and
- a voltage at the second gate is driven higher than the first source so that at least a substantial portion of the voltage across the first transistor drives the second gate positive, and the second transistor enters blocking depletion mode.

Embodiment 28

The device of any one of embodiments 1-27,
wherein, when a first positive voltage and a normal current condition exist from the first terminal to the second terminal,
  the first transistor is configured to operate substantially in enhancement mode; and
  the second transistor is configured to operate substantially in enhancement mode; and
wherein, when a second positive voltage and a sustained overcurrent condition exist from the first terminal to the second terminal,
  the first transistor is configured to operate in blocking depletion mode; and
  the second transistor is configured to operate in blocking depletion mode.

Embodiment 29

The device of any one of embodiments 1-28, wherein, when a first positive voltage and a normal current exist from the first terminal to the second terminal, a voltage difference of the first gate minus the first source is less negative compared to a voltage difference between the second drain minus the first source; and wherein the first transistor is not a p-channel, enhancement transistor, or a negative gate threshold characteristic normally-off transistor.

Embodiment 30

The device of any one of embodiments 1-29, wherein, when a first positive voltage and a normal current exist from the first terminal to the second terminal, a voltage difference of the second gate minus the second source is less positive compared to a voltage difference between the first drain minus the second source; and wherein the second transistor is not an n-channel enhancement transistor or a positive gate threshold characteristic normally-off transistor.

Embodiment 31

The device of any one of embodiments 1-30, wherein, when a positive voltage and a normal current condition exist from the first terminal to the second terminal,
  the first transistor is configured substantially in diode mode; and
  the second transistor is configured substantially in diode mode; and
wherein, when a second positive voltage and a sustained overcurrent condition exist from the first terminal to the second terminal,
  the first transistor is configured to operate in blocking depletion mode; and
  the second transistor is configured to operate in blocking depletion mode.

Embodiment 32

The device of any one of embodiments 1-30, wherein, when a positive voltage and a normal current condition exist from the first terminal to the second terminal,
  the first transistor is configured to operate in linear mode; and
  the second transistor is configured to operate in linear mode; and
wherein, when a second positive voltage and a sustained overcurrent condition exist from the first terminal to the second terminal,
  the first transistor is configured to operate in blocking depletion mode; and
  the second transistor is configured to operate in blocking depletion mode.

Embodiment 33

The device of any one of embodiments 1-32, wherein, when a positive voltage and a normal current condition exist from the first terminal to the second terminal,
  the first transistor is configured to operate in enhancement mode;
  the second transistor is configured to operate in enhancement mode;
wherein, when a second positive voltage and a sustained overcurrent condition exist from the first terminal to the second terminal,
  a voltage at the first gate drives the first transistor into blocking depletion mode; and
  a voltage at the second gate drives the second transistor into blocking depletion mode.

Embodiment 34

The device of any one of embodiments 1-31,
wherein the first transistor is a depletion type and has a negative gate threshold characteristic;
wherein the second transistor is an enhancement type and has a positive gate threshold characteristic;
wherein, when a positive voltage and a normal current condition exist from the first terminal to the second terminal,
  the first transistor is configured to operate in enhancement mode;

the second transistor is configured to operate in enhancement mode;
wherein, when a second positive voltage and a sustained overcurrent condition exist from the first terminal to the second terminal,
 a voltage across the second transistor drives the first gate negative and the first transistor enters blocking depletion mode; and
 a voltage at the second gate is driven less than or substantially equal to zero and the transistor turns off.

Embodiment 35

The device of any one of embodiments 1-31,
wherein the first transistor is an enhancement type and has a negative gate threshold characteristic;
wherein the second transistor is a depletion type and has a positive gate threshold characteristic;
wherein, when a positive voltage and a normal current condition exist from the first terminal to the second terminal,
 the first transistor is configured to operate in enhancement mode;
 the second transistor is configured to operate in enhancement mode;
wherein, when a second positive voltage and a sustained overcurrent condition exist from the first terminal to the second terminal,
 a voltage across the first transistor drives the second gate positive and the second transistor enters blocking depletion mode; and
 a voltage at the first gate is driven greater than or substantially equal to zero and the transistor turns off.

Embodiment 36

The device of any one of embodiments 1-35, further comprising:
 a first gate protection circuitry configured to limit a voltage at the first gate to a first predetermined range; and
 a second gate protection circuitry configured to limit a voltage at the second gate to a second predetermined range.

Embodiment 37

The device of any one of embodiments 1-36, further comprising:
a gate protection circuitry configured to limit a first voltage at the first gate to a first predetermined range and a second voltage at the second gate to a second predetermined range.

Embodiment 38

The device of any one of embodiments 1-37, further comprising:
a voltage storage/generation circuitry configured to maintain the device in a normal current condition configuration for a time when the current between the first terminal and the second terminal falls below a predetermined current level.

Embodiment 39

The device of embodiment 38, wherein the voltage storage/generation circuitry comprises at least one diode in series electronic communication with at least one capacitor.

Embodiment 40

The device of any one of embodiments 1-39, further comprising:
a rectifying component in series electrical communication with the first terminal and the second terminal, and in parallel electrical communication with the first transistor and the second transistor,
the rectifying component being configured to present a fixed polarity voltage.

Embodiment 41

The device of embodiment 40, wherein the rectifying component comprises a plurality of diodes in bridge configuration.

Embodiment 42

The device of any one of embodiments 40-41, wherein the rectifying component comprises a bridge rectifier.

Embodiment 43

The device of any one of embodiments 40-42, wherein the rectifying component comprises a full wave bridge rectifier.

Embodiment 44

The device of any one of embodiments 40-43, wherein the rectifying component comprises at least one diode and at least one schottky diode.

Embodiment 45

The device of any one of embodiments 1-44, further comprising gate drive circuitry configured to bias the first gate and the second gate.

Embodiment 46

The device of embodiment 45, wherein the gate drive circuitry comprises at least two transistors in a totem pole driver stage configuration.

Embodiment 47

The device of any one of embodiments 44-46, wherein the gate drive circuitry comprises a first totem pole driver stage configured to bias the first gate, and a second totem pole driver stage configured to bias the second gate.

Embodiment 48

The device of any one of embodiments 1-47, further comprising current monitor circuitry configured to monitor the current passing between the first terminal and the second terminal.

Embodiment 49

The device of embodiment 48, wherein the current monitor circuitry comprises at least one transistor and at least one resistor in electrical communication with the first terminal and the second terminal.

Embodiment 50

The device of any one of embodiments 1-49, further comprising high/low voltage sensor circuitry configured to monitor the voltage drop between the first terminal and the second terminal.

Embodiment 51

The device of embodiment 50, wherein the high/low voltage sensor circuitry comprises two resistors configured to act as a voltage divider in electrical communication with the first terminal and the second terminal.

Embodiment 52

The device of any one of embodiments 1-51, further comprising power good circuitry configured to monitor the electrical energy within the device.

Embodiment 53

The device of embodiment 52, wherein the power good circuitry comprises a plurality of transistors configured to monitor the stored electrical charge of a capacitor in electrical communication with the first terminal and the second terminal.

Embodiment 54

A method for protecting a circuit from an overcurrent condition, comprising
placing a device of any one of embodiments 1-53 in series in the circuit; monitoring the current flowing through the device;
wherein, when a first positive voltage and a normal current condition exist from the first terminal to the second terminal,
 configuring the first transistor to operate substantially in enhancement mode; and
 configuring the second transistor to operate substantially in enhancement mode;
 thereby allowing current to flow between the first terminal and the second terminal; and
wherein, when a second positive voltage and a sustained overcurrent condition exist from the first terminal to the second terminal,
 configuring the first transistor to operate in blocking depletion mode; and configuring the second transistor to operate in blocking depletion mode;
 thereby blocking current between the first terminal and the second terminal; thereby protecting the circuit from an overcurrent condition.

Embodiment 55

The method of embodiment 54, further comprising:
after configuring the first transistor to operate in blocking depletion mode; and
configuring the second transistor to operate in blocking depletion mode,
monitoring a voltage drop between the first terminal and the second terminal;
when the voltage drop decreases below a predetermined threshold,
 reconfiguring the first transistor to operate substantially in enhancement mode; and
 reconfiguring the second transistor to operate substantially in enhancement mode; thereby allowing current to flow between the first terminal and the second terminal.

Embodiment 56

A method for protecting a circuit from an overcurrent condition, comprising
placing a device of any one of embodiments 1-53 in series in the circuit;
charging voltage storage/generation circuitry within the device to provide power for a limited time to the device;
monitoring the power within the device;
monitoring the current flowing through the device;
wherein, when a first positive voltage and a normal current condition exist from the first terminal to the second terminal,
 configuring the first transistor to operate substantially in enhancement mode; and
 configuring the second transistor to operate substantially in enhancement mode;
 thereby allowing current to flow between the first terminal and the second terminal; and
wherein, when a second positive voltage and a sustained overcurrent condition exist from the first terminal to the second terminal,
 ceasing monitoring the current flowing through the device;
 configuring the first transistor to operate in blocking depletion mode; and
 configuring the second transistor to operate in blocking depletion mode;
 thereby blocking current between the first terminal and the second terminal;
thereby protecting the circuit from an overcurrent condition.

Embodiment 57

The method of embodiment 56, further comprising:
after ceasing monitoring the current, configuring the first transistor to operate in blocking depletion mode, and configuring the second transistor to operate in blocking depletion mode,
monitoring the power within the device;
if the power is not good, disabling any oscillation within the device;
if the power is good, monitoring a voltage drop between the first terminal and the second terminal, and when the voltage drop decreases below a predetermined threshold,
 reconfiguring the first transistor to operate substantially in enhancement mode, and
 reconfiguring the second transistor to operate substantially in enhancement mode, thereby allowing current to flow between the first terminal and the second terminal.

As previously stated, detailed embodiments of the present invention are disclosed herein, however, it is to be understood that the disclosed embodiments are merely exemplary of the invention that may be embodied in various forms. It will be appreciated that many modifications and other variations stand within the intended scope of this invention as claimed below. Furthermore, the foregoing description of various embodiments does not necessarily imply exclusion. For example, "some" embodiments may include all or part of "other" and "further" embodiments within the scope of this invention. In addition, "a" does not mean "one and only one;" "a" can mean "one and more than one."

I claim:

1. A device for protecting a circuit having a primary current path from a sustained overcurrent condition, comprising:
   a first terminal and a second terminal;
   a first transistor comprising a first gate, a first drain, and a first source, wherein the first transistor is an n-channel, depletion mode, normally-on transistor;
   a second transistor comprising a second gate, a second drain, and a second source, wherein the second transistor is a p-channel, depletion mode, normally-on transistor; and
   gate drive circuitry configured to bias the first gate and the second gate;
   wherein the first transistor and the second transistor are arranged in series in the primary current path between the first terminal and the second terminal;
   wherein the first transistor and the second transistor are similarly aligned;
   wherein, when a first positive voltage and a normal current condition exist from the first terminal to the second terminal,
      the first transistor is configured to operate substantially in enhancement mode; and
      the second transistor is configured to operate substantially in enhancement mode; and
   wherein, when a second positive voltage and a sustained overcurrent condition exist from the first terminal to the second terminal,
      the first transistor is configured to operate in blocking depletion mode; and
      the second transistor is configured to operate in blocking depletion mode and
   wherein the device is configured to pass current during normal current conditions, and to substantially block current during sustained overcurrent conditions.

2. The device of claim 1, wherein the gate drive circuitry comprises two transistors in a totem pole driver stage configuration.

3. The device of claim 1, wherein the gate drive circuitry comprises a first totem pole driver stage configured to bias the first gate, and a second totem pole driver stage configured to bias the second gate.

4. The device of claim 1, further comprising a first gate protection circuitry configured to limit a voltage at the first gate to a first predetermined range; and
   a second gate protection circuitry configured to limit a voltage at the second gate to a second predetermined range.

5. The device of claim 1, further comprising a gate protection circuitry configured to limit a first voltage at the first gate to a first predetermined range and a second voltage at the second gate to a second predetermined range.

6. The device of claim 5, wherein the gate protection circuitry comprises a transistor with its drain in electrical communication with the first terminal, and its gate in electrical communication with the second terminal.

7. The device of claim 1, further comprising current monitoring circuitry configured to monitor the current flowing through the device.

8. The device of claim 1, further comprising voltage storage/generation circuitry configured to store charge during normal current conditions.

9. The device of claim 8, wherein the voltage storage/generation circuitry comprises at least one capacitor and at least one diode.

10. The device of claim 1, further comprising voltage storage/generation circuitry configured to store charge during sustained overcurrent conditions.

11. The device of claim 10, wherein the voltage storage/generation circuitry comprises at least one capacitor and at least one diode.

12. The device of claim 1, further comprising high/low voltage sensor circuitry configured to monitor a voltage drop between the first terminal and the second terminal.

13. The device of claim 12, wherein the high/low voltage sensor circuitry comprises at least two resistors configured to act as a voltage divider in electrical communication with the first terminal and the second terminal.

14. The device of claim 1, further comprising power good circuitry configured to monitor the electrical energy within the device.

15. The device of claim 14, wherein the power good circuitry is further configured to oscillate the device into blocking mode to store charge, and into conducting mode once sufficient charge has been stored.

16. The device of claim 14, wherein the power good circuitry comprises a plurality of transistors configured to monitor the stored electrical charge of a capacitor in electrical communication with the first terminal and the second terminal.

17. The device of claim 1, further comprising a delay blocking timer circuitry configured to delay onset of blocking depletion mode in the first transistor and the second transistor.

18. The device of claim 17, wherein the delay blocking timer circuitry comprises at least one resistor in electrical communication with at least one capacitor.

19. The device of claim 1, further comprising a delay reset timer circuitry configured to delay onset of enhancement mode following the sustained overcurrent condition.

* * * * *